(12) United States Patent
Feaver et al.

(10) Patent No.: US 8,916,296 B2
(45) Date of Patent: Dec. 23, 2014

(54) MESOPOROUS CARBON MATERIALS COMPRISING BIFUNCTIONAL CATALYSTS

(75) Inventors: Aaron M. Feaver, Seattle, WA (US); Henry R. Costantino, Woodinville, WA (US); Richard D. Varjian, Redmond, WA (US)

(73) Assignee: EnerG2 Technologies, Inc., Seattle, WA (US)

( * ) Notice: Subject to any disclaimer, the term of this patent is extended or adjusted under 35 U.S.C. 154(b) by 791 days.

(21) Appl. No.: 13/046,572

(22) Filed: Mar. 11, 2011

(65) Prior Publication Data

US 2011/0223494 A1   Sep. 15, 2011

Related U.S. Application Data

(60) Provisional application No. 61/313,166, filed on Mar. 12, 2010.

(51) Int. Cl.
| | |
|---|---|
| H01M 4/36 | (2006.01) |
| H01M 4/13 | (2010.01) |
| H01M 4/58 | (2010.01) |
| H01M 4/00 | (2006.01) |
| H01M 4/50 | (2010.01) |
| H01M 8/22 | (2006.01) |
| H01M 4/86 | (2006.01) |
| H01M 4/96 | (2006.01) |
| H01M 12/06 | (2006.01) |
| C01B 31/00 | (2006.01) |
| C01B 31/08 | (2006.01) |

(52) U.S. Cl.
CPC .............. *H01M 4/8615* (2013.01); *H01M 4/96* (2013.01); *H01M 12/06* (2013.01); *C01B 31/00* (2013.01); *C01B 31/08* (2013.01); *Y02E 60/50* (2013.01); *C01P 2006/12* (2013.01); *C01P 2006/14* (2013.01); *C01P 2006/16* (2013.01)
USPC ........ 429/236; 429/218.1; 429/221; 429/223; 429/224; 429/231.8; 429/405

(58) Field of Classification Search
USPC ........... 429/231.8, 218.1, 221, 224, 405, 223, 429/236
See application file for complete search history.

(56) References Cited

U.S. PATENT DOCUMENTS

| | | | |
|---|---|---|---|
| 3,518,123 A | 6/1970 | Katsoulis et al. | ............... 136/86 |
| 3,876,505 A | 4/1975 | Stoneburner | |

(Continued)

FOREIGN PATENT DOCUMENTS

| | | |
|---|---|---|
| CN | 1762900 A | 4/2006 |
| EP | 1 049 116 A1 | 11/2000 |

(Continued)

OTHER PUBLICATIONS

Abraham et al., "A Polymer Electrolyte-Based Rechargeable Lithium/Oxygen Battery," *J. Electrochem. Soc. 143*(1):1-5, Jan. 1996.

(Continued)

*Primary Examiner* — Patrick Ryan
*Assistant Examiner* — Julian Anthony
(74) *Attorney, Agent, or Firm* — Seed IP Law Group PLLC

(57) ABSTRACT

The present application is directed to mesoporous carbon materials comprising bi-functional catalysts. The mesoporous carbon materials find utility in any number of electrical devices, for example, in lithium-air batteries. Methods for making the disclosed carbon materials, and devices comprising the same, are also disclosed.

23 Claims, 12 Drawing Sheets

(56) References Cited

U.S. PATENT DOCUMENTS

| | | | |
|---|---|---|---|
| 3,977,901 A | 8/1976 | Buzzelli | 136/86 |
| 4,082,694 A | 4/1978 | Wennerberg et al. | 252/444 |
| 4,159,913 A | 7/1979 | Birchall et al. | 106/307 |
| 4,198,382 A | 4/1980 | Matsui | 423/445 |
| 4,543,341 A | 9/1985 | Barringer et al. | 501/1 |
| 4,580,404 A | 4/1986 | Pez et al. | 62/55.5 |
| 4,862,328 A | 8/1989 | Morimoto et al. | 361/502 |
| 4,873,218 A | 10/1989 | Pekala | 502/418 |
| 4,954,469 A | 9/1990 | Robinson | 502/80 |
| 4,997,804 A | 3/1991 | Pekala | 502/418 |
| 5,260,855 A | 11/1993 | Kaschmitter et al. | 361/502 |
| 5,416,056 A | 5/1995 | Baker | 502/425 |
| 5,420,168 A | 5/1995 | Mayer et al. | 521/99 |
| 5,465,603 A | 11/1995 | Anthony et al. | |
| 5,508,341 A | 4/1996 | Mayer et al. | 524/596 |
| 5,510,209 A | 4/1996 | Abraham et al. | 429/192 |
| 5,529,971 A | 6/1996 | Kaschmitter et al. | 502/416 |
| 5,626,637 A | 5/1997 | Baker | 48/127.3 |
| 5,626,977 A | 5/1997 | Mayer et al. | 429/44 |
| 5,674,642 A | 10/1997 | Le et al. | 429/218 |
| 5,710,092 A | 1/1998 | Baker | 502/416 |
| 5,789,338 A | 8/1998 | Kaschmitter et al. | 502/418 |
| 5,858,486 A | 1/1999 | Metter et al. | 428/34.1 |
| 5,891,822 A | 4/1999 | Oyama et al. | |
| 5,908,896 A | 6/1999 | Mayer et al. | |
| 5,945,084 A | 8/1999 | Droege | 423/447.4 |
| 5,965,483 A | 10/1999 | Baker et al. | 502/416 |
| 6,006,797 A | 12/1999 | Bülow et al. | 141/3 |
| 6,064,560 A | 5/2000 | Hirahara et al. | 361/502 |
| 6,069,107 A * | 5/2000 | Kuznetsov et al. | 502/101 |
| 6,072,693 A | 6/2000 | Tsushima et al. | 361/502 |
| 6,096,456 A | 8/2000 | Takeuchi et al. | 429/249 |
| 6,153,562 A | 11/2000 | Villar et al. | |
| 6,225,257 B1 | 5/2001 | Putyera et al. | 502/432 |
| 6,242,127 B1 | 6/2001 | Paik et al. | |
| 6,309,446 B1 | 10/2001 | Nakanoya et al. | 95/102 |
| 6,310,762 B1 | 10/2001 | Okamura et al. | |
| 6,574,092 B2 | 6/2003 | Sato et al. | 361/502 |
| 6,592,838 B1 | 7/2003 | Nomoto et al. | 423/445 R |
| 6,815,105 B2 | 11/2004 | Cooper et al. | 429/16 |
| 7,245,478 B2 | 7/2007 | Zhong et al. | 361/502 |
| 7,582,902 B2 | 9/2009 | Tano et al. | |
| 7,723,262 B2 | 5/2010 | Feaver et al. | 502/416 |
| 7,816,413 B2 | 10/2010 | Feaver et al. | 516/100 |
| 7,835,136 B2 | 11/2010 | Feaver et al. | 361/502 |
| 8,158,556 B2 | 4/2012 | Feaver et al. | |
| 8,293,818 B2 | 10/2012 | Costantino et al. | |
| 8,404,384 B2 | 3/2013 | Feaver et al. | |
| 8,411,415 B2 | 4/2013 | Yoshinaga et al. | |
| 8,467,170 B2 | 6/2013 | Feaver et al. | |
| 8,480,930 B2 | 7/2013 | Suh et al. | |
| 8,580,870 B2 | 11/2013 | Costantino et al. | |
| 2001/0002086 A1 | 5/2001 | Webb | |
| 2002/0031706 A1 | 3/2002 | Dasgupta et al. | 429/212 |
| 2002/0031710 A1 | 3/2002 | Kezuka et al. | 429/303 |
| 2002/0114126 A1 | 8/2002 | Hirahara et al. | 361/302 |
| 2002/0168314 A1 | 11/2002 | Roemmler | 423/448 |
| 2002/0172637 A1 | 11/2002 | Chesneau et al. | 423/445 R |
| 2003/0012722 A1 | 1/2003 | Liu | |
| 2003/0013606 A1* | 1/2003 | Hampden-Smith et al. | 502/180 |
| 2003/0064564 A1 | 4/2003 | Lin | 438/257 |
| 2003/0064565 A1 | 4/2003 | Maletin et al. | |
| 2003/0108785 A1 | 6/2003 | Wu et al. | 429/44 |
| 2003/0170548 A1 | 9/2003 | Otsuki et al. | 429/326 |
| 2004/0132845 A1 | 7/2004 | Rhine et al. | |
| 2004/0180264 A1 | 9/2004 | Honbo et al. | |
| 2005/0014643 A1 | 1/2005 | Lini et al. | |
| 2005/0041370 A1 | 2/2005 | Wilk et al. | 361/502 |
| 2005/0058589 A1 | 3/2005 | Lundquist et al. | 423/445 R |
| 2005/0079359 A1 | 4/2005 | Fujita et al. | 428/408 |
| 2005/0135993 A1 | 6/2005 | Xu et al. | 423/605 |
| 2005/0233195 A1 | 10/2005 | Arnold et al. | |
| 2006/0057355 A1 | 3/2006 | Suzuki et al. | 428/308.4 |
| 2006/0079587 A1 | 4/2006 | Albert et al. | |
| 2006/0093915 A1 | 5/2006 | Lundquist et al. | 429/231.8 |
| 2006/0223965 A1 | 10/2006 | Trifu | 528/35 |
| 2006/0240979 A1 | 10/2006 | Hirahara et al. | 502/416 |
| 2007/0048605 A1 | 3/2007 | Pez et al. | |
| 2007/0113735 A1 | 5/2007 | Feaver et al. | 95/90 |
| 2007/0142222 A1 | 6/2007 | Erkey et al. | |
| 2007/0166602 A1 | 7/2007 | Burchardt | 429/44 |
| 2007/0292732 A1 | 12/2007 | Feaver et al. | 429/33 |
| 2008/0044726 A1 | 2/2008 | Feng et al. | |
| 2008/0132632 A1 | 6/2008 | Schiraldi et al. | |
| 2008/0145757 A1 | 6/2008 | Mah et al. | |
| 2008/0206638 A1 | 8/2008 | Takahashi et al. | |
| 2008/0241640 A1 | 10/2008 | Rajeshwar et al. | |
| 2008/0268297 A1 | 10/2008 | Quayle et al. | |
| 2008/0297981 A1 | 12/2008 | Endo et al. | |
| 2008/0299456 A1 | 12/2008 | Shiga et al. | 429/212 |
| 2009/0035344 A1 | 2/2009 | Thomas et al. | |
| 2009/0053594 A1 | 2/2009 | Johnson et al. | 429/163 |
| 2009/0104509 A1 | 4/2009 | Kwak et al. | 429/41 |
| 2009/0104530 A1 | 4/2009 | Shizuka et al. | 429/223 |
| 2009/0114544 A1 | 5/2009 | Rousseau et al. | 205/423 |
| 2009/0117466 A1 | 5/2009 | Zhamu et al. | |
| 2009/0145482 A1 | 6/2009 | Mitzi et al. | 136/262 |
| 2009/0185327 A1 | 7/2009 | Seymour | |
| 2010/0092370 A1 | 4/2010 | Zhang et al. | |
| 2010/0097741 A1 | 4/2010 | Zhong et al. | 361/502 |
| 2010/0110613 A1 | 5/2010 | Zhong et al. | 361/502 |
| 2010/0310941 A1 | 12/2010 | Kumta et al. | |
| 2010/0331179 A1 | 12/2010 | Feaver et al. | |
| 2011/0002086 A1 | 1/2011 | Feaver et al. | 361/502 |
| 2011/0028599 A1 | 2/2011 | Costantino et al. | 523/309 |
| 2011/0159375 A1 | 6/2011 | Feaver et al. | |
| 2011/0199716 A1 | 8/2011 | Feaver et al. | |
| 2012/0081838 A1 | 4/2012 | Costantino et al. | |
| 2012/0202033 A1 | 8/2012 | Chang et al. | |
| 2012/0251876 A1 | 10/2012 | Jagannathan | |
| 2012/0262127 A1 | 10/2012 | Feaver et al. | |
| 2013/0004841 A1 | 1/2013 | Thompkins et al. | |
| 2013/0020349 A1 | 1/2013 | Feaver et al. | |
| 2013/0157151 A1 | 6/2013 | Feaver et al. | |
| 2013/0169238 A1 | 7/2013 | Rojeski | |
| 2013/0252082 A1 | 9/2013 | Thompkins et al. | |
| 2013/0280601 A1 | 10/2013 | Geramita et al. | |

FOREIGN PATENT DOCUMENTS

| | | |
|---|---|---|
| EP | 1 514 859 A2 | 3/2005 |
| EP | 2 117 068 A1 | 11/2009 |
| JP | 05-320955 A | 12/1993 |
| JP | 8-112539 A | 5/1996 |
| JP | 10-297912 A | 11/1998 |
| JP | 2001-278609 A | 10/2001 |
| JP | 2004-514637 A | 5/2004 |
| JP | 2004-203715 A | 7/2004 |
| JP | 2004-315283 A | 11/2004 |
| JP | 2005-93984 A | 4/2005 |
| JP | 2005-136397 A | 5/2005 |
| JP | 2005-187320 A | 7/2005 |
| JP | 2006-248848 A | 9/2006 |
| JP | 2008-7387 A | 1/2008 |
| WO | 95/01165 A1 | 1/1995 |
| WO | 98/30496 A1 | 7/1998 |
| WO | 02/39468 A2 | 5/2002 |
| WO | 2004/087285 A1 | 10/2004 |
| WO | WO 2004/099073 A2 | 11/2004 |
| WO | WO 2007/061761 A1 | 5/2007 |
| WO | 2008/113133 A1 | 9/2008 |
| WO | 2010/032782 A1 | 3/2010 |
| WO | 2010/059749 A1 | 5/2010 |
| WO | 2010/138760 A2 | 12/2010 |
| WO | WO 2011/002536 A2 | 1/2011 |
| WO | WO 2011/003033 A1 | 1/2011 |
| WO | 2012/071916 A1 | 6/2012 |

OTHER PUBLICATIONS

Alcañiz-Monge et al., "Methane Storage in Activated Carbon Fibres," *Carbon* 35(2):291-297, 1997.

(56) References Cited

OTHER PUBLICATIONS

Babić et al., "Characterization of carbon cryogel synthesized by sol-gel polycondensation and freeze-drying," *Carbon* 42:2617-2624, 2004.
Babić et al., "Characterization of carbon cryogels synthesized by sol-gel polycondensation," *J. Serb. Chem. Soc.* 70(1):21-31, 2005.
Barbieri et al., "Capacitance limits of high surface area activated carbons for double layer capacitors," *Carbon* 43:1303-1310, 2005.
Barton et al., "Tailored Porous Materials," *Chem. Mater.* 11:2633-2656, 1999.
Beattie et al., "High-Capacity Lithium-Air Cathodes," *J. Electrochem. Soc.* 156(1):A44-A47, 2009.
Bock et al., "Structural Investigation of Resorcinol Formaldehyde and Carbon Aerogels Using SAXS and BET," *Journal of Porous Materials* 4:287-294, 1997.
Burchell et al., "Low Pressure Storage of Natural Gas for Vehicular Applications," *The Engineering Society for Advancing Mobility Land Sea Air and Space*, Government/Industry Meeting, Washington D.C., Jun. 19-21, 2000, 7 pages.
Butler et al., "Braking Performance Test Procedure for Hybrid Vehicle Energy Storage Systems: Capacitor Test Results," *2004 Joint International Meeting of the Electrochemical Society, Abstract 686*, Honolulu, HI, Oct. 3-8, 2004, 5 pages.
Chmiola et al., "Anomalous Increase in Carbon Capacitance at Pore Sizes Less Than 1 Nanometer," *Science* 313:1760-1763, Sep. 22, 2006.
Conway et al., "Partial Molal Volumes of Tetraalkylammonium Halides and Assignment of Individual Ionic Contributions," *Trans. Faraday Soc.* 62:2738-2749, 1966.
Czakkel et al., "Influence of drying on the morphology of resorcinol-formaldehyde-based carbon gels," *Microporous and Mesoporous Materials* 86:124-133, 2005.
Débart et al., "α-$MnO_2$ Nanowires: A Catalyst for the $O_2$ Electrode in Rechargeable Lithium Batteries," *Angew. Chem. Int. Ed.* 47:4521-4524, 2008.
Ding et al., "How Conductivities and Viscosities of PC-DEC and PC-EC Solutions of $LiBF_4$, $LiPF_6$, LiBOB, $Et_4NBF_4$, and $Et_4NBF_6$ Differ and Why," *Journal of the Electrochemical Society* 151(12):A2007-A2015, 2004.
Edward, "Molecular Volumes and the Stokes-Einstein Equation," *Journal of Chemical Education* 47(4):261-270, Apr. 1970.
Eikerling et al., "Optimized Structure of Nanoporous Carbon-Based Double-Layer Capacitors," *Journal of the Electrochemical Society* 152(1):E24-E33, 2005.
Endo et al., "Morphology and organic EDLC applications of chemically activated AR-resin-based carbons," *Carbon* 40:2613-2626, 2002.
Feaver et al., "Activated carbon cryogels for low pressure methane storage," *Carbon* 44:590-593, 2006.
Gouérec et al., "Preparation and Modification of Polyacrylonitrile Microcellular Foam Films for Use as Electrodes in Supercapacitors," *Journal of the Electrochemical Society* 148(1):A94-A101, 2001.
Hahn et al., "A dilatometric study of the voltage limitation of carbonaceous electrodes in aprotic EDLC type electrolytes by charge-induced strain," *Carbon* 44:2523-2533, 2006.
Hirscher et al., "Are carbon nanostructures an efficient hydrogen storage medium?" *Journal of Alloys and Compounds* 356-357:433-437, 2003.
Hsieh et al., "Synthesis of mesoporous carbon composite and its electric double-layer formation behavior," *Microporous and Mesoporous Materials* 93:232-239, 2006.
Hu et al., "Effects of electrolytes and electrochemical pretreatments on the capacitive characteristics of activated carbon fabrics for supercapacitors," *Journal of Power Sources* 125:299-308, 2004.
Inomata et al., "Natural gas storage in activated carbon pellets without a binder," *Carbon* 40:87-93, 2002.
International Preliminary Report on Patentability for PCT International Application No. PCT/US2006/044524, mailed May 27, 2008, 7 pages.
International Preliminary Report on Patentability for PCT International Application No. PCT/US2007/084886, mailed May 19, 2009, 7 pages.
International Search Report and Written Opinion for PCT International Application No. PCT/US2007/84886, mailed Jun. 11, 2008, 11 pages.
International Search Report and Written Opinion for PCT International Application No. PCT/US2010/40836, mailed Sep. 8, 2010, 12 pages.
International Search Report and Written Opinion for PCT International Application No. PCT/US2006/044524, mailed Apr. 11, 2007, 8 pages.
International Search Report and Written Opinion for PCT International Application No. PCT/US10/59947, mailed Mar. 2, 2011, 14 pages.
Khomenko et al., "High-voltage asymmetric supercapacitors operating in aqueous electrolyte," *Appl. Phys. A* 82:567-573, 2006.
Kocklenberg et al., "Texture control of freeze-dried resorcinol-formaldehyde gels," *Journal of Non-Crystalline Solids* 225:8-13, 1998.
Kowalczyk et al., "Estimation of the pore-size distribution function from the nitrogen adsorption isotherm. Comparison of density functional theory and the method of Do and co-workers," *Carbon* 41:1113-1125, 2003.
Lozano-Castelló et al., "Powdered Activated Carbons and Activated Carbon Fibers for Methane Storage: A Comparative Study," *Energy & Fuels* 16:1321-1328, 2002.
Lozano-Castelló et al., "Influence of pore structure and surface chemistry on electric double layer capacitance in non-aqueous electrolyte," *Carbon* 41:1765-1775, 2003.
McEwen et al., "Nonequeous Electrolytes and Novel Packaging Concepts for Electrochemical Capacitors," *The 7th International Seminar on Double Layer Capacitors and Similar Energy Storage Devices*, Deerfield Beach, FL, Dec. 8-10, 1997 (56 pages).
Miller, "Pulse Power Performance of Electrochemical Capacitors: Technical Status of Present Commercial Devices," *Presented at the "$8^{th}$ International Seminar on Double Layer Capacitors and Similar Energy Storage Devices*," Deerfield Beach, Florida; Dec. 7-9, 1998, 9 pages.
Ogasawara et al., "Rechargeable $LI_2O_2$ Electrode for Lithium Batteries," *J. Am. Chem. Soc.* 128(4):1390-1393, 2006.
Pekala, "Organic aerogels from the polycondensation of resorcinol with formaldehyde," *Journal of Materials Science* 24:3221-3227, 1989.
Pekala et al., "Structure of Organic Aerogels. 1. Morphology and Scaling," *Macromolecules* 26:5487-5493, 1993.
Perrin et al., "Methane Storage within Dry and Wet Active Carbons: A Comparative Study," *Energy & Fuels* 17(5):1283-1291, 2003.
Qu et al., "Studies of activated carbons used in double-layer capacitors," *Journal of Power Sources* 74:99-107, 1998.
Ravikovitch et al., "Unified Approach to Pore Size Characterization of Microporous Carbonaceous Materials from $N_2$, Ar, and $CO_2$ Adsorption Isotherms," *Langmuir* 16:2311-2320, 2000.
Read, J., "Characterization of the Lithium/Oxygen Organic Electrolyte Battery," *J. Electrochemical Soc.* 149(9):A1190-A1195, 2002.
Read et al., "Oxygen Transport Properties of Organic Electrolytes and Performance of Lithium/Oxygen Battery," *J. Electrochem. Soc.* 150(10):A1351-A1356, 2003.
Read, J., "Ether-Based Electrolytes for the Lithium/Oxygen Organic Electrolyte Battery," *J. Electrochem. Soc.* 153(1):A96-A100, 2006.
Reichenauer et al., "Microporosity in carbon aerogels," *Journal of Non-Crystalline Solids* 225:210-214, 1998.
Salitra et al., "Carbon Electrodes for Double-Layer Capacitors I. Relations Between Ion and Pore Dimensions," *Journal of the Electrochemical Society* 147(7):2486-2493, 2000.
Setoyama et al., "Simulation Study on the Relationship Between a High Resolution $\alpha_s$-Plot and the Pore Size Distribution for Activated Carbon," *Carbon* 36(10):1459-1467, 1998.
Simon et al., "Materials for electrochemical capacitors," *Nature Materials* 7:845-854, Nov. 2008.
Takeuchi et al., "Removal of single component chlorinated hydrocarbon vapor by activated carbon of very high surface area," *Separation and Purification Technology* 15:79-90, 1999.

(56) References Cited

OTHER PUBLICATIONS

Tamon et al., "Preparation of mesoporous carbon by freeze drying," *Carbon* 37:2049-2055 1999.

Ue, "Mdbility and Ionic Association of Lithium and Quaternary Ammonium Salts in Propylene Carbonate and γ-Butyrolactone," *J. Electrochem. Soc.* 141(12):3336-3342, Dec. 1994.

Wei et al., "A novel electrode material for electric double-layer capacitors," *Journal of Power Sources* 141:386-391, 2005.

Williford et al., "Air electrode design for sustained high power operation of Li/air batteries," *Journal of Power Sources* 194:1164-1170, 2009.

Xie et al., "Pore size control of Pitch-based activated carbon fibers by pyrolytic deposition of propylene," *Applied Surface Science* 250:152-160, 2005.

Xu et al., "Optimization of Nonaqueous Electrolytes for Primary Lithium/Air Batteries Operated in Ambient Environment," *Journal of the Electrochemical Society* 156(10):A773-A779, 2009.

Yamamoto et al.. "Control of mesoporosity of carbon gels prepared by sol-gel polycondensation and freeze drying," *Journal of Non-Crystalline Solids* 288:46-55, 2001.

Yang et al., "Preparation of highly microporous and mesoporous carbon from the mesophase pitch and its carbon foams with KOH," *Carbon* 42:1872-1875, 2004.

Zhang et al., "Discharge characteristic of a non-aqueous electrolyte $Li/O_2$ battery," *Journal of Power Sources* 195:1235-1240, 2010.

Anderegg, "Grading Aggregates: II—The Application of Mathematical Formulas to Mortars," *Industrial and Engineering Chemistry* 23(9): 1058-1064, 1931.

Andreasen et al., "Ueber die Beziehung zwischen Kornabstufung und Zwischenraum in Produkten aus losen Körnern (mit einigen Experimenten)," *Kolloid-Zeitschrift* 50(3):217-228, Mar. 1930 (with translation of summary).

Babić et al., "Carbon Cryogel as support of platinum nano-sized electrocatalyst for the hydrogen oxidation reaction," *Electrochimica Acta* 51:3820-3826, 2006.

Besenhard, "Handbook of battery materials," *Weinheim, Wiley—VCH*, Weinheim, New York, 389-401, Dec. 31, 1999.

Buiel, et al., "Li-insertion in hard carbon anode materials for Li-ion batteries," *Electrochimica Acta* 45:121-130, 1999.

Dinger et al., "Particle Packing III—Discrete versus Continuous Particle Sizes," *Interceram* 41(5):332-334, 1992.

Dinger et al., "Particle Packing IV—Computer Modelling of Particle Packing Phenomena," *Interceram* 42(3):150-152, 1993.

Furnas, "Grading Aggregates I—Mathematical Relations for Beds of Broken Solids of Maximum Density," *Industrial and Engineering Chemistry* 23(9): 1052-1058, 1931.

Hasegawa et al., "Preparation of carbon gel microspheres containing silicon powder for lithium ion battery anodes," *Carbon* 42:2573-2579, 2004.

International Preliminary Report of Patentability for International Application No. PCT/US/2010/030396, mailed Jul. 18, 2013, (403WO).

Job et al., "Carbon aerogels, cryogels and xerogels: Influence of the drying method on the textural properties of porous carbon materials," *Carbon* 43:2481-2494, 2005.

Nishihara et al., "Preparation of resorcinol—formaldehyde carbon cryogel microhoneycombs," *Carbon* 42:899-901, 2004.

Pääkkö, "Long and entangled native cellulose I nanofibers allow flexible aerogels and hierarchically porous templates for functionalities," *Soft Matter* 4:2492-2499, 2008.

Pojanavaraphan et al., "Prevulcanized natural rubber latex/clay aerogel nanocomposites," *European Polymer Journal* 44:1968-1977, 2008.

Tamon et al., "Influence of freeze-drying conditions on the mesoporosity of organic gels as carbon precursors," *Carbon* 38:1099-1105, 2000.

Tonanon et al., "Influence of surfactants on porous properties of carbon cryogels prepared by sol-gel polycondensation of resorcinol and formaldehyde," *Carbon* 41:2981-2990, 2003.

Toyo Tanso, "Isotropic Graphite Engineering Data," *Toyo Tanso Co., Ltd.* Catalog published 1994.

Toyo Tanso, "Isotropic Graphite Technical Data," *Toyo Tanso Co., Ltd.* Catalog published 1997.

Toyo Tanso, "Graphite Applications," *Toyo Tanso Co., Ltd.* Catalog published 1998. (Machine Translation attached).

Toyo Tanso Carbon Products, "Special Graphite and Compound Material Products," *Toyo Tanso Co., Ltd.* Catalog published 2008.

Wu et al., "Fabrication and nano-structure control of carbon aerogels via a microemulsion-templated sol-gel polymerization method," *Carbon* 44:675-681, 2006.

Yamamoto et al., "Porous properties of carbon gel microspheres as adsorbents for gas separation," *Carbon* 42:1671-1676, 2004.

Yamamoto et al., "Preparation and characterization of carbon cryogel microspheres," *Carbon* 40:1345-1351, 2002.

U.S. Appl. No. 14/047,935, filed Oct. 7, 2013.

* cited by examiner

MESOPOROUS CARBON MATERIALS COMPRISING BIFUNCTIONAL CATALYSTS

CROSS-REFERENCE TO RELATED APPLICATION

The present application claims the benefit under 35 U.S.C. §119(e) of U.S. Provisional Patent Application No. 61/313,166 filed on Mar. 12, 2010.

BACKGROUND

1. Technical Field

The present invention generally relates to mesoporous carbon materials comprising bi-functional catalysts, methods for making the same and devices containing the same.

2. Description of the Related Art

Metal-air batteries have a much higher theoretical specific energy than most available primary and rechargeable batteries, including metal oxide/carbon batteries. Metal-air batteries generally comprise an electrolyte interposed between positive and negative electrodes and are unique because the cathode active material is not stored in the battery. Instead, oxygen from the environment is reduced by catalytic surfaces in the air electrode, forming either an oxide or peroxide ion that further reacts with cationic species in the electrolyte. One such metal-air battery is the lithium-air battery. The positive electrode of a lithium-air battery generally comprises a lithium compound, such as lithium oxide or lithium peroxide, and serves to oxidize or reduce oxygen, while the negative electrode generally comprises a protected lithium foil which absorbs and releases lithium ions without allowing the lithium to react with the air or the electrolyte.

Lithium air batteries have a theoretical specific energy density of about 12 kWh/kg, which is the highest energy density of all electrochemical couples and compares favorably with the energy density of gasoline (~12,300 kWh/kg). Thus, lithium-air batteries potentially enable electric vehicles with uncompromised range versus today's internal combustion engine powered automobiles. However, the theoretical energy density of the lithium-air electrochemical couple has yet to be achieved. Typically, the energy density is limited by the deposition of lithium peroxide ($Li_2O_2$) within the air electrode pores. The peroxide, which is the product of the air electrode reaction, is deposited in the electrode pores and prevents further current flow, thereby limiting the usefulness of the device.

While recent research has focused on increasing the energy density of lithium-air batteries, a lack of an appropriate material for the carbon-based electrode has prevented their development for practical applications. In this regard, the pore structure (e.g., pore volume, size and distribution) of the carbon materials in a lithium-air carbon electrode is a critical parameter that has yet to be optimized. The pore structure must have an appropriate catalytic surface and microstructure to facilitate the $Li/O_2$ reaction and must accommodate sufficient amounts of reaction products (e.g., lithium peroxide) per gram of carbon to reduce clogging and inactivation of the pores. In addition, the capacity of carbon-based air electrodes increases with the mesopore volume of the carbon material but is not very sensitive to the bulk porosity. Finally, suitable carbon materials for use in metal-air batteries should be able to accommodate catalyst materials (e.g., metals and metal oxides) to enhance the reversibility of the metal-air reaction while maintaining the desired pore structure. Despite significant research in this area, carbon materials having such an optimized pore structure for use in lithium-air, and other metal-air batteries, and methods for making the same, are not currently known.

While significant advances have been made in the field, there continues to be a need in the art for improved mesoporous carbon materials for use in metal-air batteries, in particular lithium-air batteries, and other electrical energy storage devices, as well as for methods of making the same and devices containing the same. The present invention fulfills these needs and provides further related advantages.

BRIEF SUMMARY

In general terms, the current invention is generally directed to novel carbon materials and novel devices comprising the same. In some embodiments, the carbon materials are mesoporous, and in certain embodiments, the mesoporous carbon materials comprise a bi-functional catalyst to facilitate the metal-air reaction in a metal-air battery. In other embodiments, the present disclosure provides mesoporous carbon materials comprising other metals. The carbon materials find utility in any number of electrical energy storage devices, for example as electrode material in lithium-air and other metal-air batteries. The pore structure of the disclosed carbon materials makes them well suited for use in lithium-air battery electrodes. In particular, the mesoporous structure of the carbon materials accommodates a large volume of reaction products per gram of carbon and provides a catalytic surface for the $Li/O_2$ reaction. In addition, the pore structure is able to accommodate various bi-functional catalysts while maintaining the desired mesoporosity. Thus, electrodes prepared from the carbon materials comprise a high specific energy and resist clogging and inactivation of the pores. Accordingly, lithium-air and other metal-air batteries comprising the disclosed carbon materials have increased energy density and active life compared to devices prepared from known carbon materials.

Accordingly, in one embodiment the present disclosure provides a carbon material comprising at least 1000 ppm of a bi-functional catalyst and a pore structure comprising pores, the pore structure comprising a total pore volume of at least 1 cc/g, wherein at least 50% of the total pore volume resides in pores having a pore size ranging from 2 nm to 50 nm as determined from $N_2$ sorption derived DFT.

In some embodiments, the carbon material comprises less than 500 ppm of all other elements, excluding the bi-functional catalyst, having atomic numbers ranging from 11 to 92, as measured by proton induced x-ray emission.

In certain embodiments, at least 50% of the total pore volume resides in pores having a pore size ranging from 10 nm to 50 nm as determined from $N_2$ sorption derived DFT. For example in some embodiments, at least 90% of the total pore volume resides in pores having a pore size ranging from 10 nm to 50 nm as determined from $N_2$ sorption derived DFT. In other embodiments, at least 50% of the total pore volume resides in pores having a pore size ranging from 15 nm to 30 nm as determined from $N_2$ sorption derived DFT. In yet other embodiments, at least 90% of the total pore volume resides in pores having a pore size ranging from 2 nm to 50 nm as determined from $N_2$ sorption derived DFT.

In some other embodiments, the carbon material comprises at least 5000 ppm of the bi-functional catalyst.

In yet other embodiments, the carbon material comprises a specific surface area of greater than 500 $m^2$ g as determined from $N_2$ sorption derived DFT, for example, greater than 1000 $m^2$ g, greater than 1500 $m^2$ g or greater than 2000 $m^2$ g as determined from $N_2$ sorption derived DFT.

In certain other embodiments, the bi-functional catalyst comprises iron, nickel, cobalt, manganese, copper, ruthenium, rhodium, palladium, osmium, iridium, gold, hafnium, platinum, titanium, rhenium, tantalum, thallium, vanadium, niobium, scandium, chromium, gallium, zirconium, molybdenum or combinations or alloys thereof. For example, in some specific embodiments the bi-functional catalyst comprises nickel or the bi-functional catalyst comprises iron or the bi-functional catalyst comprises manganese.

In other embodiments, the bi-functional catalyst is in the form of an oxide. For example, in some embodiments, the bi-functional catalyst comprises a nickel oxide, an iron oxide or a manganese oxide.

In yet other embodiments, the bi-functional catalyst is in the form of a carbide. For example, in some embodiments the carbide comprises tungsten carbide.

In still other embodiments, the present disclosure provides a metal-air battery comprising an air cathode, a metal anode and an electrolyte, wherein the air cathode comprises a carbon material comprising at least 1000 ppm of a bi-functional catalyst and a pore structure comprising pores, the pore structure comprising a total pore volume of at least 1 cc/g, wherein at least 50% of the total pore volume resides in pores having a pore size ranging from 2 nm to 50 nm as determined from $N_2$ sorption derived DFT.

In some embodiments of the foregoing battery, the metal anode comprises carbon, lithium, sodium, potassium, rubidium, cesium, francium, beryllium, magnesium, calcium, strontium barium, radium, aluminum, silicon or a combination thereof.

In yet other embodiments of the foregoing battery, at least 50% of the total pore volume resides in pores having a pore size ranging from 10 nm to 50 nm as determined from $N_2$ sorption derived DFT, for example, in certain embodiments, at least 90% of the total pore volume resides in pores having a pore size ranging from 10 nm to 50 nm as determined from $N_2$ sorption derived DFT. In other embodiments, at least 50% of the total pore volume resides in pores having a pore size ranging from 15 nm to 30 nm as determined from $N_2$ sorption derived DFT. In yet other embodiments, at least 90% of the total pore volume resides in pores having a pore size ranging from 2 nm to 50 nm as determined from $N_2$ sorption derived DFT.

In some embodiments of the foregoing battery, the carbon material comprises at least 5000 ppm of the bi-functional catalyst. In other embodiments, the carbon material comprises a specific surface area of greater than 500 $m^2$ g as determined from $N_2$ sorption derived DFT, for example, greater than 1000 $m^2$ g, greater than 1500 $m^2$ g or greater than 2000 $m^2$ g.

In yet other embodiments of the foregoing battery, the bi-functional catalyst comprises iron, nickel, cobalt, manganese, copper, ruthenium, rhodium, palladium, osmium, iridium, gold, hafnium, platinum, titanium, rhenium, tantalum, thallium, vanadium, niobium, scandium, chromium, gallium, zirconium, molybdenum or combinations or alloys thereof. For example, in some specific embodiments, the bi-functional catalyst comprises nickel or the bi-functional catalyst comprises iron or the bi-functional catalyst comprises manganese.

In still other embodiments of the foregoing battery, the bi-functional catalyst is in the form of an oxide, for example, a nickel oxide, an iron oxide or a manganese oxide. In other embodiments, the bi-functional catalyst is in the form of a carbide, for example, tungsten carbide.

In some other embodiments of the foregoing battery, the carbon material comprises a different wetting characteristic on an inner surface of the pores compared to an outer surface of the pores. In yet other examples, an inner surface of the pores has a higher affinity for a solvent capable of solvating lithium ion than an outer surface of the pores. For example, in some aspects the solvent comprises acetonitrile, propylene carbonate, dimethyl carbonate, ethylene carbonate, diethyl carbonate, ethylmethylimidazolium hexafluorophosphate (EMIPF6), 1,2-dimethyl-3-propyl imidazolium [(DMPIX) Im] or a combination thereof. In still more examples, an inner surface of the pores has a lower affinity for a solvent capable of solvating lithium ion than the outer surface of the pores.

In another embodiment of the foregoing battery, the carbon material comprises less than 500 ppm of all other elements, excluding the bi-functional catalyst, having atomic numbers ranging from 11 to 92, as measured by proton induced x-ray emission.

In other aspects, the present disclose also provides an electrode comprising a binder and a carbon material, the carbon material comprising at least 1000 ppm of a bi-functional catalyst and a pore structure comprising pores, the pore structure comprising a total pore volume of at least 1 cc/g, wherein greater than 50% of the total pore volume resides in pores having a pore size ranging from 2 nm to 50 nm as determined from $N_2$ sorption derived DFT.

In another embodiment, the present disclosure provides a device comprising a secondary anode comprising a binder and a carbon material, wherein the secondary anode is operatively connected to a metal anode of a metal-air battery with electric double layer capacitance equal to that of an air cathode of the metal-air battery. For example, in certain embodiments the carbon material is microporous, and in other embodiments the carbon material is ultrapure.

In yet another embodiment, the disclosure provides a resorcinol-formaldehyde dried polymer gel comprising at least 1000 ppm of a bi-functional catalyst and a pore structure comprising pores, the pore structure comprising a total pore volume of at least 1 cc/g, wherein greater than 50% of the total pore volume resides in pores having a pore size ranging from 2 nm to 50 nm as determined from $N_2$ sorption derived DFT.

BRIEF DESCRIPTION OF THE DRAWINGS

In the figures, identical reference numbers identify similar elements. The sizes and relative positions of elements in the figures are not necessarily drawn to scale and some of these elements are arbitrarily enlarged and positioned to improve figure legibility. Further, the particular shapes of the elements as drawn are not intended to convey any information regarding the actual shape of the particular elements, and have been solely selected for ease of recognition in the figures.

DETAILED DESCRIPTION

Figure 1:
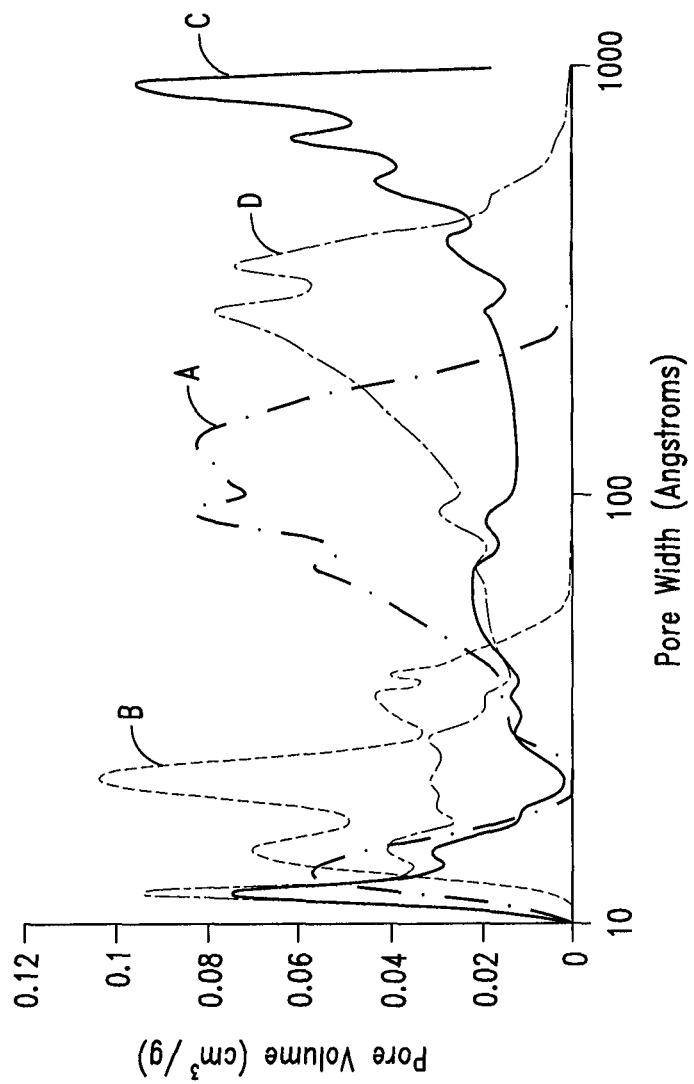
FIG. 1 shows a range of different pore sizes for different embodiments of the disclosed carbon materials.

In the following description, certain specific details are set forth in order to provide a thorough understanding of various embodiments. However, one skilled in the art will understand that the invention may be practiced without these details. In other instances, well-known structures have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

DEFINITIONS

As used herein, and unless the context dictates otherwise, the following terms have the meanings as specified below.

"Carbon material" refers to a material or substance comprised substantially of carbon. Carbon materials include ultrapure as well as amorphous and crystalline carbon materials. Examples of carbon materials include, but are not limited to, activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like.

A "bi-functional catalyst" refers to a material which acts as a catalyst in both oxidation and reduction reactions. Bi-functional catalysts may be comprised of a single component or of several phases for example in the case where one component is catalytic for oxidation and the other is catalytic for reduction. Bi-functional catalysts within the context of the present disclosure include metals such as: iron, nickel, cobalt, manganese, copper, ruthenium, rhodium, palladium, osmium, iridium, gold, hafnium, platinum, titanium, rhenium, tantalum, thallium, vanadium, niobium, scandium, chromium, gallium, zirconium, molybdenum and oxides thereof (e.g., nickel oxide, iron oxide, etc.) as well as alloys thereof. Bi-functional catalysts also include carbides such as lithium carbide, magnesium carbide, sodium carbide, calcium carbide, boron carbide, silicon carbide, titanium carbide, zirconium carbide, hafnium carbide, vanadium carbide, niobium carbide, tantalum carbide, chromium carbide, molybdenum carbide, tungsten carbide, iron carbide, manganese carbide, cobalt carbide, nickel carbide and the like. Bi-functional catalysts may be present in elemental form, oxidized form (e.g., metal oxides, metal salts, etc.) or as part of a chemical compound.

"Amorphous" refers to a material, for example an amorphous carbon material, whose constituent atoms, molecules, or ions are arranged randomly without a regular repeating pattern. Amorphous materials may have some localized crystallinity (i.e., regularity) but lack long-range order of the positions of the atoms. Pyrolyzed and/or activated carbon materials are generally amorphous.

"Crystalline" refers to a material whose constituent atoms, molecules, or ions are arranged in an orderly repeating pattern. Examples of crystalline carbon materials include, but are not limited to, diamond and graphene.

"Synthetic" refers to a substance which has been prepared by chemical means rather than from a natural source. For example, a synthetic carbon material is one which is synthesized from precursor materials and is not isolated from natural sources.

"Impurity" or "impurity element" refers to an undesired foreign substance (e.g., a chemical element) within a material which differs from the chemical composition of the base material. For example, an impurity in a carbon material refers to any element or combination of elements, other than carbon or an intentionally impregnated bi-functional catalyst or other metal, which is present in the carbon material. Impurity levels are typically expressed in parts per million (ppm).

"PIXE impurity" or "PIXE element" is any impurity element having an atomic number ranging from 11 to 92 (i.e., from sodium to uranium). The phrases "total PIXE impurity content" and "total PIXE impurity level" both refer to the sum of all PIXE impurities present in a sample, for example, a polymer gel or a carbon material. PIXE impurity concentrations and identities may be determined by proton induced x-ray emission (PIXE).

"Ultrapure" refers to a substance having a total PIXE impurity content of less than 0.050%. For example, an "ultrapure carbon material" is a carbon material having a total PIXE impurity content of less than 0.050% (i.e., 500 ppm).

"Ash content" refers to the nonvolatile inorganic matter which remains after subjecting a substance to a high decomposition temperature. Herein, the ash content of a carbon material is calculated from the total PIXE impurity content as measured by proton induced x-ray emission, assuming that nonvolatile elements are completely converted to expected combustion products (i.e., oxides).

"Polymer" refers to a macromolecule comprised of two or more structural repeating units.

"Synthetic polymer precursor material" or "polymer precursor" refers to compounds used in the preparation of a synthetic polymer. Examples of polymer precursors that can be used in certain embodiments of the preparations disclosed herein include, but are not limited to, aldehydes (i.e., HC($=$O)R, where R is an organic group), such as for example, methanal (formaldehyde); ethanal (acetaldehyde);

propanal (propionaldehyde); butanal (butyraldehyde); glucose; benzaldehyde and cinnamaldehyde. Other exemplary polymer precursors include, but are not limited to, phenolic compounds such as phenol and polyhydroxy benzenes, such as dihydroxy or trihydroxy benzenes, for example, resorcinol (i.e., 1,3-dihydroxy benzene), catechol, hydroquinone, and phloroglucinol. Mixtures of two or more polyhydroxy benzenes are also contemplated within the meaning of polymer precursor.

"Monolithic" refers to a solid, three-dimensional structure that is not particulate in nature.

"Sol" refers to a colloidal suspension of precursor particles (e.g., polymer precursors), and the term "gel" refers to a wet three-dimensional porous network obtained by condensation or reaction of the precursor particles.

"Polymer gel" refers to a gel in which the network component is a polymer; generally a polymer gel is a wet (aqueous or non-aqueous based) three-dimensional structure comprised of a polymer formed from synthetic precursors or polymer precursors.

"Sol gel" refers to a sub-class of polymer gel where the polymer is a colloidal suspension that forms a wet three-dimensional porous network obtained by reaction of the polymer precursors.

"Polymer hydrogel" or "hydrogel" refers to a subclass of polymer gel or gel wherein the solvent for the synthetic precursors or monomers is water or mixtures of water and one or more water-miscible solvent.

"RF polymer hydrogel" refers to a sub-class of polymer gel wherein the polymer was formed from the catalyzed reaction of resorcinol and formaldehyde in water or mixtures of water and one or more water-miscible solvent.

"Acid" refers to any substance that is capable of lowering the pH of a solution. Acids include Arrhenius, Brønsted and Lewis acids. A "solid acid" refers to a dried or granular compound that yields an acidic solution when dissolved in a solvent. The term "acidic" means having the properties of an acid.

"Base" refers to any substance that is capable of raising the pH of a solution. Bases include Arrhenius, Brønsted and Lewis bases. A "solid base" refers to a dried or granular compound that yields basic solution when dissolved in a solvent. The term "basic" means having the properties of a base.

"Mixed solvent system" refers to a solvent system comprised of two or more solvents, for example, two or more miscible solvents. Examples of binary solvent systems (i.e., containing two solvents) include, but are not limited to: water and acetic acid; water and formic acid; water and propionic acid; water and butyric acid and the like. Examples of ternary solvent systems (i.e., containing three solvents) include, but are not limited to: water, acetic acid, and ethanol; water, acetic acid and acetone; water, acetic acid, and formic acid; water, acetic acid, and propionic acid; and the like. The present invention contemplates all mixed solvent systems comprising two or more solvents.

"Miscible" refers to the property of a mixture wherein the mixture forms a single phase over certain ranges of temperature, pressure, and composition.

"Catalyst" is a substance which alters the rate of a chemical reaction. Catalysts participate in a reaction in a cyclic fashion such that the catalyst is cyclically regenerated. The present disclosure contemplates catalysts which are sodium free. The catalyst used in the preparation of a ultrapure polymer gel as described herein can be any compound that facilitates the polymerization of the polymer precursors to form an ultrapure polymer gel. A "volatile catalyst" is a catalyst which has a tendency to vaporize at or below atmospheric pressure. Exemplary volatile catalysts include, but are not limited to, ammonium salts, such as ammonium bicarbonate, ammonium carbonate, ammonium hydroxide, and combinations thereof.

"Solvent" refers to a substance which dissolves or suspends reactants (e.g., ultrapure polymer precursors) and provides a medium in which a reaction may occur. Examples of solvents useful in the preparation of the gels, ultrapure polymer gels, ultrapure synthetic carbon materials and ultrapure synthetic amorphous carbon materials disclosed herein include, but are not limited to, water, alcohols and mixtures thereof. Exemplary alcohols include ethanol, t-butanol, methanol and mixtures thereof. Such solvents are useful for dissolution of the synthetic ultrapure polymer precursor materials, for example dissolution of a phenolic or aldehyde compound. In addition, in some processes such solvents are employed for solvent exchange in a polymer hydrogel (prior to freezing and drying), wherein the solvent from the polymerization of the precursors, for example, resorcinol and formaldehyde, is exchanged for a pure alcohol. In one embodiment of the present application, a cryogel is prepared by a process that does not include solvent exchange.

"Dried gel" or "dried polymer gel" refers to a gel or polymer gel, respectively, from which the solvent, generally water, or mixture of water and one or more water-miscible solvents, has been substantially removed.

"Pyrolyzed dried polymer gel" refers to a dried polymer gel which has been pyrolyzed but not yet activated, while an "activated dried polymer gel" refers to a dried polymer gel which has been activated.

"Cryogel" refers to a dried gel that has been dried by freeze drying.

"RF cryogel" refers to a dried gel that has been dried by freeze drying wherein the gel was formed from the catalyzed reaction of resorcinol and formaldehyde.

"Pyrolyzed cryogel" is a cryogel that has been pyrolyzed but not yet activated.

"Activated cryogel" is a cryogel which has been activated to obtain activated carbon material.

"Xerogel" refers to a dried gel that has been dried by air drying, for example, at or below atmospheric pressure.

"Pyrolyzed xerogel" is a xerogel that has been pyrolyzed but not yet activated.

"Activated xerogel" is a xerogel which has been activated to obtain activated carbon material.

"Aerogel" refers to a dried gel that has been dried by supercritical drying, for example, using supercritical carbon dioxide.

"Pyrolyzed aerogel" is an aerogel that has been pyrolyzed but not yet activated.

"Activated aerogel" is an aerogel which has been activated to obtain activated carbon material.

"Organic extraction solvent" refers to an organic solvent added to a polymer hydrogel after polymerization of the polymer precursors has begun, generally after polymerization of the polymer hydrogel is complete.

"Rapid multi-directional freezing" refers to the process of freezing a polymer gel by creating polymer gel particles from a monolithic polymer gel, and subjecting said polymer gel particles to a suitably cold medium. The cold medium can be, for example, liquid nitrogen, nitrogen gas, or solid carbon dioxide. During rapid multi-directional freezing nucleation of ice dominates over ice crystal growth. The suitably cold medium can be, for example, a gas, liquid, or solid with a temperature below about $-10°$ C. Alternatively, the suitably cold medium can be a gas, liquid, or solid with a temperature below about −20° C. Alternatively, the suitably cold medium can be a gas, liquid, or solid with a temperature below about −30° C.

"Activate" and "activation" each refer to the process of heating a raw material or carbonized/pyrolyzed substance at an activation dwell temperature during exposure to oxidizing atmospheres (e.g., carbon dioxide, oxygen, steam or combinations thereof) to produce an "activated" substance (e.g., activated cryogel or activated carbon material). The activation process generally results in a stripping away of the surface of the particles, resulting in an increased surface area. Alternatively, activation can be accomplished by chemical means, for example, by impregnation of carbon-containing precursor materials with chemicals such as acids like phosphoric acid or bases like potassium hydroxide, sodium hydroxide or salts like zinc chloride, followed by carbonization. "Activated" refers to a material or substance, for example a carbon material, which has undergone the process of activation.

"Carbonizing", "pyrolyzing", "carbonization" and "pyrolysis" each refer to the process of heating a carbon-containing substance at a pyrolysis dwell temperature in an inert atmosphere (e.g., argon, nitrogen or combinations thereof) or in a vacuum such that the targeted material collected at the end of the process is primarily carbon. "Pyrolyzed" refers to a material or substance, for example a carbon material, which has undergone the process of pyrolysis.

"Dwell temperature" refers to the temperature of the furnace during the portion of a process which is reserved for maintaining a relatively constant temperature (i.e., neither increasing nor decreasing the temperature). For example, the pyrolysis dwell temperature refers to the relatively constant temperature of the furnace during pyrolysis, and the activation dwell temperature refers to the relatively constant temperature of the furnace during activation.

"Pore" refers to an opening or depression in the surface, or a tunnel in a carbon material, such as for example activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like. A pore can be a single tunnel or connected to other tunnels in a continuous network throughout the structure.

"Pore structure" refers to the layout of the surface of the internal pores within a carbon material, such as an activated carbon material. Components of the pore structure include pore size, pore volume, surface area, density, pore size distribution and pore length. Generally the pore structure of activated carbon material comprises micropores and mesopores.

"Mesopore" generally refers to pores having a diameter between 2 nanometers and about 50 nanometers while the term "micropore" refers to pores having a diameter less than 2 nanometers. Mesoporous carbon materials comprise greater than 50% of their total pore volume in mesopores while microporous carbon materials comprise greater than 50% of their total pore volume in micropores.

"Bulk porosity" refers to inter particle pores or spaces, i.e., the space between particles or materials. Unless explicitly stated or the context requires otherwise, the terms pore size, pore volume, pore density, etc. relates to the intraparticle pores.

"Monodisperse" when used in reference to a pore size refers to a span of about 3 or less, alternatively about 2 or less, alternatively about 1.5 or less. In this context, "span" is further defined as described in the art as (Dv90-Dv10)/Dv50 where Dv10, Dv50 and Dv90 refer to the pore size at 10%, 50% and 90% of the distribution by volume.

"Surface area" refers to the total specific surface area of a substance measurable by the BET technique. Surface area is typically expressed in units of $m^2/g$. The BET (Brunauer/Emmett/Teller) technique employs an inert gas, for example nitrogen, to measure the amount of gas adsorbed on a material and is commonly used in the art to determine the accessible surface area of materials.

"Connected" when used in reference to mesopores and micropores refers to the spatial orientation of such pores.

"Effective length" refers to the portion of the length of the pore that is of sufficient diameter such that it is available to accept salt ions from the electrolyte.

"Electrode" refers to a conductor through which electricity enters or leaves an object, substance or region.

"Binder" refers to a material capable of holding individual particles of a substance (e.g., a carbon material) together such that after mixing a binder and the particles together the resulting mixture can be formed into sheets, pellets, disks or other shapes. Non-exclusive examples of binders include fluoro polymers, such as, for example, PTFE (polytetrafluoroethylene, Teflon), PFA (perfluoroalkoxy polymer resin, also known as Teflon), FEP (fluorinated ethylene propylene, also known as Teflon), ETFE (polyethylenetetrafluoroethylene, sold as Tefzel and Fluon), PVF (polyvinyl fluoride, sold as Tedlar), ECTFE (polyethylenechlorotrifluoroethylene, sold as Halar), PVDF (polyvinylidene fluoride, sold as Kynar), PCTFE (polychlorotrifluoroethylene, sold as Kel-F and CTFE), trifluoroethanol and combinations thereof.

"Inert" refers to a material that is not active in the electrolyte of an electrical energy storage device, that is it does not absorb a significant amount of ions or change chemically, e.g., degrade.

"Conductive" refers to the ability of a material to conduct electrons through transmission of loosely held valence electrons.

"Current collector" refers to a part of an electrical energy storage and/or distribution device which provides an electrical connection to facilitate the flow of electricity in to, or out of, the device. Current collectors often comprise metal and/or other conductive materials and may be used as a backing for electrodes to facilitate the flow of electricity to and from the electrode.

"Electrolyte" means a substance containing free ions such that the substance is electrically conductive. Electrolytes are commonly employed in electrical energy storage devices. Examples of electrolytes include, but are not limited to, solvents such as propylene carbonate, ethylene carbonate, butylene carbonate, dimethyl carbonate, methyl ethyl carbonate, diethyl carbonate, sulfolane, methylsulfolane, acetonitrile or mixtures thereof in combination with solutes such as lithium salts, including $LiPF_6$, $LiBF_4$ or $LiClO_4$ tetralkylammonium salts such as TEA TFB (tetraethylammonium tetrafluoroborate), MTEATFB (methyltriethylammonium tetrafluoroborate), EMITFB (1-ethyl-3-methylimidazolium tetrafluoroborate), tetraethylammonium, triethylammonium based salts or mixtures thereof. In some embodiments, the electrolyte can be a water-based acid or water-based base electrolyte.

"Majority" refers to more than 50%, for example, at least 60%, at least 75%, at least 80% or at least 90%.

"Elemental form" refers to a chemical element having an oxidation state of zero (e.g., metallic nickel, etc.).

"Oxidized form" refers to a chemical element having an oxidation state greater than zero.

A. Carbon Materials and Polymer Gels

The carbon materials disclosed herein comprise a pore structure optimized for use in electrical energy storage and distribution devices. For example, in certain embodiments the carbon materials comprise a mesoporous pore structure. In other embodiments the carbon materials are predominately microporous or comprise an optimized blend of micropores and mesopores. The pore structure allows for incorporation of metals (e.g., bi-functional catalysts and other metals) while also allowing for maximum deposition of reaction products and ion flow. In certain embodiments, the carbon materials are ultrapure (excluding the intentionally impregnated bi-functional catalyst or other metal). Such ultrapurity provides for enhanced electrochemical performance of electrodes prepared from the carbon materials due to elimination of side reactions associated with unwanted impurities. Accordingly, the carbon materials find utility as electrode material in lithium-air batteries. Such batteries comprise increased specific energy and longer active life compared to previously known batteries.

The high purity and pore structure of the disclosed carbon materials can be attributed to the disclosed sol gel and impregnation processes. Applicants have discovered that when one or more polymer precursors, for example a phenolic compound and an aldehyde, are co-polymerized under acidic conditions in the presence of a volatile basic catalyst, an ultrapure polymer gel results. This is in contrast to other reported methods for the preparation of polymer gels which result in polymer gels comprising residual levels of undesired impurities. The ultrapure polymer gels can be pyrolyzed by heating in an inert atmosphere (e.g., nitrogen) to yield the disclosed carbon materials comprising a high surface area and high pore volume. These carbon materials can be further activated without the use of chemical activation techniques—which introduce impurities—to obtain ultrapure activated carbon materials.

Bi-functional catalysts, or other metals, can be incorporated into the carbon materials at various stages of the sol gel process. For example, metals and/or metal compounds (e.g., salts and the like) can be incorporated during the polymerization stage, into the polymer gel (wet or dried) or into the pyrolyzed or activated carbon materials. The unique porosity and high surface area of the carbon materials provides for electrodes having improved active life and power performance relative to electrodes prepared from known carbon materials. The various physical and chemical properties of the carbon materials, and polymer gels from which they may be prepared, are discussed in more detail below.

1. Polymer Gels

Polymer gels are intermediates in the preparation of the disclosed carbon materials. As such, the physical and chemical properties of the polymer gels contribute to the properties of the carbon materials. Accordingly, in some embodiments the polymer gel comprises a bi-functional catalyst. In other embodiments, the polymer gel comprises another type of metal. For example, in some embodiments, the polymer gel comprises at least 0.001%, at least 0.01%, at least 0.05%, at least 0.10%, at least 0.25%, at least 0.50%, at least 1.0%, at least 2.5%, at least 5.0%, at least 7.5%, at least 10%, at least 25%, at least 50%, at least 75%, at least 90%, or at least 95% of the bi-functional catalyst, or in other embodiments the polymer gel comprises the foregoing amounts of another type of purposely impregnated metal. The percent of bi-functional catalyst or other metal is calculated on a weight percent basis (wt %).

In some embodiments, the bi-functional catalyst comprises iron, nickel, cobalt, manganese, copper, ruthenium, rhodium, palladium, osmium, iridium, gold, hafnium, platinum, titanium, rhenium, tantalum, thallium, vanadium, niobium, scandium, chromium, gallium, zirconium, molybdenum or combinations thereof. For example, certain embodiments of the polymer gels comprise nickel, iron, manganese or combinations thereof. In some other embodiments, the bi-functional catalyst is iron, nickel or manganese. In other embodiments, the polymer gels comprise lithium carbide, magnesium carbide, sodium carbide, calcium carbide, boron carbide, silicon carbide, titanium carbide, zirconium carbide, hafnium carbide, vanadium carbide, niobium carbide, tantalum carbide, chromium carbide, molybdenum carbide, tungsten carbide, iron carbide, manganese carbide, cobalt carbide, nickel carbide or a combination thereof. For example, in one embodiment the polymer gel comprises tungsten carbide. Bi-functional catalysts may be present in elemental form, oxidized form (e.g., metal oxides, metal salts, etc.) or as part of a chemical compound or alloy.

The present disclosure also provides polymer gels comprising other metals. For instance, in some embodiments the polymer gels comprise lead, tin, antimony, bismuth, arsenic, tungsten, silver, zinc, cadmium or indium. For example, in some specific embodiments the polymer gels comprise silver.

In other embodiments, the polymer gel comprises a total of less than 500 ppm of all other elements (i.e., excluding the intentionally impregnated bi-functional catalyst or other intentionally impregnated metal) having atomic numbers ranging from 11 to 92. For example, in some other embodiments the polymer gel comprises less than 200 ppm, less than 100 ppm, less than 50 ppm, less than 25 ppm, less than 10 ppm, less than 5 ppm or less than 1 ppm of all other elements having atomic numbers ranging from 11 to 92. In some embodiments, the bi-functional catalyst content and impurity content of the polymer gels can be determined by proton induced x-ray emission (PIXE) analysis.

The present disclosure provides polymer gels in various forms, depending on the method of manufacture. For example, in some embodiments, the polymer gel is a dried polymer gel, for example, a polymer cryogel. In other embodiments, the dried polymer gel is a polymer xerogel or a polymer aerogel. In some embodiments, the polymer gels are prepared from phenolic compounds and aldehyde compounds, for example, in one embodiment, the polymer gels can be produced from resorcinol and formaldehyde. In other embodiments, the polymer gels are produced under acidic conditions. In some embodiments, acidity can be provided by dissolution of a solid acid compound, by employing an acid as the reaction solvent or by employing a mixed solvent system where one of the solvents is an acid. Preparation of the polymer gels is described in more detail below.

The disclosed process comprises polymerization to form a polymer gel in the presence of a basic volatile catalyst. Accordingly, in some embodiments, the polymer gel comprises one or more salts, for example, in some embodiments the one or more salts are basic volatile salts. Examples of basic volatile salts include, but are not limited to, ammonium carbonate, ammonium bicarbonate, ammonium acetate, ammonium hydroxide, and combinations thereof. Accordingly, in some embodiments, the present disclosure provides a polymer gel comprising ammonium carbonate, ammonium bicarbonate, ammonium acetate, ammonium hydroxide, or combinations thereof. In further embodiments, the polymer gel comprises ammonium carbonate. In other further embodiments, the polymer gel comprises ammonium acetate.

The polymer gels may also comprise low ash content (excluding the bi-functional catalyst or other intentionally impregnated metal) which may contribute to the low ash content of a carbon material prepared therefrom. Thus, in some embodiments, the ash content of the polymer gel ranges from 0.1% to 0.001%. In other embodiments, the ash content of the polymer gel is less than 0.1%, less than 0.08%, less than 0.05%, less than 0.03%, less than 0.025%, less than 0.01%, less than 0.0075%, less than 0.005% or less than 0.001%. As used herein, ash content refers to the ash content of the polymer gel excluding the ash associated with the bi-functional catalyst or other intentionally impregnated metal.

In other embodiments, the polymer gel comprises a total PIXE impurity content of all other elements (i.e., except the bi-functional catalyst or other intentionally impregnated metal) of less than 500 ppm and an ash content (excluding bi-functional catalyst or other intentionally impregnated metal) of less than 0.08%. In a further embodiment, the polymer gel has a total PIXE impurity content of all other elements (i.e., except the bi-functional catalyst or other intentionally impregnated metal) of less than 300 ppm and an ash content (excluding bi-functional catalyst or other intentionally impregnated metal) of less than 0.05%. In another further embodiment, the polymer gel has a total PIXE impurity content of all other elements (i.e., except the bi-functional catalyst or other intentionally impregnated metal) of less than 200 ppm and an ash content (excluding bi-functional catalyst or other intentionally impregnated metal) of less than 0.02%. In another further embodiment, the polymer gel has a total PIXE impurity content of all other elements (i.e., except the bi-functional catalyst or other intentionally impregnated metal) of less than 200 ppm and an ash content (excluding bi-functional catalyst or other intentionally impregnated metal) of less than 0.01%. In another further embodiment, the polymer gel has a total PIXE impurity content of all other elements (i.e., except the bi-functional catalyst or other intentionally impregnated metal) of less than 100 ppm and an ash content (excluding bi-functional catalyst or other intentionally impregnated metal) of less than 0.01%. In another further embodiment, the polymer gel has a total PIXE impurity content of all other elements (i.e., except the bi-functional catalyst or other intentionally impregnated metal) of less than 50 ppm and an ash content (excluding bi-functional catalyst or other intentionally impregnated metal) of less than 0.01%. In another further embodiment, the polymer gel has a total PIXE impurity content of all other elements (i.e., except the bi-functional catalyst or other intentionally impregnated metal) of less than 25 ppm and an ash content (excluding bi-functional catalyst or other intentionally impregnated metal) of less than 0.01%.

Polymer gels comprising unwanted impurities generally yield carbon materials which also comprise impurities. Accordingly, one aspect of the present disclosure is a polymer gel with low levels of residual undesired impurities. In this regard, impurities refers to elements, other than carbon and any intentionally impregnated bi-functional catalyst or other metal. The amount of individual PIXE impurities present in the polymer gel can be determined by proton induced x-ray emission. In some embodiments, the level of sodium present in the polymer gel is less than 1000 ppm, less than 500 ppm, less than 100 ppm, less than 50 ppm, less than 10 ppm, or less than 1 ppm. In some embodiments, the level of magnesium present in the polymer gel is less than 1000 ppm, less than 100 ppm, less than 50 ppm, less than 10 ppm, or less than 1 ppm. In some embodiments, the level of aluminum present in the polymer gel is less than 1000 ppm, less than 100 ppm, less than 50 ppm, less than 10 ppm, or less than 1 ppm. In some embodiments, the level of silicon present in the polymer gel is less than 500 ppm, less than 300 ppm, less than 100 ppm, less than 50 ppm, less than 20 ppm, less than 10 ppm or less than 1 ppm. In some embodiments, the level of phosphorous present in the polymer gel is less than 1000 ppm, less than 100 ppm, less than 50 ppm, less than 10 ppm, or less than 1 ppm. In some embodiments, the level of sulfur present in the polymer gel is less than 1000 ppm, less than 100 ppm, less than 50 ppm, less than 30 ppm, less than 10 ppm, less than 5 ppm or less than 1 ppm. In some embodiments, the level of chlorine present in the polymer gel is less than 1000 ppm, less than 100 ppm, less than 50 ppm, less than 10 ppm, or less than 1 ppm. In some embodiments, the level of potassium present in the polymer gel is less than 1000 ppm, less than 100 ppm, less than 50 ppm, less than 10 ppm, or less than 1 ppm. In other embodiments, the level of calcium present in the polymer gel is less than 100 ppm, less than 50 ppm, less than 20 ppm, less than 10 ppm, less than 5 ppm or less than 1 ppm. In some embodiments, the level of chromium present in the polymer gel is less than 1000 ppm, less than 100 ppm, less than 50 ppm, less than 10 ppm, less than 5 ppm, less than 4 ppm, less than 3 ppm, less than 2 ppm or less than 1 ppm. In other embodiments, the level of iron present in the polymer gel is less than 50 ppm, less than 20 ppm, less than 10 ppm, less than 5 ppm, less than 4 ppm, less than 3 ppm, less than 2 ppm or less than 1 ppm. In other embodiments, the level of nickel present in the polymer gel is less than 20 ppm, less than 10 ppm, less than 5 ppm, less than 4 ppm, less than 3 ppm, less than 2 ppm or less than 1 ppm. In some other embodiments, the level of copper present in the polymer gel is less than 140 ppm, less than 100 ppm, less than 40 ppm, less than 20 ppm, less than 10 ppm, less than 5 ppm, less than 4 ppm, less than 3 ppm, less than 2 ppm or less than 1 ppm. In yet other embodiments, the level of zinc present in the polymer gel is less than 20 ppm, less than 10 ppm, less than 5 ppm, less than 2 ppm or less than 1 ppm. In yet other embodiments, the sum of all PIXE impurities (excluding the bi-functional catalyst) present in the polymer gel is less than 1000 ppm, less than 500 pm, less than 300 ppm, less than 200 ppm, less than 100 ppm, less than 50 ppm, less than 25 ppm, less than 10 ppm or less than 1 ppm. In some embodiments other impurities such as hydrogen, oxygen and/or nitrogen may be present in levels ranging from less than 10% to less than 0.01%.

In some embodiments, the polymer gels comprise unwanted PIXE impurities near or below the detection limit of the proton induced x-ray emission analysis. For example, in some embodiments, the polymer gels comprise less than 50 ppm sodium, less than 15 ppm magnesium, less than 10 ppm aluminum, less than 8 ppm silicon, less than 4 ppm phosphorous, less than 3 ppm sulfur, less than 3 ppm chlorine, less than 2 ppm potassium, less than 3 ppm calcium, less than 2 ppm scandium, less than 1 ppm titanium, less than 1 ppm vanadium, less than 0.5 ppm chromium, less than 0.25 ppm copper, less than 0.5 ppm zinc, less than 0.5 ppm gallium, less than 0.5 ppm germanium, less than 0.5 ppm arsenic, less than 0.5 ppm selenium, less than 1 ppm bromine, less than 1 ppm rubidium, less than 1.5 ppm strontium, less than 2 ppm yttrium, less than 3 ppm zirconium, less than 2 ppm niobium, less than 4 ppm molybdenum, less than 4 ppm, technetium, less than 6 ppm cadmium, less than 6 ppm indium, less than 5 ppm tin, less than 6 ppm antimony, less than 6 ppm tellurium, less than 5 ppm iodine, less than 4 ppm cesium, less than 4 ppm barium, less than 3 ppm lanthanum, less than 3 ppm cerium, less than 2 ppm praseodymium, less than 2 ppm, neodymium, less than 1.5 ppm promethium, less than 1 ppm samarium, less than 1 ppm europium, less than 1 ppm gadolinium, less than 1 ppm terbium, less than 1 ppm dysprosium, less than 1 ppm holmium, less than 1 ppm erbium, less than 1 ppm thulium, less than 1 ppm ytterbium, less than 1 ppm lutetium, less than 1 ppm hafnium, less than 1 ppm tantalum, less than 1.5 ppm rhenium, less than 1 ppm mercury, less than 1 ppm thallium, less than 1 ppm lead, less than 1.5 ppm bismuth, less than 2 ppm thorium, or less than 4 ppm uranium.

In some specific embodiments, the polymer gel comprises less than 100 ppm sodium, less than 300 ppm silicon, less than 100 ppm potassium, less than 50 ppm sulfur, less than 100 ppm calcium. In other specific embodiments, the polymer gel comprises less than 50 ppm sodium, less than 100 ppm silicon, less than 50 ppm potassium, less than 30 ppm sulfur, less than 50 ppm calcium. In other specific embodiments, the polymer gel comprises less than 50 ppm sodium, less than 50 ppm silicon, less than 30 pm potassium, less than 30 ppm sulfur, less than 30 ppm calcium.

The disclosed method yields a polymer gel comprising a high specific surface area, for example a dried polymer gel having a high specific surface area. Without being bound by theory, it is believed that the surface area of the dried polymer gel contributes, at least in part, to the desirable surface area properties of the carbon materials. The surface area can be measured using the BET technique well-known to those of skill in the art. In one embodiment of any of the aspects disclosed herein the dried polymer gel comprises a BET specific surface area of at least 150 m$^2$/g, at least 250 m$^2$/g, at least 400 m$^2$/g, at least 500 m$^2$/g, at least 600 m$^2$/g or at least 700 m$^2$/g, or at least 800 m$^2$/g, or at least 900 m$^2$/g, or at least 1000 m$^2$/g, or at least 1100 m$^2$/g.

In another embodiment, the dried polymer gel comprises a BET specific surface area ranging from 100 m$^2$/g to 1000 m$^2$/g. Alternatively, the dried polymer gel comprises a BET specific surface area ranging from 150 m$^2$/g to 700 m$^2$/g. Alternatively, the dried polymer gel comprises a BET specific surface area ranging from 400 m$^2$/g to 700 m$^2$/g.

In one embodiment, the dried polymer gel comprises a tap density ranging from 0.10 g/cc to 0.60 g/cc. In one embodiment, the dried polymer gel comprises a tap density ranging from 0.15 g/cc to 0.25 g/cc. In one embodiment of the present disclosure, the dried polymer gel comprises a BET specific surface area of at least 150 m$^2$/g and a tap density of less than 0.60 g/cc. Alternatively, the dried polymer gel comprises a BET specific surface area of at least 250 m$^2$/g and a tap density of less than 0.4 g/cc. In another embodiment, the dried polymer gel comprises a BET specific surface area of at least 500 m$^2$/g and a tap density of less than 0.30 g/cc.

In another embodiment of any of the aspects or variations disclosed herein the dried polymer gel comprises a residual water content of less than 15%, less than 13%, less than 10%, less than 5% or less than 1%.

In one embodiment, the dried polymer gel comprises a fractional pore volume of pores at or below 100 nm that comprises at least 50% of the total pore volume, at least 75% of the total pore volume, at least 90% of the total pore volume or at least 99% of the total pore volume. In another embodiment, the dried polymer gel comprises a fractional pore volume of pores at or below 50 nm that comprises at least 50% of the total pore volume, at least 75% of the total pore volume, at least 90% of the total pore volume or at least 99% of the total pore volume. In another embodiment, the dried polymer gel comprises a fractional pore volume of pores at or below 20 nm that comprises at least 50% of the total pore volume, at least 75% of the total pore volume, at least 90% of the total pore volume or at least 99% of the total pore volume. In another embodiment, the dried polymer gel comprises a fractional pore volume of pores ranging from 20 nm to 50 nm that comprises at least 50% of the total pore volume, at least 75% of the total pore volume, at least 90% of the total pore volume or at least 99% of the total pore volume.

In one embodiment, the dried polymer gel comprises a fractional pore surface area of pores at or below 100 nm that comprises at least 50% of the total pore surface area, at least 75% of the total pore surface area, at least 90% of the total pore surface area or at least 99% of the total pore surface area. In another embodiment, the dried polymer gel comprises a fractional pore surface area of pores at or below 50 nm that comprises at least 50% of the total pore surface area, at least 75% of the total pore surface area, at least 90% of the total pore surface or at least 99% of the total pore surface area. In another embodiment, the dried polymer gel comprises a fractional pore surface area of pores at or below 20 nm that comprises at least 50% of the total pore surface area, at least 75% of the total pore surface area, at least 90% of the total pore surface or at least 99% of the total pore surface area. In another embodiment, the dried polymer gel comprises a fractional pore surface area of pores ranging from 20 nm to 50 nm that comprises at least 50% of the total pore surface area, at least 75% of the total pore surface area, at least 90% of the total pore surface area or at least 99% of the total pore surface area.

As described in more detail below, methods for preparing the disclosed carbon materials may include pyrolysis of a polymer gel. In some embodiments, the pyrolyzed polymer gels have a surface area from about 100 to about 1200 m$^2$/g. In other embodiments, the pyrolyzed polymer gels have a surface area from about 500 to about 800 m$^2$/g. In other embodiments, the pyrolyzed polymer gels have a surface area from about 500 to about 600 m$^2$/g.

In other embodiments, the pyrolyzed polymer gels have a tap density from about 0.1 to about 1.0 g/cc. In other embodiments, the pyrolyzed polymer gels have a tap density from about 0.3 to about 0.6 g/cc. In other embodiments, the pyrolyzed polymer gels have a tap density from about 0.35 to about 0.45 g/cc. In yet other embodiments, the pyrolyzed polymer gels have a tap density from about 0.1 to about 0.25 g/cc.

The polymer gels can be prepared by the polymerization of one or more polymer precursors in an appropriate solvent system under catalytic conditions. The bi-functional catalyst can be incorporated into the gel either during or after the polymerization process. Accordingly, in one embodiment the polymer gel is prepared by admixing one or more miscible solvents, one or more phenolic compounds, one or more aldehydes, one or more catalysts and a bi-functional catalyst. For example in a further embodiment the polymer gel is prepared by admixing water, acetic acid, resorcinol, formaldehyde, ammonium acetate and a metal salt, for example nickel (II) acetate, iron (II) acetate, manganese (II) acetate or manganese (II) formate or the like. In other embodiments, a polymer gel comprising a bi-functional catalyst is prepared by contacting a polymerized gel (either wet or dried) with a source of the bi-functional catalyst, for example the foregoing metal salts. Preparation of polymers gels, and carbon materials, from the same is discussed in more detail below.

2. Carbon Materials

As noted above, the present disclosure is generally directed to carbon materials having properties optimized for use in certain electrochemical devices. Such carbon materials include those which are predominately mesoporous, predominately microporous and those which comprise an optimized blend of both mesopores and micropores. In one embodiment, mesoporous carbon materials comprising a bi-functional catalyst are provided. The disclosure also provides mesoporous carbon materials comprising other metals and devices comprising the same. While not wishing to be bound by theory, it is believed that the pore structure of the carbon materials allows maximum deposition of reaction byproducts to reduce clogging and inactivation of pores while also allowing for incorporation of a bi-functional catalyst (or other metal) to enhance the metal-air oxidation/reduction reaction. Accordingly, the carbon materials find particular utility as electrode material in lithium-air batteries. For example, as a gas (i.e., air) diffusion electrode in lithium-air batteries, other metal-air batteries and other electric storage devices, including ultracapacitors, fuel cells and other battery systems.

While not wishing to be bound by theory, it is believed that the purity profile, surface area, porosity and other properties of the carbon materials are a function of its preparation method, and variation of the preparation parameters may yield carbon materials having different properties. Accordingly, in some embodiments, the carbon material is a pyrolyzed dried polymer gel, for example, a pyrolyzed polymer cryogel, a pyrolyzed polymer xerogel or a pyrolyzed polymer aerogel. In other embodiments, the carbon material is activated (i.e., a synthetic activated carbon material). For example, in further embodiments the carbon material is an activated dried polymer gel, an activated polymer cryogel, an activated polymer xerogel or an activated polymer aerogel.

In some embodiments, the carbon material comprises at least 1,000 ppm of a bi-functional catalyst, for example, such carbon materials may be mesoporous in certain instances. Bi-functional catalysts useful within the context of the present disclosure include those metals having favorable electrical properties when incorporated in a carbon material, in particular, those useful as catalysts for the oxidation/reduction of $Li_2O_2$. For example, in certain embodiments the bi-functional catalyst comprises iron, nickel, cobalt, manganese, copper, ruthenium, rhodium, palladium, osmium, iridium, gold, hafnium, platinum, titanium, rhenium, tantalum, thallium, vanadium, niobium, scandium, chromium, gallium, zirconium, molybdenum or combinations thereof. For example, in some specific embodiments, the bi-functional catalyst comprises nickel. In other embodiments, the bi-functional catalyst comprises iron, and in other embodiments, the bi-functional catalyst comprises manganese. The bi-functional catalyst may be in the form of an oxide or an alloy.

Carbide compounds are also useful as bi-functional catalysts within the context of the present disclosure. Accordingly, some embodiments of the disclosed carbon materials comprise lithium carbide, magnesium carbide, sodium carbide, calcium carbide, boron carbide, silicon carbide, titanium carbide, zirconium carbide, hafnium carbide, vanadium carbide, niobium carbide, tantalum carbide, chromium carbide, molybdenum carbide, tungsten carbide, iron carbide, manganese carbide, cobalt carbide, nickel carbide or a combination thereof. In one specific embodiment, the carbon material comprises tungsten carbide. Tungsten carbide is isoelectronic with platinum, which is an excellent bi-functional oxygen catalyst. In some embodiments, at least a portion of lithium ion is exchanged with magnesium, sodium or calcium in carbide materials. Within these embodiments, in some instances specific locations for the formation of lithium oxide is provided.

Other metals may also impart useful properties to electrodes prepared from the carbon materials. Accordingly, in some embodiments the carbon materials comprise other metals (i.e., instead of the bi-functional catalyst), for example, lead, tin, antimony, bismuth, arsenic, tungsten, silver, zinc, cadmium, indium or a combinations thereof. For example, in one particular embodiment the carbon materials comprise silver. Electrodes and metal-air batteries comprising such carbon materials comprise enhanced electrochemical properties.

The content of unwanted impurities in the carbon material can also be controlled to impart desired electrochemical properties. Thus, in some embodiments of the disclosed carbon material, the carbon material comprises a total of less than 1000 ppm of all other elements (excluding any intentionally added bi-functional catalyst or other intentionally impregnated metal) having atomic numbers ranging from 11 to 92, for example, less than 500 ppm, less than 200 ppm, less than 100 ppm, less than 50 ppm, less than 25 ppm, less than 10 ppm, less than 5 ppm or less than 1 ppm. In certain embodiments the bi-functional catalyst content (or other metal) and/or the PIXE impurity content is measured by proton induced x-ray emission analysis.

The bi-functional catalyst can be a source of metal elements. For example, in some embodiments the bi-functional catalyst comprises a metal salt. In other embodiments, the bi-functional catalyst comprises one or more metal elements in elemental form, for example elemental nickel, iron or manganese. In other embodiments, the bi-functional catalyst comprises one or more metal elements in oxidized form, for nickel (II) oxide, iron (II) oxide or manganese (II) oxide.

When a bi-functional catalyst is present, the electrochemical properties of the carbon materials can be modified, at least in part, by the amount of the bi-functional catalyst (or other metal) in the carbon material. Accordingly, in some embodiments, the carbon material comprises at least 0.001%, at least 0.01%, at least 0.05%, at least 0.10%, at least 0.25%, at least 0.50%, at least 1.0%, at least 2.5%, at least 5.0%, at least 7.5%, at least 10%, at least 25%, at least 50%, at least 75%, at least 90%, at least 95%, at least 99% or at least 99.5% of the bi-functional catalyst. For example, in some embodiments, the carbon materials comprise between 0.5% and 99.5% activated carbon and between 0.5% and 99.5% bi-functional catalyst. In some other embodiments, the carbon materials comprise the foregoing amounts of another type of metal (instead of the bi-functional catalyst). Such other metals include lead, tin, antimony, bismuth, arsenic, tungsten, silver, zinc, cadmium and indium. The percent of the bi-functional catalyst (or other metal) is calculated on weight percent basis (wt %). In some other more specific embodiments of the foregoing, the bi-functional catalyst comprises nickel. In yet other embodiments of the foregoing, the bi-functional catalyst comprises iron, and in some other more specific embodiments of the foregoing, the bi-functional catalyst comprises manganese.

In one embodiment, the bi-functional catalyst has a melting temperature (M.P.) in excess of the pyrolysis and/or activation temperature used for preparation of the carbon material.

In other embodiments, the bi-functional catalyst is derived from a metal complex comprising a metal centered porphyrin and a metal, wherein the metal is iron, nickel, cobalt, manganese, copper, ruthenium, rhodium, palladium, osmium, iridium, platinum, and a combination thereof. Said complexes may be comprised of low-molecular-weight species (for example <1000 Da molecular weight) or may be incorporated in organic macromolecules (for example >1000 Da molecular weight) such as polymers. In this context, embodiments of polymers include, but are not limited to, multi-ionogenic species such as peptides and protein, allowing for maintaining sequestration of metals over a relatively broad pH range in solution.

In other embodiments, the bi-functional catalyst is derived from a metal salt, for example a salt of Ni, Mn, Fe, Co, Cu, Au, Pt, Ru, Rh, Pd, W, Ti, V or Nb. Accordingly, some embodiments provide carbon materials wherein the bi-functional catalyst comprises Ni, Mn, Fe, Co, Cu, Au, Pt, Ru, Rh, Pd, W, Ti, V, Nb, or a combination thereof, for example, Ni, Fe, Mn or a combination thereof.

In other embodiments, the bi-functional catalyst is derived from a metal complex comprising a metal sequestered by a chelator. The chelator accomplishes the sequestration of the metal via multiple ionic bonding sites. Examples of chelators in this context include, but are not limited to EDTA and EGTA. Said chelators may be comprised of low-molecular-weight species (for example <1000 Da molecular weight) or may be incorporated in organic macromolecules (for example >1000 Da molecular weight) such as polymers. In this context, embodiments of polymers comprised multi-ionogenic species, allowing for maintaining sequestration of metals over a relatively broad pH range in solution.

The specific capacity (Q, Ah/gram carbon) of a mesoporous carbon material is defined by the amount of reaction product that can form on the pore surfaces. If the mixture of reaction products is constant, the current generated during reaction product formation is directly proportional to the volume of the reaction product. The high pore volume of the mesoporous carbons provides a reservoir for the reaction products (e.g., lithium peroxide) while still maintaining electrochemical activity in the pores present in the material. Such a high pore volume provides a significant increase in the energy density of a metal-air battery comprising the carbon materials. In some embodiments, the pore structure of the mesoporous carbon comprises pores ranging from 2-50 nm, 10-50 nm, 15-30 nm or even 20-30 nm.

Yet other aspects of the disclosure provide carbons that comprise a catalyst, for example as a coating or a mixture. In some embodiments, the catalyst is bi-functional in the oxidation-reduction reaction and finds utility in a variety of applications including metal-air batteries, biomimetic systems, and various chemical reactions.

Still other aspects of the disclosure provide carbon materials that have different electrolyte wetting characteristics. In certain embodiments, such carbon materials are mesoporous, while in other embodiments the carbon materials are microporous or comprise a blend of micropores and mesopores. For example, in some embodiments, the inner surfaces of the pores can be wetted by an electrolyte while the outer surface of the particles remains relatively un-wetted by the electrolyte such that gas diffusion can occur between particles. Still in other embodiments, the inner surface of the pore has a higher affinity for a solvent relative to the outer surface of the particle. Yet in other embodiments, the outer surface of the particle has a higher affinity for a solvent relative to the inner surface of the pore. In this manner, a wide range of applications are possible with the mesoporous materials disclosed herein. For example, when the inner surface of the pores have a higher affinity for a lithium ion solvent, the reaction products of lithium-air batteries are more likely to be trapped within the pores of such material. In another approach carbons which have different wetting characteristics can be combined in a blend whereby certain particles that repel electrolyte can be used for gas diffusion channels and other particles that are easily wetted by electrolytes can be used for ion conduction and electrochemical reactions.

Most commercial carbons are activated granular carbons which when pulverized contain macropores (usually sub micron sized) in the interstitial spaces between particles and micropores (<2 nm) inside the particles. The remaining commercially available carbons are carbon blacks which have essentially no internal porosity but can exist as very small particles which have void space that exists in the range of large mesopores or small macropores (e.g., at or above 50 nm). In contrast, the carbons of the present disclosure that can be used as a gas diffusion electrode are mesoporous, i.e., have intraparticle pores. In some embodiments, the majority of intraparticle pores are mesopores, for example in some embodiments greater than 50%, greater than 60%, greater than 70%, greater than 80% or greater than 90% of the pores are mesopores. In other embodiments, the mesoporous carbons comprise monodisperse mesopores. As used herein, the term "monodisperse" when used in reference to a pore size refers generally to a span (further defined as (Dv90-Dv10)/Dv, 50 where Dv10, Dv50 and Dv90 refer to the pore size at 10%, 50% and 90% of the distribution by volume of 3 or less, 2 or less or 1.5 or less.

Yet in other embodiments, the disclosed carbon materials comprise a pore volume of at least 1 cc/g, at least 2 cc/g, at least 3 cc/g, at least 4 cc/g, at least 5 cc/g, at least 6 cc/g, or at least 7 cc/g. In one particular embodiment, the carbon materials comprise a pore volume ranging from 1 cc/g to 7 cc/g. In other embodiments, the porosity of the sample can be greater than 50% or greater than 60%, or greater than 70%, or greater than 80%, or greater than 90%, or greater than 95%. In other embodiments, the carbon material comprises a BET specific surface area of at least 100, at least 500 $m^2/g$, at least 1000 $m^2/g$, at least 1500 $m^2/g$, at least 2000 $m^2/g$, at least 2400 $m^2/g$, at least 2500 $m^2/g$, at least 2750 $m^2/g$ or at least 3000 $m^2/g$.

In some embodiments, the mean particle diameter for the carbons ranges from 1 to 1000 microns. In other embodiments the mean particle diameter for the carbon ranges from 1 to 100 microns. Still in other embodiments the mean particle diameter for the carbon ranges from 5 to 50 microns. Yet in other embodiments, the mean particle diameter for the carbon ranges from 5 to 15 microns. Still in other embodiments, the mean particle diameter for the carbon is about 10 microns.

In another embodiment the size of the pores, for example mesopores, is controlled to produce a desired pore structure, e.g., for maximizing available surface. In some embodiments, the pore distribution in the carbon is controlled by controlling the pore distribution in the gel as discussed below. In further embodiments of the foregoing, the carbon is a mesoporous carbon.

In some embodiments, the pores of the carbon material comprise a peak pore volume ranging from 2 nm to 10 nm. In other embodiments, the peak pore volume ranges from 10 nm to 20 nm. Yet in other embodiments, the peak pore volume ranges from 20 nm to 30 nm. Still in other embodiments, the peak pore volume ranges from 30 nm to 40 nm. Yet still in other embodiments, the peak pore volume ranges from 40 nm to 50 nm. In other embodiments, the peak pore volume ranges from 50 nm to 100 nm.

In order to adjust the interaction between a liquid electrolyte and the surface of a the carbon material, the surface functionality of the carbon and/or the electrolyte can be modified. By using a variety of techniques, the present inventors have modified both the inner pore surface and the outer surface of the carbon either independently or in conjunction with one another. For example, in certain instances the surface functionality of a mesoporous carbon, or a microporous carbon, can be modified, for example by heat treatment or jet milling as described in more detail in the Examples. Additional examples of methods to modify the surface chemistry involve addition of surface active agents which can be combined with the carbon materials. Surface active agents include polymers, ionic surfactant, non-ionic surfactants, elemental modifiers such as Boron or Nitrogen and the like. Surface chemistry can also be adjusted by exposure to various gases at various temperatures such as CO, $NH_3$, $H_2$, $O_2$, or others known in the art to oxidize or reduce a surface.

The surface chemistry of the carbon materials can be modified in a variety of ways. For example, by adding a dopant (such as nitrogen containing monomers) to the sol, the mesoporous carbon can include functional groups with elements such as B, N, and O that are capable of modifying the surface wetting characteristics. The inner surface of the pores can also be easily treated with a variety of gas streams at temperatures up to 1200° C. during the kiln operations. This results in carbons with inner and outer pore surfaces with the desired functionality.

The size control of the carbons can be adjusted to manipulate the electrode characteristics and the surface. Size control can be achieved at the sol-gel stage where micro-beads of polymer can be created and their external surface modified by the environment in which they gel. Size control can also be achieved by micronization after the material has been carbonized in a jet mill where the milling gas affects the external surface of the carbon material. Such methods are described below.

The synthesis of carbon materials (e.g., mesoporous carbon materials) using methods disclosed herein allows for multiple routes to achieving incorporation of a catalyst. For example, the present inventors have incorporated transition metal salts into the sol of the carbon precursor. When the mesoporous carbon is produced, the result is nanoparticles of the desired metal incorporated into the amorphous structure of the mesoporous carbon with a substantial portion of this material exposed to the surface. This is believed to be due to the high surface to bulk ratio of the material in general. This approach can be utilized with the addition of kiln process to promote oxidation of the metals if an oxide catalyst is desired. The phase and crystal structure of the metal or oxide can also be adjusted by controlling the kiln temperature and time to produce various heat treatments. Another method is to allow the polymer to gel and then soak the wet gel in a catalyst containing solution. This method has been used successfully with active materials such as $V_2O_5$. When the doped polymer is dried and carbonized, the result is a coating of dopant material on the inner surfaces of pores of mesoporous carbon. Nanocomposites of mesoporous carbon and other materials have also been produced by the present inventors where the foreign substance is added after the mesoporous carbon is formed. This can be achieved as long as the desired material can be dispersed in a sol or solution such that the foreign material can diffuse into the pores of the mesoporous carbon. Once the material diffuses in, the solvent is removed and the result is a material that is confined to the nanophase inside the pores.

Suitable catalyst precursors include, but are not limited to, metal centered phthalocyanines, porphyrins and the like, which are commonly used as dyes. Adding these materials to the gel in catalytic amounts is one of the convenient methods for catalyst deposition. When decomposed, for example, during pyrolysis and activation of the primary carbon-forming materials, they form oxygen reduction catalysts. Additionally, in a metal-air battery, these compounds can be used as locations for lithium salt deposition. Several dye materials can be used in complementary fashion to coordinate the metal catalyst and the lithium salt in tandem.

A carbon catalyst poison can be used to protect mesoporous carbons of the invention. In the absence of such a carbon catalyst poison, mesoporous carbon can be oxidized in air electrodes by active oxygen intermediates such as peroxide, superoxide etc. Incorporating a carbon catalyst poison such as sulfur, arsenic, lead, mercury, thallium, and the like can inhibit or significantly reduce mesoporous carbon's ability to make such destructive oxygen species. Typically, the catalyst poison, when applied to the mesoporous carbon air electrode, reduces the formation rate of peroxide and/or superoxide intermediate by at least about 25%, often by at least about 50%, and more often substantially completely.

The catalyst poison can be incorporated into a mesoporous carbon at a variety of stages of mesoporous carbon formation. For example, the catalyst poison or its precursor can be introduced at the gel stage during the formation of a mesoporous carbon pre-cursor. Alternatively, it can be introduced at the dried gel stage during the formation of a mesoporous carbon pre-cursor. It can also be introduced during and/or after the pyrolysis stage of mesoporous carbon pre-cursor. In fact, the catalyst carbon or its precursor can be introduced or incorporated at any stage of the mesoporous carbon production as long as the catalyst poison is compatible with the process, i.e., no significant amount of catalyst poison is lost or inactivated. Accordingly, in some embodiments, the catalyst poison is introduced during the activation stage of mesoporous carbon synthesis. Still in other embodiments, the catalyst poison is introduced after the activation stage of mesoporous carbon synthesis.

It should be appreciated that combinations of various parameters described herein form other embodiments. For example, in one particular embodiment the carbons comprise a pore volume of at least about 2 cc/g and a specific surface area of at least 2000 m²/g. In this manner, a variety of embodiments are encompassed within the scope of the present invention.

As noted above, the carbon materials are unique in that some embodiments comprise a bi-functional catalyst while still maintaining an optimum pore structure for use in metal-air batteries. Accordingly, in one embodiment the carbon material comprises a pore volume of at least 0.35 cc/g, at least 0.30 cc/g, at least 0.25 cc/g, at least 0.20 cc/g or at least 0.15 cc/g for pores less than 20 angstroms. In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores greater than 20 angstroms.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 500 angstroms.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 1000 angstroms.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 2000 angstroms.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 5000 angstroms.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 1 micron.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 2 microns.

In other embodiments, the carbon material comprises a pore volume of at least 7 cc/g, at least 5 cc/g, at least 4.00 cc/g, at least 3.75 cc/g, at lest 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 3 microns.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 4 microns.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 5 microns.

In yet other embodiments, the carbon material comprises a total pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g.

In certain embodiments a mesoporous carbon material having very little microporosity (e.g., less than 30%, less than 20%, less than 10% or less than 5% microporosity) is provided. The pore volume and surface area of such carbon materials are advantageous for use as electrode material in certain embodiments. For example, the mesoporous carbon can be a polymer gel that has been pyrolyzed, but not activated. In some embodiments, the mesoporous carbon comprises a specific surface area of at least 400 $m^2/g$, at least 500 $m^2/g$, at least 600 $m^2/g$, at least 675 $m^2/g$ or at least 750 $m^2/g$. In other embodiments, the mesoporous carbon material comprises a total pore volume of at least 0.50 cc/g, at least 0.60 cc/g, at least 0.70 cc/g, at least 0.80 cc/g or at least 0.90 cc/g. In yet other embodiments, the mesoporous carbon material comprises a tap density of at least 0.05 g/cc, at least 0.10 g/cc, at least 0.20 g/cc, at least 0.30 g/cc, at least 0.35 g/cc, at least 0.40 g/cc, at least 0.45 g/cc, at least 0.50 g/cc or at least 0.55 g/cc.

In addition to low content of undesired PIXE impurities, the disclosed carbon materials (mesoporous, microporous, or blends of thereof) may comprise high total carbon content. In addition to carbon, the carbon material may also comprise oxygen, hydrogen, nitrogen. In some embodiments, the material comprises at least 75% carbon, 80% carbon, 85% carbon, at least 90% carbon, at least 95% carbon, at least 96% carbon, at least 97% carbon, at least 98% carbon, at least 99% carbon, at least 99.5% carbon, or at least 99.9% carbon on a weight/weight basis. In some other embodiments, the carbon material comprises less than 10% oxygen, less than 5% oxygen, less than 3.0% oxygen, less than 2.5% oxygen, less than 1% oxygen, less than 0.5%, or less than 0.1% oxygen on a weight/weight basis. In other embodiments, the carbon material comprises less than 10% hydrogen, less than 5% hydrogen, less than 2.5% hydrogen, less than 1% hydrogen, less than 0.5% hydrogen or less than 0.1% hydrogen on a weight/weight basis. In other embodiments, the carbon material comprises less than 5% nitrogen, less than 2.5% nitrogen, less than 1% nitrogen, less than 0.5% nitrogen, less than 0.25% nitrogen or less than 0.01% nitrogen on a weight/weight basis. The oxygen, hydrogen and nitrogen content of the disclosed carbon materials can be determined by combustion analysis. Techniques for determining elemental composition by combustion analysis are well known in the art.

The total ash content of a carbon material may, in some instances, have an effect on the electrochemical performance of a carbon material. Accordingly, in some embodiments, the ash content of the carbon material (excluding ash associated with any intentionally added bi-functional catalyst or other intentionally impregnated metal) ranges from 0.1% to 0.001% weight percent ash, for example in some specific embodiments the ash content of the carbon material is less than 0.1%, less than 0.08%, less than 0.05%, less than 0.03%, than 0.025%, less than 0.01%, less than 0.0075%, less than 0.005% or less than 0.001%. Within the context of the present disclosure, ash content refers to the total ash, excluding the ash associated with the bi-functional catalyst or other intentionally impregnated metal.

In other embodiments, the carbon material comprises a total PIXE impurity content of less than 500 ppm and an ash content of less than 0.08%. In further embodiments, the carbon material comprises a total PIXE impurity content of less than 300 ppm and an ash content of less than 0.05%. In other further embodiments, the carbon material comprises a total PIXE impurity content of less than 200 ppm and an ash content of less than 0.05%. In other further embodiments, the carbon material comprises a total PIXE impurity content of less than 200 ppm and an ash content of less than 0.025%. In other further embodiments, the carbon material comprises a total PIXE impurity content of less than 100 ppm and an ash content of less than 0.02%. In other further embodiments, the carbon material comprises a total PIXE impurity content of less than 50 ppm and an ash content of less than 0.01%.

The amount of individual PIXE impurities (i.e., excluding any intentionally added bi-functional catalyst or other intentionally impregnated metal) present in the disclosed carbon materials can be determined by proton induced x-ray emission. Individual PIXE impurities may contribute in different ways to the overall electrochemical performance of the disclosed carbon materials depending on the particular application. Thus, in some embodiments, the level of sodium present in the carbon material is less than 1000 ppm, less than 500 ppm, less than 100 ppm, less than 50 ppm, less than 10 ppm, or less than 1 ppm. In some embodiments, the level of magnesium present in the carbon material is less than 1000 ppm, less than 100 ppm, less than 50 ppm, less than 10 ppm, or less than 1 ppm. In some embodiments, the level of aluminum present in the carbon material is less than 1000 ppm, less than 100 ppm, less than 50 ppm, less than 10 ppm, or less than 1 ppm. In some embodiments, the level of silicon present in the carbon material is less than 500 ppm, less than 300 ppm, less than 100 ppm, less than 50 ppm, less than 20 ppm, less than 10 ppm or less than 1 ppm. In some embodiments, the level of phosphorous present in the carbon material is less than 1000 ppm, less than 100 ppm, less than 50 ppm, less than 10 ppm, or less than 1 ppm. In some embodiments, the level of sulfur present in the carbon material is less than 1000 ppm, less than 100 ppm, less than 50 ppm, less than 30 ppm, less than 10 ppm, less than 5 ppm or less than 1 ppm. In some embodiments, the level of chlorine present in the carbon material is less than 1000 ppm, less than 100 ppm, less than 50 ppm, less than 10 ppm, or less than 1 ppm. In some embodiments, the level of potassium present in the carbon material is less than 1000 ppm, less than 100 ppm, less than 50 ppm, less than 10 ppm, or less than 1 ppm. In other embodiments, the level of calcium present in the carbon material is less than 100 ppm, less than 50 ppm, less than 20 ppm, less than 10 ppm, less than 5 ppm or less than 1 ppm. In some embodiments, the level of chromium present in the carbon material is less than 1000 ppm, less than 100 ppm, less than 50 ppm, less than 10 ppm, less than 5 ppm, less than 4 ppm, less than 3 ppm, less than 2 ppm or less than 1 ppm. In other embodiments, the level of iron present in the carbon material is less than 50 ppm, less than 20 ppm, less than 10 ppm, less than 5 ppm, less than 4 ppm, less than 3 ppm, less than 2 ppm or less than 1 ppm. In other embodiments, the level of nickel present in the carbon material is less than 20 ppm, less than 10 ppm, less than 5 ppm, less than 4 ppm, less than 3 ppm, less than 2 ppm or less than 1 ppm. In some other embodiments, the level of copper present in the carbon material is less than 140 ppm, less than 100 ppm, less than 40 ppm, less than 20 ppm, less than 10 ppm, less than 5 ppm, less than 4 ppm, less than 3 ppm, less than 2 ppm or less than 1 ppm. In yet other embodiments, the level of zinc present in the carbon material is less than 20 ppm, less than 10 ppm, less than 5 ppm, less than 2 ppm or less than 1 ppm. In yet other embodiments, the sum of all other PIXE impurities present in the carbon material is less than 1000 ppm, less than 500 pm, less than 300 ppm, less than 200 ppm, less than 100 ppm, less than 50 ppm, less than 25 ppm, less than 10 ppm or less than 1 ppm. As noted above, in some embodiments other impurities such as hydrogen, oxygen and/or nitrogen may be present in levels ranging from less than 10% to less than 0.01%.

In some embodiments, the carbon material comprises undesired PIXE impurities near or below the detection limit of the proton induced x-ray emission analysis. For example, in some embodiments the carbon material comprises less than 50 ppm sodium, less than 15 ppm magnesium, less than 10 ppm aluminum, less than 8 ppm silicon, less than 4 ppm phosphorous, less than 3 ppm sulfur, less than 3 ppm chlorine, less than 2 ppm potassium, less than 3 ppm calcium, less than 2 ppm scandium, less than 1 ppm titanium, less than 1 ppm vanadium, less than 0.5 ppm chromium, less than 0.5 ppm manganese, less than 0.5 ppm iron, less than 0.25 ppm cobalt, less than 0.25 ppm nickel, less than 0.25 ppm copper, less than 0.5 ppm zinc, less than 0.5 ppm gallium, less than 0.5 ppm germanium, less than 0.5 ppm arsenic, less than 0.5 ppm selenium, less than 1 ppm bromine, less than 1 ppm rubidium, less than 1.5 ppm strontium, less than 2 ppm yttrium, less than 3 ppm zirconium, less than 2 ppm niobium, less than 4 ppm molybdenum, less than 4 ppm, technetium, less than 7 ppm rubidium, less than 6 ppm rhodium, less than 6 ppm palladium, less than 9 ppm silver, less than 6 ppm cadmium, less than 6 ppm indium, less than 5 ppm tin, less than 6 ppm antimony, less than 6 ppm tellurium, less than 5 ppm iodine, less than 4 ppm cesium, less than 4 ppm barium, less than 3 ppm lanthanum, less than 3 ppm cerium, less than 2 ppm praseodymium, less than 2 ppm, neodymium, less than 1.5 ppm promethium, less than 1 ppm samarium, less than 1 ppm europium, less than 1 ppm gadolinium, less than 1 ppm terbium, less than 1 ppm dysprosium, less than 1 ppm holmium, less than 1 ppm erbium, less than 1 ppm thulium, less than 1 ppm ytterbium, less than 1 ppm lutetium, less than 1 ppm hafnium, less than 1 ppm tantalum, less than 1 ppm tungsten, less than 1.5 ppm rhenium, less than 1 ppm osmium, less than 1 ppm iridium, less than 1 ppm platinum, less than 1 ppm silver, less than 1 ppm mercury, less than 1 ppm thallium, less than 1 ppm lead, less than 1.5 ppm bismuth, less than 2 ppm thorium, or less than 4 ppm uranium.

In some specific embodiments, the carbon material comprises less than 100 ppm sodium, less than 300 ppm silicon, less than 50 ppm sulfur, less than 100 ppm calcium, less than 20 ppm iron, less than 10 ppm nickel, less than 140 ppm copper, less than 5 ppm chromium and less than 5 ppm zinc as measured by proton induced x-ray emission. In other specific embodiments, the carbon material comprises less than 50 ppm sodium, less than 30 ppm sulfur, less than 100 ppm silicon, less than 50 ppm calcium, less than 10 ppm iron, less than 5 ppm nickel, less than 20 ppm copper, less than 2 ppm chromium and less than 2 ppm zinc.

In other specific embodiments, the carbon material comprises less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc.

In some other specific embodiments, the carbon material comprises less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese.

Certain embodiments of the disclosed carbon materials comprise a high surface area. While not wishing to be bound by theory, it is thought that such high surface area may contribute, at least in part, to their superior electrochemical performance. Accordingly, in some embodiments, the carbon material comprises a BET specific surface area of at least 100 $m^2/g$, at least 300 $m^2/g$, at least 500 $m^2/g$, at least 1000 $m^2/g$, at least 1500 $m^2/g$, at least 2000 $m^2/g$, at least 2400 $m^2/g$, at least 2500 $m^2/g$, at least 2750 $m^2/g$ or at least 3000 $m^2/g$. For example, in some embodiments of the foregoing, the carbon material is activated.

In another embodiment, the carbon material comprises a tap density between 0.1 and 1.0 g/cc, between 0.1 and 0.25 g/cc, between 0.2 and 0.8 g/cc, between 0.3 and 0.5 g/cc or between 0.4 and 0.5 g/cc. In another embodiment, the carbon material has a total pore volume of at least 0.1 cm$^3$/g, at least 0.2 cm$^3$/g, at least 0.3 cm$^3$/g, at least 0.4 cm$^3$/g, at least 0.5 cm$^3$/g, at least 0.7 cm$^3$/g, at least 0.75 cm$^3$/g, at least 0.9 cm$^3$/g, at least 1.0 cm$^3$/g, at least 1.1 cm$^3$/g, at least 1.2 cm$^3$/g, at least 1.3 cm$^3$/g, at least 1.4 cm$^3$/g, at least 1.5 cm$^3$/g, at least 1.6 cm$^3$/g, at least 2.0 cm$^3$/g, at least 2.5 cm$^3$/g or at least 3.0 cm$^3$/g. In some certain embodiments, the carbon materials comprise a tap density of between 0.1 and 0.25 g/cc and a total pore volume of at least 3.0 cm$^3$/g.

The pore size distribution of the disclosed carbon materials is one parameter that may have an effect on the electrochemical performance of the carbon materials. For example, carbon materials comprising micropores with a short effective length (i.e., less than 10 nm, less than 5, nm or less than 3 nm as measured by TEM) may be useful to enhance ion transport and maximize power. Accordingly, in one embodiment, the carbon material comprises a fractional pore volume of pores at or below 100 nm that comprises at least 50% of the total pore volume, at least 75% of the total pore volume, at least 90% of the total pore volume or at least 99% of the total pore volume. In other embodiments, the carbon material comprises a fractional pore volume of pores at or below 50 nm that comprises at least 50% of the total pore volume, at least 75% of the total pore volume, at least 90% of the total pore volume or at least 99% of the total pore volume. In other embodiments, the carbon material comprises a fractional pore volume of pores at or below 20 nm that comprises at least 50% of the total pore volume, at least 75% of the total pore volume, at least 90% of the total pore volume or at least 99% of the total pore volume. In other embodiments, the carbon material comprises a fractional pore volume of pores ranging from 50 nm to 20 nm that comprises at least 50% of the total pore volume, at least 75% of the total pore volume, at least 90% of the total pore volume or at least 99% of the total pore volume.

In another embodiment, the carbon material comprises a fractional pore surface area of pores at or below 100 nm that comprises at least 50% of the total pore surface area, at least 75% of the total pore surface area, at least 90% of the total pore surface area or at least 99% of the total pore surface area. In another embodiment, the carbon material comprises a fractional pore surface area of pores at or below 50 nm that comprises at least 50% of the total pore surface area, at least 75% of the total pore surface area, at least 90% of the total pore surface area or at least 99% of the total pore surface area. In another embodiment, the carbon material comprises a fractional pore surface area of pores at or below 20 nm that comprises at least 50% of the total pore surface area, at least 75% of the total pore surface area, at least 90% of the total pore surface area or at least 99% of the total pore surface area. In another embodiment, the carbon material comprises a fractional pore surface area of pores ranging from 50 nm to 20 nm that comprises at least 50% of the total pore surface area, at least 75% of the total pore surface area, at least 90% of the total pore surface area or at least 99% of the total pore surface area.

In another embodiment, the carbon material comprises pores predominantly in the range of 1000 angstroms or lower, for example 100 angstroms or lower, for example 50 angstroms or lower. Alternatively, the carbon material comprises micropores in the range of 0-20 angstroms and mesopores in the range of 20-500 angstroms. The ratio of pore volume or pore surface in the micropore range compared to the mesopore range can be in the range of 95:5 to 5:95.

As noted above, some embodiments of the present disclosure are directed to microporous carbon materials or carbon materials comprising an optimized blend of micropores and mesopores. Such carbon materials find utility in a number of devices, for example as a secondary electrode in hybrid EDLC/metal-air device as described below. Accordingly, in some embodiments the pore structure of the carbon materials comprises from 10% to 80% micropores. In other embodiments, the pore structure of the carbon materials comprises from 30% to 70% micropores. In other embodiments, the pore structure of the carbon materials comprises from 40% to 60% micropores. In other embodiments, the pore structure of the carbon materials comprises from 40% to 50% micropores. In other embodiments, the pore structure of the carbon materials comprises from 43% to 47% micropores. In certain embodiments, the pore structure of the carbon materials comprises about 45% micropores.

In some other embodiments, the pore structure of the carbon materials comprises from 10% to 80% mesopores. In other embodiments, the pore structure of the carbon materials comprises from 30% to 70% mesopores. In other embodiments, the pore structure of the carbon materials comprises from 40% to 60% mesopores. In other embodiments, the pore structure of the carbon materials comprises from 50% to 60% mesopores. In other embodiments, the pore structure of the carbon materials comprises from 53% to 57% mesopores. In other embodiments, the pore structure of the carbon materials comprises about 55% mesopores.

The optimized blend of micropores and mesopores within the carbon materials contributes to the enhanced electrochemical performance of the same. Thus, in some embodiments the pore structure of the carbon materials comprises from 10% to 80% micropores and from 10% to 80% mesopores. In other embodiments, the pore structure of the carbon materials comprises from 30% to 70% micropores and from 30% to 70% mesopores. In other embodiments, the pore structure of the carbon materials comprises from 40% to 60% micropores and from 40% to 60% mesopores. In other embodiments, the pore structure of the carbon materials comprises from 40% to 50% micropores and from 50% to 60% mesopores. In other embodiments, the pore structure of the carbon materials comprises from 43% to 47% micropores and from 53% to 57% mesopores. In other embodiments, the pore structure of the carbon materials comprises about 45% micropores and about 55% mesopores.

In other variations, the carbon materials do not have a substantial volume of pores greater than 20 nm. For example, in certain embodiments the carbon materials comprise less than 25%, less than 20%, less than 15%, less than 10%, less than 5%, less than 2.5% or even less than 1% of the total pore volume in pores greater than 20 nm.

In yet other embodiments, the carbon materials comprise a pore volume residing in pores of less than 20 angstroms of at least 0.2 cc/g and a pore volume residing in pores of between 20 and 300 angstroms of at least 0.8 cc/g. In yet other embodiments, the carbon materials comprise a pore volume residing in pores of less than 20 angstroms of at least 0.5 cc/g and a pore volume residing in pores of between 20 and 300 angstroms of at least 0.5 cc/g. In yet other embodiments, the carbon materials comprise a pore volume residing in pores of less than 20 angstroms of at least 0.6 cc/g and a pore volume residing in pores of between 20 and 300 angstroms of at least 2.4 cc/g. In yet other embodiments, the carbon materials comprise a pore volume residing in pores of less than 20 angstroms of at least 1.5 cc/g and a pore volume residing in pores of between 20 and 300 angstroms of at least 1.5 cc/g.

In another embodiment of the present disclosure, the carbon material is prepared by a method disclosed herein, for example, in some embodiments the carbon material is prepared by a method comprising pyrolyzing a dried polymer gel as disclosed herein. In some embodiments, the pyrolyzed polymer gel is further activated to obtain an activated carbon material. Mesoporous carbon materials according to the present disclosure can be prepared by any number of methods described in more detail below.

B. Preparation of Mesoporous Carbon Materials Comprising Bi-Functional Catalysts The present applicants have discovered that by using a sol-gel approach and methods discussed herein, mesoporous carbons comprising bi-functional catalysts with the desired characteristics can be produced. One such method involves modifying the polymerization of the sol-gel precursor material through modifications to the catalyst and solvent volume relative to solids content in the sol. These variables or reaction parameters can be adjusted to modify the size of the mesopores in the final carbon. Additional changes to the polymer precursor can be achieved using a drying technique as disclosed herein. For example, processing the dried polymer in a rotary kiln allows further structural controls to be exerted on the material by modifying the pyrolysis and activation parameters. These steps can be utilized to control the mesoporous carbon properties and produce a desired gas diffusion cathode. Accordingly, in one embodiment, a method for preparing a polymer gel comprising a pore structure comprising a majority of its pores in the mesopore size range is provided. In another embodiment, methods for preparing mesoporous carbon materials are provided. Details of the variable process parameters of the various embodiments of the disclosed methods are described below.

1. Preparation of Polymer Gels

The polymer gels may be prepared by a sol gel process. As such, the size of the mesopores may be controlled to produce a desired mesoporous carbon, e.g., for maximizing available surface. In some embodiments, the pore distribution in the mesoporous carbon is controlled by controlling the mesopore distribution in the gel. For example, the polymer gel may be prepared by co-polymerizing one or more polymer precursors in an appropriate solvent. In one embodiment, the one or more polymer precursors are co-polymerized under acidic conditions. In some embodiments, a first polymer precursor is a phenolic compound and a second polymer precursor is an aldehyde compound. In one embodiment, of the method the phenolic compound is phenol, resorcinol, catechol, hydroquinone, phloroglucinol, or a combination thereof; and the aldehyde compound is formaldehyde, acetaldehyde, propionaldehyde, butyraldehyde, benzaldehyde, cinnamaldehyde, or a combination thereof. In a further embodiment, the phenolic compound is resorcinol, phenol or a combination thereof, and the aldehyde compound is formaldehyde. In yet further embodiments, the phenolic compound is resorcinol and the aldehyde compound is formaldehyde.

In certain embodiments, a bi-functional catalyst (or other metal) is incorporated during the above described polymerization process. For example, in some embodiments, a bi-functional catalyst in the form of metal particles, metal paste, metal salt, metal oxide can be dissolved or suspended into the mixture from which the gel resin is produced. In some specific embodiments, the bi-functional catalyst is nickel, iron or manganese and is incorporated in the form of a salt, for example an acetate or formate salt. Combinations of the above salts may also be employed.

In some embodiments, the metal salt dissolved into the mixture from which the gel resin is produced is soluble in the reaction mixture. In this case, the mixture from which the gel resin is produced may contain an acid and/or alcohol which improves the solubility of the metal salt. The metal-containing polymer gel can be freeze dried, followed by pyrolysis and activation to result in metal-containing activated carbon suitable for use in metal-air batteries and other energy storage devices as discussed in more detail below.

The sol gel polymerization process is generally performed under catalytic conditions. Accordingly, in some embodiments, preparing the polymer gel comprises co-polymerizing one or more polymer precursors in the presence of a catalyst. In some embodiments, the catalyst comprises a basic volatile catalyst. For example, in one embodiment, the basic volatile catalyst comprises ammonium carbonate, ammonium bicarbonate, ammonium acetate, ammonium hydroxide, or combinations thereof. In a further embodiment, the basic volatile catalyst is ammonium carbonate. In another further embodiment, the basic volatile catalyst is ammonium acetate.

The molar ratio of catalyst to phenolic compound may have an effect on the final properties of the polymer gel as well as the final properties of the carbon materials, for example. Thus, in some embodiments such catalysts are used in the range of molar ratios of 5:1 to 2000:1 phenolic compound: catalyst. In some embodiments, such catalysts can be used in the range of molar ratios of 20:1 to 200:1 phenolic compound: catalyst. For example in other embodiments, such catalysts can be used in the range of molar ratios of 5:1 to 100:1 phenolic compound:catalyst.

The reaction solvent is another process parameter that may be varied to obtain the desired properties (e.g., surface area, porosity, purity, etc.) of the polymer gels and carbon materials. For example, various organic solvents and mixed aqueous-organic solvent systems can be used to dissolve polymer precursors and provide a matrix for the polymerization reaction. Examples of binary solvent systems (comprising two miscible solvent) that can be used in the preparation of polymer gels described herein include, but are not limited to, water and a carboxylic acid such as acetic acid, formic acid, propionic acid, butyric acid, and the like. Examples of ternary solvent systems (comprising three miscible solvents) that can be used in the preparation of polymer gels precursor include, but are not limited to, water, a carboxylic acid, and an alcohol; water, a carboxylic acid, and acetone; water, and two different carboxylic acids such as formic acid and acetic acid, acetic acid and propionic acid, and the like. Furthermore, mixed solvent systems containing four or more miscible solvents can also be used for the purpose of the invention.

In some embodiments, the solvent for preparation of the polymer gel is a mixed solvent system of water and a miscible co-solvent. For example, in certain embodiments the solvent comprises a water miscible acid. Examples of water miscible acids include, but are not limited to, propionic acid, acetic acid, and formic acid. In further embodiments, the solvent comprises a ratio of water-miscible acid to water of 99:1, 90:10, 75:25, 50:50, 25:75, 10:90 or 1:90. In other embodiments, acidity is provided by adding a solid acid to the reaction solvent.

In some other embodiments of the foregoing, the solvent for preparation of the polymer gel is acidic. For example, in certain embodiments the solvent comprises acetic acid. For example, in one embodiment, the solvent is 100% acetic acid. In other embodiments, a mixed solvent system is provided, wherein one of the solvents is acidic. For example, in one embodiment of the method the solvent is a binary solvent comprising acetic acid and water. In further embodiments, the solvent comprises a ratio of acetic acid to water of 99:1, 90:10, 75:25, 50:50, 25:75, 20:80, 10:90 or 1:90. In other embodiments, acidity is provided by adding a solid acid to the reaction solvent.

In some embodiments, the bi-functional catalyst (or other metal) is incorporated into the polymer gel after the polymerization step, for example either before or after drying of the polymer gel. For example, in some embodiments the polymer gel (either before or after drying) is impregnated with bi-functional catalyst by immersion in a metal salt solution or suspension. The metal salt solution or suspension may comprise acids and/or alcohols to improve solubility of the metal salt. In some embodiments, the metal salt comprises a nickel, iron or manganese salt, for example, an acetate or formate salt. In yet another variation, the polymer gel (either before or after drying) is contacted with a paste comprising the bi-functional catalyst. In yet another variation, the polymer gel (either before or after drying) is contacted with a metal or metal oxide sol comprising the desired bi-functional catalyst. The sol is a nanophase colloidal suspension which is maintained using control over pH and liquid solid interfacial properties such as surface tension, polarity, and solvent solid interactions.

Some embodiments of the disclosed method do not comprise a solvent exchange step (e.g., exchange t-butanol for water) prior to drying (e.g., lyophilization). For example, in one embodiment of any of the methods described herein, before freezing, the polymer gel or polymer gel particles are rinsed with water. In one embodiment, the average diameter of the polymer gel particles prior to freezing is less than 25 mm, for example, between 0.001 mm and 25 mm; alternately, the average diameter of the polymer gel particles prior to freezing is between 0.01 mm and 15 mm, for example, between 1.0 mm and 15 mm. In some examples, the polymer gel particles are between 1 mm and 10 mm. In further embodiments, the polymer gel particles are frozen via immersion in a medium having a temperature of below about −10° C., for example, below about −20° C., or alternatively below about −30° C. For example, the medium may be liquid nitrogen or ethanol (or other organic solvent) in dry ice or ethanol cooled by another means. In some embodiments, drying under vacuum comprises subjecting the frozen particles to a vacuum pressure of below about 1400 mTorr.

Other methods of rapidly freezing the polymer gel particles are also envisioned. For example, in another embodiment the polymer gel is rapidly frozen by co-mingling or physical mixing of polymer gel particles with a suitable cold solid, for example, dry ice (solid carbon dioxide). Another envisioned method comprises using a blast freezer with a metal plate at −60° C. to rapidly remove heat from the polymer gel particles scattered over its surface. Another method of rapidly cooling water in a polymer gel particle is to snap freeze the particle by pulling a high vacuum very rapidly (the degree of vacuum is such that the temperature corresponding to the equilibrium vapor pressure allows for freezing). Yet another method for rapid freezing comprises admixing a polymer gel with a suitably cold gas. In some embodiments the cold gas may have a temperature below about −10° C. In some embodiments the cold gas may have a temperature below about −20° C. In some embodiments the cold gas may have a temperature below about −30° C. In yet other embodiments, the gas may have a temperature of about −196° C. For example, in some embodiments, the gas is nitrogen. In yet other embodiments, the gas may have a temperature of about −78° C. For example, in some embodiments, the gas is carbon dioxide.

In other embodiments, the polymer gel particles are frozen on a lyophilizer shelf at a temperature of −20° C. or lower. For example, in some embodiments the polymer gel particles are frozen on the lyophilizer shelf at a temperature of −30° C. or lower. In some other embodiments, the polymer gel monolith is subjected to a freeze thaw cycle (from room temperature to −20° C. or lower and back to room temperature), physical disruption of the freeze-thawed gel to create particles, and then further lyophilization processing. For example, in some embodiments, the polymer gel monolith is subjected to a freeze thaw cycle (from room temperature to −30° C. or lower and back to room temperature), physical disruption of the freeze-thawed gel to create particles, and then further lyophilization processing.

In some embodiments of the methods described herein, the molar ratio of phenolic precursor to catalyst is from about 5:1 to about 2000:1 or the molar ratio of phenolic precursor to catalyst is from about 20:1 to about 200:1. In further embodiments, the molar ratio of phenolic precursor to catalyst is from about 25:1 to about 100:1. In further embodiments, the molar ratio of phenolic precursor to catalyst is from about 25:1 to about 50:1. In further embodiments, the molar ratio of phenolic precursor to catalyst is from about 100:1 to about 5:1.

In the specific embodiment wherein one of the polymer precursors is resorcinol and another polymer precursor is formaldehyde, the resorcinol to catalyst ratio can be varied to obtain the desired properties of the resultant polymer gel and carbon materials. In some embodiments of the methods described herein, the molar ratio of resorcinol to catalyst is from about 10:1 to about 2000:1 or the molar ratio of resorcinol to catalyst is from about 20:1 to about 200:1. In further embodiments, the molar ratio of resorcinol to catalyst is from about 25:1 to about 100:1. In further embodiments, the molar ratio of resorcinol to catalyst is from about 25:1 to about 50:1. In further embodiments, the molar ratio of resorcinol to catalyst is from about 100:1 to about 5:1.

Polymerization to form a polymer gel can be accomplished by various means described in the art. For instance, polymerization can be accomplished by incubating suitable polymer precursor materials in the presence of a suitable catalyst for a sufficient period of time. The time for polymerization can be a period ranging from minutes or hours to days, depending on the temperature (the higher the temperature the faster, the reaction rate, and correspondingly, the shorter the time required). The polymerization temperature can range from room temperature to a temperature approaching (but lower than) the boiling point of the starting solution. For example, the temperature can range from about 20° C. to about 90° C. In the specific embodiment wherein one polymer precursor is resorcinol and one polymer precursor is formaldehyde, the temperature can range from about 20° C. to about 100° C., typically from about 25° C. to about 90° C. In some embodiments, polymerization can be accomplished by incubation of suitable synthetic polymer precursor materials in the presence of a catalyst for at least 24 hours at about 90° C. Generally polymerization can be accomplished in between about 6 and about 24 hours at about 90° C., for example between about 18 and about 24 hours at about 90° C.

The polymer precursor materials as disclosed herein include (a) alcohols, phenolic compounds, and other mono- or polyhydroxy compounds and (b) aldehydes, ketones, and combinations thereof. Representative alcohols in this context include straight chain and branched, saturated and unsaturated alcohols. Suitable phenolic compounds include polyhydroxy benzene, such as a dihydroxy or trihydroxy benzene. Representative polyhydroxy benzenes include resorcinol (i.e., 1,3-dihydroxy benzene), catechol, hydroquinone, and phloroglucinol. Mixtures of two or more polyhydroxy benzenes can also be used. Phenol (monohydroxy benzene) can also be used. Representative polyhydroxy compounds include sugars, such as glucose, and other polyols, such as mannitol. Aldehydes in this context include: straight chain saturated aldehydes such as methanal (formaldehyde), ethanal (acetaldehyde), propanal (propionaldehyde), butanal (butyraldehyde), and the like; straight chain unsaturated aldehydes such as ethenone and other ketenes, 2-propenal (acrylaldehyde), 2-butenal (crotonaldehyde), 3 butenal, and the like; branched saturated and unsaturated aldehydes; and aromatic-type aldehydes such as benzaldehyde, salicylaldehyde, hydrocinnamaldehyde, and the like. Suitable ketones include: straight chain saturated ketones such as propanone and 2 butanone, and the like; straight chain unsaturated ketones such as propenone, 2 butenone, and 3-butenone (methyl vinyl ketone) and the like; branched saturated and unsaturated ketones; and aromatic-type ketones such as methyl benzyl ketone (phenylacetone), ethyl benzyl ketone, and the like. The polymer precursor materials can also be combinations of the precursors described above.

In some embodiments, one polymer precursor is an alcohol-containing species and another polymer precursor is a carbonyl-containing species. The relative amounts of alcohol-containing species (e.g., alcohols, phenolic compounds and mono- or poly-hydroxy compounds or combinations thereof) reacted with the carbonyl containing species (e.g. aldehydes, ketones or combinations thereof) can vary substantially. In some embodiments, the ratio of alcohol-containing species to aldehyde species is selected so that the total moles of reactive alcohol groups in the alcohol-containing species is approximately the same as the total moles of reactive carbonyl groups in the aldehyde species. Similarly, the ratio of alcohol-containing species to ketone species may be selected so that the total moles of reactive alcohol groups in the alcohol containing species is approximately the same as the total moles of reactive carbonyl groups in the ketone species. The same general 1:1 molar ratio holds true when the carbonyl-containing species comprises a combination of an aldehyde species and a ketone species.

The total solids content in the solution or suspension prior to polymer gel formation can be varied. The weight ratio of resorcinol to water is from about 0.05 to 1 to about 0.70 to 1. Alternatively, the ratio of resorcinol to water is from about 0.15 to 1 to about 0.6 to 1. Alternatively, the ratio of resorcinol to water is from about 0.15 to 1 to about 0.35 to 1. Alternatively, the ratio of resorcinol to water is from about 0.25 to 1 to about 0.5 to 1. Alternatively, the ratio of resorcinol to water is from about 0.3 to 1 to about 0.4 to 1.

Examples of solvents useful in the preparation of the polymer gels disclosed herein include but are not limited to water or alcohols such as, for example, ethanol, t butanol, methanol or combinations thereof as well as aqueous mixtures of the same. Such solvents are useful for dissolution of the polymer precursor materials, for example dissolution of the phenolic compound. In addition, in some processes such solvents are employed for solvent exchange in the polymer gel (prior to freezing and drying), wherein the solvent from the polymerization of the precursors, for example, resorcinol and formaldehyde, is exchanged for a pure alcohol. In one embodiment of the present application, a polymer gel is prepared by a process that does not include solvent exchange.

Suitable catalysts in the preparation of the polymer gels include volatile basic catalysts that facilitate polymerization of the precursor materials into a monolithic polymer. Typical catalysts are those that are volatile and in some instances substantially do not comprise sodium. Examples of such catalysts include but are not limited to ammoniums salts, such as ammonium bicarbonate, ammonium carbonate, and ammonium hydroxide, and combinations thereof. The catalyst can also comprise various combinations of the catalysts described above. In embodiments comprising phenolic compounds, such catalysts can be used in the range of molar ratios of 5:1 to 200:1 phenolic compound:catalyst. For example, in some specific embodiments such catalysts can be used in the range of molar ratios of 25:1 to 100:1 phenolic compound:catalyst.

The sol gel can also contain an additional agent (excipient) that essentially remains free of the polymer network after polymerization. Typically, this agent is volatile, and upon drying of the sol gel to produce a dried sol gel, leaves behind voids that provide porosity for the dried sol gel, and in the mesoporous carbon.

The excipient can also be non-volatile. In such instances, pyrolysis of the sol gel produces a pyrolyzed carbon, and the pyrolyzed excipient leaves behind voids that result in porosity of the pyrolyzed carbon and in the mesoporous carbon. Examples of non-volatile excipients include, but are not limited to, linear and branched carbon-based polymers. The polymer can be soluble in the solvent system used to create the sol gel, or, alternatively, the polymer can be in the form of a suspension, for example a colloidal suspension. Examples of polymer excipients for incorporation in the sol gel include, but are not limited to, polyesters, polyethers, polyurethanes, polyamides, and polyols. The molecular weight of the polymer excipient can be, for example, in the range of 1000 Da to 10,000,000 Da. The molecular size of the polymer excipient, or size of polymer excipient suspended particle can be in the range of 50 to 5000 A.

2. Creation of Polymer Gel Particles

A monolithic polymer gel can be physically disrupted to create smaller particles according to various techniques known in the art. The resultant polymer gel particles generally have an average diameter of less than about 30 mm, for example, in the size range of about 1 mm to about 25 mm, or between about 1 mm to about 5 mm or between about 0.5 mm to about 10 mm. Alternatively, the size of the polymer gel particles can be in the range below about 1 mm, for example, in the size range of about 10 to 1000 microns. Techniques for creating polymer gel particles from monolithic material include manual or machine disruption methods, such as sieving, grinding, milling, or combinations thereof. Such methods are well-known to those of skill in the art. Various types of mills can be employed in this context such as roller, bead, and ball mills and rotary crushers and similar particle creation equipment known in the art.

In a specific embodiment, a roller mill is employed. A roller mill has three stages to gradually reduce the size of the gel particles. The polymer gels are generally very brittle and are not damp to the touch. Consequently they are easily milled using this approach; however, the width of each stage must be set appropriately to achieve the targeted final mesh. This adjustment is made and validated for each combination of gel recipe and mesh size. Each gel is milled via passage through a sieve of known mesh size. Sieved particles can be temporarily stored in sealed containers.

In one embodiment, a rotary crusher is employed. The rotary crusher has a screen mesh size of about $1/8^{th}$ inch. In another embodiment, the rotary crusher has a screen mesh size of about $3/8^{th}$ inch. In another embodiment, the rotary crusher has a screen mesh size of about $5/8^{th}$ inch. In another embodiment, the rotary crusher has a screen mesh size of about $3/8^{th}$ inch.

Milling can be accomplished at room temperature according to methods well known to those of skill in the art. Alternatively, milling can be accomplished cryogenically, for example by co-milling the polymer gel with solid carbon dioxide (dry ice) particles. In this embodiment, the two steps of (a) creating particles from the monolithic polymer gel and (b) rapid, multidirectional freezing of the polymer gel are accomplished in a single process.

3. Rapid Freezing of Polymer Gels

After the polymer gel particles are formed from the monolithic polymer gel, freezing of the polymer gel particles may be accomplished rapidly and in a multi-directional fashion as described in more detail above. Freezing slowly and in a unidirectional fashion, for example by shelf freezing in a lyophilizer, results in dried material having a very low surface area. Similarly, snap freezing (i.e., freezing that is accomplished by rapidly cooling the polymer gel particles by pulling a deep vacuum) also results in a dried material having a low surface area. As disclosed herein rapid freezing in a multidirectional fashion can be accomplished by rapidly lowering the material temperature to at least about $-10°$ C. or lower, for example, $-20°$ C. or lower, or for example, to at least about $-30°$ C. or lower. Rapid freezing of the polymer gel particles creates a fine ice crystal structure within the particles due to widespread nucleation of ice crystals, but leaves little time for ice crystal growth. This provides a high specific surface area between the ice crystals and the hydrocarbon matrix, which is necessarily excluded from the ice matrix.

The concept of extremely rapid freezing to promote nucleation over crystal growth can also be applied to mixed solvent systems. In one embodiment, as the mixed solvent system is rapidly cooled, the solvent component that predominates will undergo crystallization at its equilibrium melting temperature, with increased concentration of the co-solvent(s) and concomitant further freezing point depression. As the temperature is further lowered, there is increased crystallization of the predominant solvent and concentration of co-solvent(s) until the eutectic composition is reached, at which point the eutectic composition undergoes the transition from liquid to solid without further component concentration or product cooling until complete freezing is achieved. In the specific case of water and acetic acid (which as pure substances exhibit freezing points of $0°$ C. and $17°$ C., respectively), the eutectic composition is comprised of approximately 59% acetic acid and 41% water and freezes at about $-27°$ C. Accordingly, in one embodiment, the mixed solvent system is the eutectic composition, for example, in one embodiment the mixed solvent system comprises 59% acetic acid and 41% water.

4. Drying of Polymer Gels

In one embodiment, the frozen polymer gel particles containing a fine ice matrix are lyophilized under conditions designed to avoid collapse of the material and to maintain fine surface structure and porosity in the dried product. Generally drying is accomplished under conditions where the temperature of the product is kept below a temperature that would otherwise result in collapse of the product pores, thereby enabling the dried material to retain an extremely high surface area.

The structure of the final carbon material is reflected in the structure of the dried polymer gel which in turn is established by the polymer gel properties. These features can be created in the polymer gel using a sol-gel processing approach as described herein, but if care is not taken in removal of the solvent, then the structure is not preserved. It is of interest to both retain the original structure of the polymer gel and modify its structure with ice crystal formation based on control of the freezing process. In some embodiments prior to drying, the aqueous content of the polymer gel is in the range of about 50% to about 99%. In certain embodiments upon drying, the aqueous content of the polymer cryogel is about 10%, alternately less than about 5% or less than about 2.5%.

A lyophilizer chamber pressure of about 2250 microns results in a primary drying temperature in the drying product of about $-10°$ C. Drying at about 2250 micron chamber pressure or lower case provides a product temperature during primary drying that is no greater than about $-10°$ C. As a further illustration, a chamber pressure of about 1500 microns results in a primary drying temperature in the drying product of about $-15°$ C. Drying at about 1500 micron chamber pressure or lower provides a product temperature during primary drying that is no greater than about $-15°$ C. As yet a further illustration, a chamber pressure of about 750 microns results in a primary drying temperature in the drying product of about $-20°$ C. Drying at 750 micron chamber pressure or lower provides a product temperature during primary drying that is no greater than about $-20°$ C. As yet a further illustration, a chamber pressure of about 300 microns results in a primary drying temperature in the drying product of about $-30°$ C. Drying at 300 micron chamber pressure or lower provides a product temperature during primary drying that is no greater than about $-30°$ C.

In some embodiments, the bi-functional catalyst (or other metal) is incorporated into the carbon material after drying of the polymer gel. For example, the bi-functional catalyst can be incorporated into the dried polymer gel by contacting the dried polymer gel with the bi-functional catalyst, for example, colloidal metal, metal salt, metal paste, metal oxide or other sources of the bi-functional catalyst. In some specific embodiments, the bi-functional catalyst comprises nickel, iron or manganese, and the nickel, iron or manganese is incorporated into the dried polymer gel by contacting the dried polymer gel with a nickel, iron or manganese salt in a manner and for a time sufficient to allow diffusion of the bi-functional catalyst salt into the pores of the dried polymer gel. Salts useful in this context include acetate and formate salts and the like.

5. Pyrolysis and Activation of Polymer Gels

The polymer gels described above, can be further processed to obtain carbon materials. Such processing includes, for example, pyrolysis and/or activation. Generally, in the pyrolysis process, dried polymer gels are weighed and placed in a rotary kiln. The temperature ramp is set at $5°$ C. per minute, the dwell time and dwell temperature are set; cool down is determined by the natural cooling rate of the furnace. The entire process is usually run under an inert atmosphere, such as a nitrogen environment. Pyrolyzed samples are then removed and weighed. Other pyrolysis processes are well known to those of skill in the art.

In some embodiments, the bi-functional catalyst (or other metal) is incorporated into the carbon material after pyrolysis of the dried polymer gel. For example, the bi-functional catalyst can be incorporated into the pyrolyzed polymer gel by contacting the pyrolyzed polymer gel with the bi-functional catalyst, for example, colloidal metal, molten metal, metal salt, metal paste, metal oxide or other sources of the bi-functional catalyst. In some specific embodiments, the bi-functional catalyst comprises nickel, iron or manganese and the nickel, iron or manganese is incorporated into the pyrolyzed polymer gel by contacting the pyrolyzed polymer gel with a nickel, iron or manganese salt in a manner and for a time sufficient to allow diffusion of the nickel, iron or manganese salt into the pores of the pyrolyzed polymer gel. Salts useful in this context include acetate and formate salts and the like.

In some embodiments, pyrolysis dwell time (the period of time during which the sample is at the desired temperature) is from about 0 minutes to about 120 minutes, from about 0 minutes to about 60 minutes, from about 0 minutes to about 30 minutes, from about 0 minutes to about 10 minutes, from about 0 to 5 minutes or from about 0 to 1 minute.

Pyrolysis may also be carried out more slowly than described above. For example, in one embodiment the pyrolysis is carried out in about 120 to 480 minutes. In other embodiments, the pyrolysis is carried out in about 120 to 240 minutes.

In some embodiments, pyrolysis dwell temperature ranges from about 500° C. to 2400° C. In some embodiments, pyrolysis dwell temperature ranges from about 650° C. to 1800° C. In other embodiments pyrolysis dwell temperature ranges from about 700° C. to about 1200° C. In other embodiments pyrolysis dwell temperature ranges from about 850° C. to about 1050° C. In other embodiments pyrolysis dwell temperature ranges from about 800° C. to about 900° C.

In some embodiments, the pyrolysis dwell temperature is varied during the course of pyrolysis. In one embodiment, the pyrolysis is carried out in a rotary kiln with separate, distinct heating zones. The temperature for each zone is sequentially decreased from the entrance to the exit end of the rotary kiln tube. In one embodiment, the pyrolysis is carried out in a rotary kiln with separate distinct heating zones, and the temperature for each zone is sequentially increased from entrance to exit end of the rotary kiln tube.

Activation time and activation temperature both have a large impact on the performance of the resulting activated carbon material, as well as the manufacturing cost thereof. Increasing the activation temperature and the activation dwell time results in higher activation percentages, which generally correspond to the removal of more material compared to lower temperatures and shorter dwell times. Activation temperature can also alter the pore structure of the carbon where lower temperatures result in more microporous carbon and higher temperatures result in mesoporosity. This is a result of the activation gas diffusion limited reaction that occurs at higher temperatures and reaction kinetic driven reactions that occur at lower temperature. Higher activation percentage often increases performance of the final activated carbon, but it also increases cost by reducing overall yield. Improving the level of activation corresponds to achieving a higher performance product at a lower cost.

Pyrolyzed polymer gels may be activated by contacting the pyrolyzed polymer gel with an activating agent. Many gases are suitable for activating, for example gases which contain oxygen. Non-limiting examples of activating gases include carbon dioxide, carbon monoxide, steam, oxygen and combinations thereof. Activating agents may also include corrosive chemicals such as acids, bases or salts (e.g., phosphoric acid, acetic acid, citric acid, formic acid, oxalic acid, uric acid, lactic acid, potassium hydroxide, sodium hydroxide, zinc chloride, etc.). Other activating agents are known to those skilled in the art.

In some embodiments, the activation time is between 1 minute and 48 hours. In other embodiments, the activation time is between 1 minute and 24 hours. In other embodiments, the activation time is between 5 minutes and 24 hours. In other embodiments, the activation time is between 1 hour and 24 hours. In further embodiments, the activation time is between 12 hours and 24 hours. In certain other embodiments, the activation time is between 30 min and 4 hours. In some further embodiments, the activation time is between 1 hour and 2 hours.

Pyrolyzed polymer gels may be activated using any number of suitable apparatuses known to those skilled in the art, for example, fluidized beds, rotary kilns, elevator kilns, roller hearth kilns, pusher kilns, etc. In one embodiment of the activation process, samples are weighed and placed in a rotary kiln, for which the automated gas control manifold is set to ramp at a 20° C. per minute rate. Carbon dioxide is introduced to the kiln environment for a period of time once the proper activation temperature has been reached. After activation has occurred, the carbon dioxide is replaced by nitrogen and the kiln is cooled down. Samples are weighed at the end of the process to assess the level of activation. Other activation processes are well known to those of skill in the art. In some of the embodiments disclosed herein, activation temperatures may range from 800° C. to 1300° C. In another embodiment, activation temperatures may range from 800° C. to 1050° C. In another embodiment, activation temperatures may range from about 850° C. to about 950° C. One skilled in the art will recognize that other activation temperatures, either lower or higher, may be employed.

The degree of activation is measured in terms of the mass percent of the pyrolyzed dried polymer gel that is lost during the activation step. In one embodiment of the methods described herein, activating comprises a degree of activation from 5% to 90%; or a degree of activation from 10% to 80%; in some cases activating comprises a degree of activation from 40% to 70%, or a degree of activation from 45% to 65%.

In some embodiments, the bi-functional catalyst (or other metal) is incorporated into the carbon material after activation of the pyrolyzed polymer gel. For example, the bi-functional catalyst can be incorporated into the activated carbon material by contacting the activated carbon material with the bi-functional catalyst, for example, molten metal, colloidal metal, metal salt, metal paste, metal oxide or other sources of the bi-functional catalyst. In some specific embodiments, the bi-functional catalyst comprises nickel, iron or manganese and the nickel, iron or manganese is incorporated into the pyrolyzed polymer gel by contacting the activated carbon material with a nickel, iron or manganese salt in a manner and for a time sufficient to allow diffusion of the nickel, iron or manganese salt into the pores of activated carbon material. Salts useful in this context include formate and acetate salts and the like.

In one embodiment, micropores, mesopores and macropores of the carbon material contain the bi-functional catalyst. In another, related embodiment, the micropores, mesopores and macropores of the carbon material are impregnated with the bi-functional catalyst. The bi-functional catalyst is then preferentially washed from the mesopores and macropores resulting in a carbon material comprising an bi-functional catalyst predominantly present in the micropores. In another embodiment, impregnation of a carbon material with a bi-functional catalyst is carried out under mild conditions such that the mesopores are impregnated with bi-functional catalyst (but no substantial impregnation into micropores) resulting in a material comprising an bi-functional catalyst predominantly present in mesopores.

Examples of forms of carbon that can be impregnated with bi-functional catalyst as described above are not limited to carbon materials prepared by a sol gel process. Such forms of carbon include, but are not limited to: carbon monoliths, carbon particles, carbon nanotubes, and carbon fibers. The carbon can be present in more than one form, for example a combination of carbon particles and carbon monoliths, or carbon particles and carbon fibers. The employment of a combination of different forms of carbon may facilitate binding of the bi-functional catalyst into the carbon matrix. In some embodiments, a carbon monolith may be formed from a polymer gel prepared in the presence of carbon fibers, with the purpose of retention of the monolith upon freezing, drying, and subsequent pyrolysis, activation, and metal impregnation. In another embodiment, bulking and/or glass-forming agents are incorporated into the polymer gel such that the monolith is retained upon freezing, drying, and subsequent pyrolysis, activation, and impregnation with bi-functional catalyst. Examples of bulking and/or glass-forming agents in this context include, but are not limited to: sugars and poly(ols) such as sucrose and mannitol, and linear or branched polymers such as poly(ethylene glycol)s and dextran.

C. Characterization of Polymer Gels and Mesoporous Carbon Materials Comprising Bi-Functional Catalysts or Other Metals The structural properties of the final carbon material and intermediate polymer gels may be measured using Nitrogen sorption at 77K, a method known to those of skill in the art. The final performance and characteristics of the finished carbon material is important, but the intermediate products (both dried polymer gel and pyrolyzed, but not activated, polymer gel), can also be evaluated, particularly from a quality control standpoint, as known to those of skill in the art. The system produces a nitrogen isotherm starting at a pressure of $10^{-7}$ atm, which enables high resolution pore size distributions in the sub 1 nm range. The software generated reports utilize a Density Functional Theory (DFT) method to calculate properties such as pore size distributions, surface area distributions, total surface area, total pore volume, and pore volume within certain pore size ranges. FIG. 1 shows characterization of various embodiments of the disclosed carbon materials.

The impurity content of the carbon materials can be determined by any number of analytical techniques known to those of skill in the art. One particular analytical method useful within the context of the present disclosure is proton induced x-ray emission (PIXE). This technique is capable of measuring the concentration of elements having atomic numbers ranging from 11 to 92 at low ppm levels. Accordingly, in one embodiment the concentration of bi-functional catalyst, unwanted impurities and other elements present in the carbon materials is determined by PIXE analysis.

D. Devices Comprising the Carbon Materials

The disclosed carbon materials can be used as electrode material in any number of electrical energy storage and distribution devices. One such device is a lithium-air battery. The disclosed batteries comprise a high specific energy and represent a significant advance over other known lithium-air and other metal-air batteries. The increased specific power values offered by the disclosed devices also may translate into reduced charging times. Therefore, the disclosed devices may be suitable for applications in which charging energy is available for only a limited amount of time. For instance, in vehicles, a great deal of energy is lost during ordinary braking. This braking energy may be recaptured and used to charge a battery of, for example, a hybrid vehicle. The braking energy, however, is available only for a short period of time (e.g., while braking is occurring). Thus, any transfer of braking energy to a battery must occur during braking. In view of their reduced charging times, the devices of the present invention may provide an efficient means for storing such braking energy.

In one embodiment, the present disclosure provides a metal-air battery comprising:
a) an air cathode comprising the disclosed mesoporous carbon materials comprising a bi-functional catalyst;
b) a metal anode; and
c) an electrolyte.

In another embodiment, the present disclosure provides a metal-air battery comprising:
a) an air cathode comprising the disclosed mesoporous carbon materials comprising a metal, wherein the metal comprises lead, tin, antimony, bismuth, arsenic, tungsten, silver, zinc, cadmium, indium or combinations thereof;
b) a metal anode; and
c) an electrolyte.

In one particular embodiment of the foregoing battery, the metal comprises silver.

In one embodiment, the present disclosure provides a metal-air battery comprising:
a) an air cathode comprising the disclosed mesoporous carbon materials comprising a bi-functional catalyst;
b) a metal anode;
c) a secondary carbon anode; and
d) an electrolyte.

In the above embodiment, the secondary carbon anode acts as an ultracapacitor or electric double layer capacitor (EDLC) anode. In certain embodiments, the carbons used in this secondary anode are microporous and provide high capacitance. In particular embodiments the carbons are ultrapure or comprise an optimized blend of micropores and mesopores. Such carbon materials are described in co-pending U.S. patent application Ser. Nos. 12/829,282 and 61/427,649 and U.S. Pat. Nos. 7,723,262 and 7,835,136, the disclosures of which are hereby incorporated by reference in their entirety. Other examples of carbons useful in this embodiment are described above. The secondary anode is electrically connected in parallel with the metal anode. In this manner the battery is capable of both the slow discharge capability of the Li-air mechanism and the very fast discharge of the ultracapacitor. The anode is sized to balance the EDLC capability of the carbon cathode which naturally develops capacitance due to its high surface area. Ideally, the anode is separated electrically by a porous separator membrane from the cathode. Some Li+ ions are consumed by the carbon anode, but compared to the high capacity of the battery, the effect is negligible.

In some other embodiments of the above metal-air batteries, the metal anode comprises lithium, zinc, sodium, potassium, rubidium, cesium, francium, beryllium, magnesium, calcium, strontium barium, radium, aluminum, silicon or a combination thereof. In other embodiments, the electrolyte comprises propylene carbonate, ethylene carbonate, butylene carbonate, dimethyl carbonate, methyl ethyl carbonate, diethyl carbonate, sulfolane, methylsulfolane, acetonitrile or mixtures thereof in combination with one or more solutes, wherein the solute is a lithium salt, $LiPF_6$, $LiBF_4$, $LiClO_4$ tetralkylammonium salt, TEA TFB (tetraethylammonium tetrafluoroborate), MTEATFB (methyltriethylammonium tetrafluoroborate), EMITFB (1-ethyl-3-methylimidazolium tetrafluoroborate), tetraethylammonium or a triethylammonium based salt.

In yet other embodiments of the foregoing batteries, the bi-functional catalyst comprises iron, nickel, cobalt, manganese, copper, ruthenium, rhodium, palladium, osmium, iridium, gold, hafnium, platinum, titanium, rhenium, tantalum, thallium, vanadium, niobium, scandium, chromium, gallium, zirconium, molybdenum or combinations thereof. For example, in some specific embodiments, the bi-functional catalyst comprises nickel. In other embodiments, the bi-functional catalyst comprises iron, and in other embodiments, the bi-functional catalyst comprises manganese.

In other embodiments, the bi-functional catalyst comprises a carbide compound. For example, in some aspects the carbide compound comprises lithium carbide, magnesium carbide, sodium carbide, calcium carbide, boron carbide, silicon carbide, titanium carbide, zirconium carbide, hafnium carbide, vanadium carbide, niobium carbide, tantalum carbide, chromium carbide, molybdenum carbide, tungsten carbide, iron carbide, manganese carbide, cobalt carbide, nickel carbide or a combination thereof. In certain embodiments, the carbide compound comprises tungsten carbide.

The cathode can be engineered to create an environment in which the electrolyte can be controlled based on the wetting characteristics of the surface of the mesoporous carbon. For example, a mesoporous carbon can be produced where the outer surface of the mesoporous carbon tends to repel the electrolyte to allow for gas diffusion but the inner pore surfaces attract electrolyte to encourage good ion diffusion within the pores. In some embodiments, the inner surfaces of pores of the mesoporous carbon are wetted by the electrolyte, while the external surface of the mesoporous carbon is not significantly wetted by the electrolyte. Still in other embodiments, the inner surfaces of pores of the mesoporous carbon are not wetted by the electrolyte, while the outer surface of the mesoporous carbon is wetted by the electrolyte. In some embodiments there is a mixture of particles where some particles are not wetted by the electrolyte and act as gas diffusion channels and other particles are preferentially wetted by the electrolyte and act as ion diffusion channels.

While the electrolyte can be any electrolyte known to one skilled in the art, in some instances the electrolyte comprises propylene carbonate. In other embodiments, the electrolyte comprises dimethyl carbonate. Still in other embodiments, the electrolyte comprises ethylene carbonate. Yet in other embodiments, the electrolyte comprises diethyl carbonate. In other embodiments, the electrolyte comprises an ionic liquid. A wide variety of ionic liquids are known to one skilled in the art including, but not limited to, imidazolium salts, such as ethylmethylimidazolium hexafluorophosphate (EMIPF6) and 1,2-dimethyl-3-propyl imidazolium [(DMPIX)Im]. See, for example, McEwen et al., "Nonaqueous Electrolytes and Novel Packaging Concepts for Electrochemical Capacitors," The 7th International Seminar on Double Layer Capacitors and Similar Energy Storage Devices, Deerfield Beach, Fla. (Dec. 8-10, 1997).

For a rechargeable Li-air batteries, typically a bi-functional catalyst (or in certain embodiments, another metal) is incorporated to assist with oxygen evolution and oxygen reduction. The mesoporous carbon processing can be modified to produce a desired catalyst structure on the inner pore surfaces of the mesoporous carbon.

Mesoporous carbons of the disclosure can be used to aid in the fast charge-discharge capability of the lithium electrode. Mesoporous carbons can be used as electrodes for electrolytic double layer capacitors. Mesoporous carbon of the invention can be added as a separate component in electrical contact with the lithium electrode. In some embodiments, the double layer capacitance of the air electrode is matched at least partially by this second carbon anode. In other embodiments, a double layer is established on the mesoporous carbon. Such configuration allows rapid charge and discharge and can also be pulsed rapidly. It is believed that such pulsing minimizes the negative effects of rapid charge-discharge on battery life. The mesoporous carbon need not be in physical contact with the lithium or on the same side of the separator to contribute the fast discharge capability of the lithium-air battery. In other embodiments of the foregoing, the separate component in electrical contact (e.g., electrode) is a microporous carbon.

EXAMPLES

The polymer gels, cryogels, pyrolyzed cryogels and carbon materials disclosed in the following Examples were prepared according to the methods disclosed herein. Chemicals were obtained from commercial sources at reagent grade purity or better and were used as received from the supplier without further purification.

Unless indicated otherwise, the following conditions were generally employed for preparation of the carbon materials and precursors. Phenolic compound and aldehyde were reacted in the presence of a catalyst in a binary solvent system (e.g., water and acetic acid). The molar ratio of phenolic compound to aldehyde was typically 0.5 to 1. The reaction was allowed to incubate in a sealed container at temperatures of up to 85 C for up to 24 h. The resulting polymer hydrogel contained water, but no organic solvent; and was not subjected to solvent exchange of water for an organic solvent, such as t-butanol. The polymer hydrogel monolith was then physically disrupted, for example by grinding, to form polymer hydrogel particles having an average diameter of less than about 5 mm. Unless stated otherwise, the particles were then rapidly frozen, generally by immersion in a cold fluid (e.g., liquid nitrogen or ethanol/dry ice) and lyophilized. Generally, the lyophilizer shelf was pre-cooled to −30° C. before loading a tray containing the frozen polymer hydrogel particles on the lyophilizer shelf. The chamber pressure for lyophilization was typically in the range of 50 to 1000 mTorr and the shelf temperature was in the range of +10 to +25° C. Alternatively, the shelf temperature can be set lower, for example in the range of 0 to +10° C. Alternatively, the shelf temperature can be set higher, for example in the range of 25 to +100° C. Chamber pressure can be held in the range of 50 to 3000 mTorr. For instance, the chamber pressure can be controlled in the range of 150 to 300 mTorr.

The dried polymer hydrogel was typically pyrolyzed by heating in a nitrogen atmosphere at temperatures ranging from 800-1200° C. for a period of time as specified in the examples. Activation conditions generally comprised heating a pyrolyzed polymer hydrogel in a $CO_2$ atmosphere at temperatures ranging from 900-1000° C. for a period of time as specified in the examples. Specific pyrolysis and activation conditions were as described in the following examples.

Impregnation of the carbon materials with metals was accomplished by including a source of the metal in the polymerization reaction or contacting the carbon material, or precursors of the same (e.g., polymer hydrogel, dried polymer hydrogel, pyrolyzed polymer gel, etc.), with a source of the metal as described more fully above and exemplified below.

Example 1

Preparation of Dried Polymer Gel

A polymer gel was prepared by polymerization of resorcinol and formaldehyde (0.5:1) in water and acetic acid (75:25) and ammonium acetate (RC=25, unless otherwise stated). The reaction mixture was placed at elevated temperature (incubation at 45° C. for about 6 h followed by incubation at 85° C. for about 24 h) to allow for gellation to create a polymer gel. Polymer gel particles were created from the polymer gel and passed through a 4750 micron mesh sieve. The sieved particles were frozen by immersion in liquid nitrogen, loaded into a lyophilization tray at a loading of 3 to 7 g/in², and lyophilized. The time to dry (as inferred from time for product to reach within 2° C. of shelf temperature) varied with product loading on the lyophilizer shelf.

The surface area of the dried polymer gel was examined by nitrogen surface analysis using a Micrometrics Surface Area and Porosity Analyzer (model TriStar II). The measured specific surface area using the BET approach was in the range of about 400 to 700 m²/g.

Example 2

Preparation of Pyrolyzed Carbon Material from Dried Polymer Gel

Dried polymer gel prepared according to Example 1 was pyrolyzed by passage through a rotary kiln at 850° C. with a nitrogen gas flow of 200 L/h. The weight loss upon pyrolysis was about 52%.

The surface area of the pyrolyzed dried polymer gel was examined by nitrogen surface analysis using a surface area and porosity analyzer. The measured specific surface area using the standard BET approach was in the range of about 600 to 700 m²/g.

Example 3

Production of Activated Carbon

Pyrolyzed carbon material prepared according to Example 2 was activated by multiple passes through a rotary kiln at 900° C. under a $CO_2$ flow rate of 30 L/min, resulting in a total weight loss of about 45%.

The surface area of the activated carbon was examined by nitrogen surface analysis using a surface area and porosity analyzer. The measured specific surface area using the BET approach was in the range of about 1600 to 2000 m²/g.

Example 4

Micronization of Activated Carbon Via Jet Milling

Activated carbon prepared according to Example 3 was jet milled using a Jet Pulverizer Micron Master 2 inch diameter jet mill. The conditions comprised about 0.7 lbs of activated carbon per hour, nitrogen gas flow about 20 scf per min and about 100 psi pressure. The average particle size after jet milling was about 8 to 10 microns.

Example 5

Purity Analysis of Activated Carbon & Comparison Carbons

Activated carbon samples prepared according to Example 4 were examined for their impurity content via proton induced x-ray emission (PIXE). PIXE is an industry-standard, highly sensitive and accurate measurement for simultaneous elemental analysis by excitation of the atoms in a sample to produce characteristic X-rays which are detected and their intensities identified and quantified. PIXE is capable of detection of all elements with atomic numbers ranging from 11 to 92 (i.e., from sodium to uranium).

The PIXE impurity (Imp.) data for activated carbons as disclosed herein as well as other activated carbons for comparison purposes is presented in Table 1. Sample 1, 3, 4 and 5 are activated carbons prepared according to Example 3, Sample 2 is a micronized activated carbon prepared according to Example 4, Sample 6 is an activated carbon denoted "MSP-20" obtained from Kansai Coke and Chemicals Co., Ltd. (Kakogawa, Japan), Sample 7 is an activated carbon denoted "YP-50F (YP-17D)" obtained from Kuraray Chemical Co. (Osaka, Japan).

As seen in Table 1, the synthetic activated carbons according to the instant disclosure have a lower PIXE impurity content and lower ash content as compared to other known activated carbon samples.

TABLE 1

Purity Analysis of Activated Carbon & Comparison Carbons

| Impurity | Impurity Concentration (PPM) | | | | | | |
|---|---|---|---|---|---|---|---|
| | Sample 1 | Sample 2 | Sample 3 | Sample 4 | Sample 5 | Sample 6 | Sample 7 |
| Na | ND* | ND | ND | ND | ND | 353.100 | ND |
| Mg | ND | ND | ND | ND | ND | 139.000 | ND |
| Al | ND | ND | ND | ND | ND | 63.850 | 38.941 |
| Si | 53.840 | 92.346 | 25.892 | 17.939 | 23.602 | 34.670 | 513.517 |
| P | ND | ND | ND | ND | ND | ND | 59.852 |
| S | ND | ND | ND | ND | ND | 90.110 | 113.504 |
| Cl | ND | ND | ND | ND | ND | 28.230 | 9.126 |
| K | ND | ND | ND | ND | ND | 44.210 | 76.953 |
| Ca | 21.090 | 16.971 | 6.141 | 9.299 | 5.504 | ND | 119.804 |
| Cr | ND | ND | ND | ND | ND | 4.310 | 3.744 |
| Mn | ND | ND | ND | ND | ND | ND | 7.552 |
| Fe | 7.582 | 5.360 | 1.898 | 2.642 | 1.392 | 3.115 | 59.212 |
| Ni | 4.011 | 3.389 | 0.565 | ND | ND | 36.620 | 2.831 |
| Cu | 16.270 | 15.951 | ND | ND | ND | 7.927 | 17.011 |
| Zn | 1.397 | 0.680 | 1.180 | 1.130 | 0.942 | ND | 2.151 |
| Total | 104.190 | 134.697 | 35.676 | 31.010 | 31.44 | 805.142 | 1024.198 |
| (% Ash) | (0.018) | (0.025) | (<0.007) | (0.006) | (0.006) | (0.13) | (0.16) |

*ND = not detected by PIXE analysis

Example 6

Measurement of H, N, O for Activated Carbon

The activated carbon material identified as Sample 1 was analyzed for H, N and O at Elemental Analysis, Inc. (Lexington, Ky.). The data showed that the hydrogen content was 0.25%, the nitrogen content was 0.21%, and the oxygen content was 0.53%.

Example 7

Impregnation of Activated Carbon with Lead

Lead was used as a model metal as a proof of concept for incorporating bi-functional catalysts into carbon materials. Saturated solutions of lead acetate, lead nitrate, lead carbonate and lead sulfate in 25:75 acetic acid:water (vol:vol) were prepared. Activated carbon (300 mg, microporous and mesoporous) samples prepared according to Example 4 were suspended in each lead salt solution and shaken overnight at room temperature. The liquid mixture was then centrifuged and the supernatant removed. The carbon pellet was washed three times with deionized water (5 mL) and dried overnight at 45° C. The lead content of the carbon samples thus prepared was analyzed by PIXE. The results are tabulated in Table 2 below.

TABLE 2

Lead Content of Various Activated Carbon Samples

| Sample | Activated Carbon Type | Lead Source | Lead Content |
|---|---|---|---|
| 8 | Microporous | Lead (II) acetate | 7.892% |
| 9 | Mesoporous | Lead (II) acetate | 6.526% |
| 10 | Microporous | Lead (II) nitrate | 0.294% |
| 11 | Mesoporous | Lead (II) nitrate | 2.427% |
| 12 | Microporous | Lead (II) carbonate | 1.855% |
| 13 | Mesoporous | Lead (II) carbonate | 1.169% |
| 14 | Microporous | Lead (II) sulfate | 84.060 ppm |
| 15 | Mesoporous | Lead (II) sulfate | 27.021 ppm |

Figure 2:
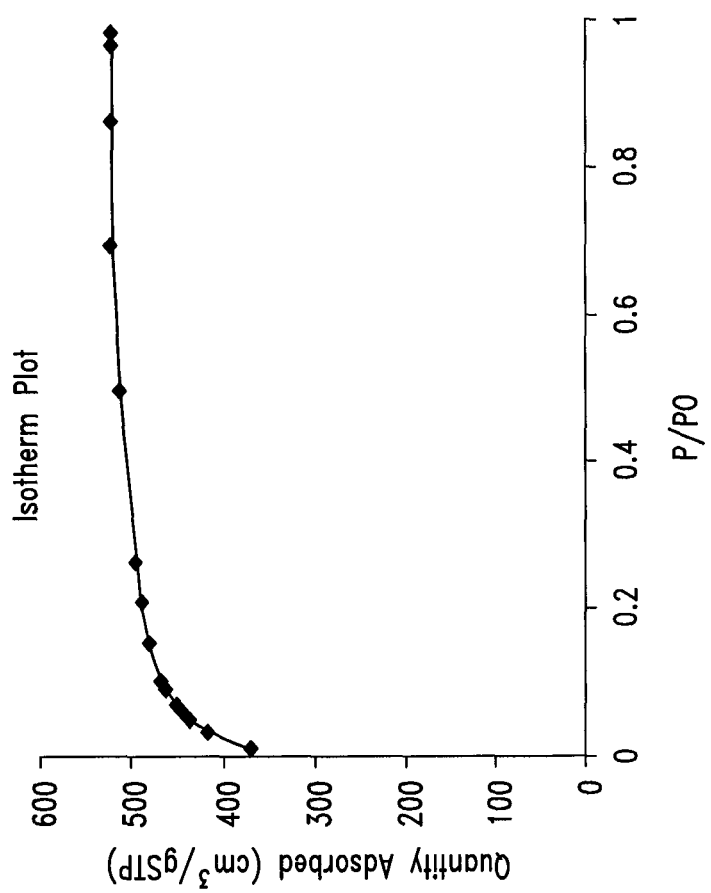
FIG. 2 shows a nitrogen sorption isotherm for microporous activated carbon.
Figure 3:
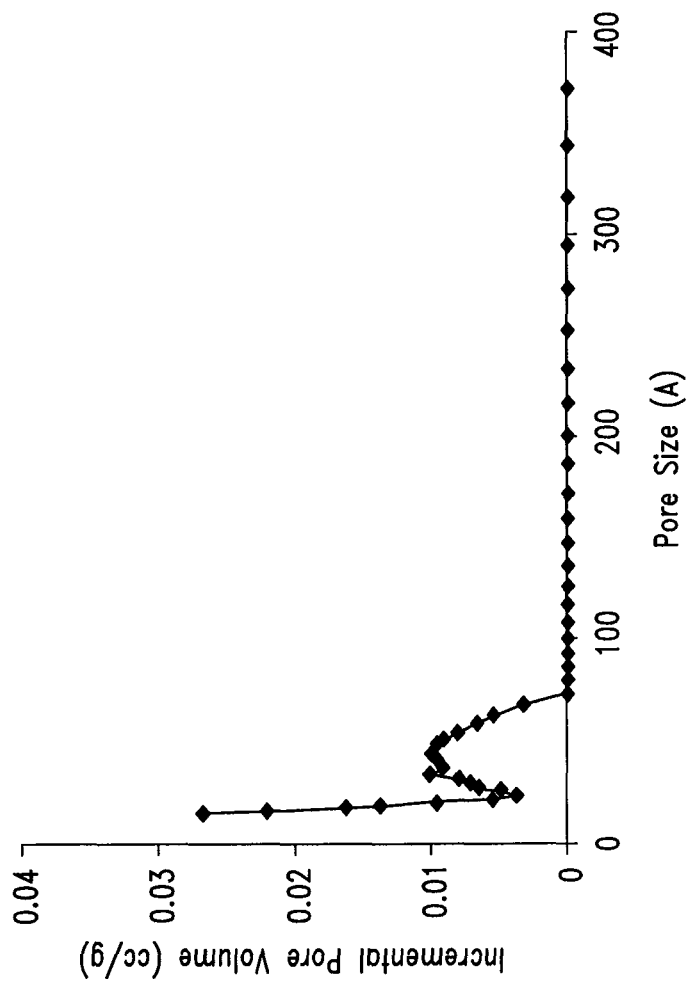
FIG. 3 presents a DFT pore volume distribution for microporous carbon.
Figure 4:
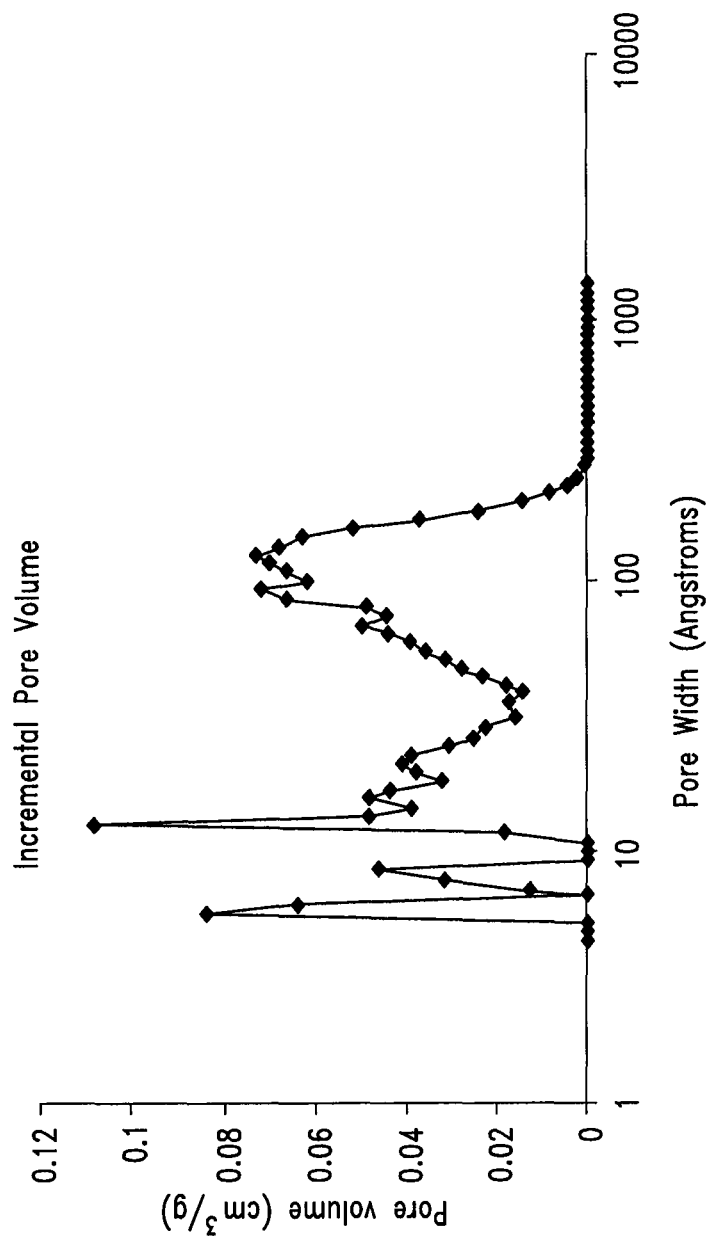
FIG. 4 depicts a DFT pore volume distribution for mesoporous activated carbon.

Both microporous and mesoporous activated carbons were studied. An example nitrogen sorption isotherm for microporous carbon is shown in FIG. 2. In this case, the total specific. BET surface area was 1746 $m^2/g$, and the total pore volume was 0.82 cc/g. From these data, the DFT pore distribution was determined as shown in FIG. 3. About 50% of the pore volume resides in pores of less than about 25 Å. About 50% of the pore surface area resides in pores of less than 17 Å. An example DFT pore distribution for mesoporous carbon is depicted in FIG. 4. In this case, the total specific BET surface area was 2471 $m^2/g$, and the total pore volume was 2.05 cc/g. About 50% of the pore volume resides in pores of less than about 54 Å.

As can be seen from the data in Table 2, for highly soluble lead salts (such as lead acetate, lead nitrate and lead carbonate) it was possible to generate carbon materials with substantial levels of lead in the final material, in the range of 0.3 to 8%. In the case of lead sulfate, only ppm levels (<100) were achieved via the impregnation method. Best results were obtained for more highly soluble lead salt forms such as acetate (water solubility=45.6 parts per 100 parts). In the case of lead nitrate (soluble in water at 56 parts per 100 parts), a relatively high amount of lead was impregnated into the mesoporous carbon, but a much less efficient result was obtained for the microporous carbon.

Figure 5:
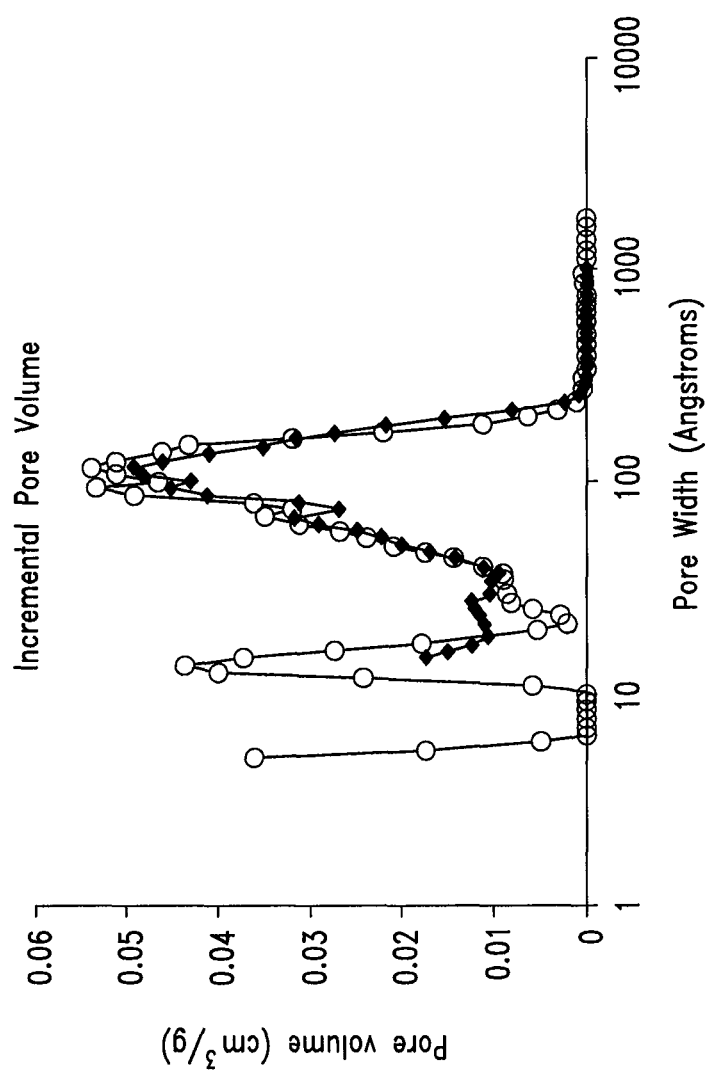
FIG. 5 shows the DFT pore volume distribution for mesoporous carbon before (open circles) and after (solid diamonds) impregnation with lead acetate.

The data in FIG. 5 depict the DFT pore volume data for mesoporous activated carbon before (open circles) and after (solid diamonds) impregnation with lead acetate. DFT parameters for this lead-impregnated carbon are given in Table 3. It can be seen that the mesoporous after lead (II) acetate) impregnation had a dramatically reduced micropore volume (and a relatively unchanged mesopore volume). While not wishing to be bound by theory, the present Applicants believe the impregnation of lead into the micropores would be consistent with this observation.

TABLE 3

Data for Lead-Impregnated Mesoporous Carbon

| Sample | Total BET SSA ($m^2/g$) | Total pore volume (cc/g) | DFT pore volume <20 Å (cc/g) | DFT pore volume >20 Å (cc/g) |
|---|---|---|---|---|
| 16 (Before lead (II) acetate impregnated) | 1751 | 1.48 | 0.50 | 0.78 |
| 17 (After lead (II) acetate impregnated) | 1057 | 1.11 | 0.26 | 0.77 |

Example 8

Impregnation of Pyrolyzed Polymer Gel with Lead

Pyrolyzed polymer gel (900 mg) prepared according to Example 2 was suspended in saturated lead acetate prepared according to Example 7. The liquid mixture was then shaken overnight at room temperature. The liquid mixture was then centrifuged and the supernatant removed. The carbon pellet was washed three times with deionized water (5 mL) and dried overnight at 45° C. The lead content of the carbon samples thus prepared was analyzed by PIXE. As can be seen in Table 4 below, the microporous pyrolyzed carbon provided more efficient impregnation of lead, i.e., 13.6%, whereas mesoporous carbon achieved about 1% lead content.

TABLE 4

Lead Content of Various Pyrolyzed Polymer Gel Samples

| Sample | Pyrolyzed Carbon Type | Lead Source | Lead Content |
|---|---|---|---|
| 18 | Mesoporous | Lead (II) acetate | 1.012% |
| 19 | Microporous | Lead (II) acetate | 13.631% |

Example 9

Impregnation of Dried Polymer Gel with Lead

Dried polymer gel (900 mg) prepared according to Example 1 was suspended in saturated lead acetate prepared according to Example 7. The liquid mixture was then shaken overnight at room temperature. The liquid mixture was then centrifuged and the supernatant removed. The polymer gel pellet was washed three times with deionized water (5 mL) and dried overnight at 45° C. The lead content of the polymer gel thus prepared was analyzed by PIXE.

Example 10

Incorporation of Lead During Polymerization of Polymer Gel

A resorcinol-formaldehyde gel mixture was prepared. The solids content was 41%, the resorcinol to catalyst ratio was 5:1, the catalyst was ammonium acetate, and the acetic acid content was 30%. About 20 mL of polymer solution was obtained (prior to placing solution at elevated temperature and generating the polymer gel). To this solution, about 5 mL of saturated lead (II) acetate in 25% acetic acid solution was added. The resulting final acetic acid content was thus about 29%, and the resulting final solids content was about 33%. The solution was then stored at 45° C. for about 5 h, followed by 24 h at 85° C. to fully induce the formation of a lead-containing polymer gel. This gel was disrupted to create particles, and the particles were frozen in liquid nitrogen and then dried in a lyophilizer as follows. The liquid-nitrogen frozen material was poured into a tray, and the tray was placed on a lyophilizer shelf pre-chilled to −30° C. The chamber pressure was then lowered to and maintained at about 150 to 300 mTorr. The shelf temperature was ramped from −30° C. to +50° C. over an hour, and then held at 50° C. for about 8 hours. The dried polymer gel (Sample 20) was found to contain 7.008% lead by PIXE analysis.

Lead-containing activated carbon was then produced as follows. The resulting dried lead-containing polymer gel was pyrolyzed and activated by heating from room temperature to 850° C. under nitrogen gas at a ramp rate of 20° C. per min, followed by a hold for 4 hours at 850° C. under carbon dioxide, followed by cooling under nitrogen from 850° C. to ambient over several hours.

Example 11

Purity Analysis of Carbon Materials and Polymer Gels Comprising Lead

The lead impregnated carbon materials (Samples 8-15, 18 and 19) and lead impregnated polymer gel (Sample 20) were analyzed by PIXE to determine the lead and other elemental content. These data are tabulated in Table 5. Elements such as tantalum, chlorine and aluminum were not typically observed in the non-impregnated carbon materials or polymer gels, accordingly their presence in the impregnated samples is attributed to impurities in the lead source. Higher purity carbon materials and polymer gels can be prepared by using purified sources of lead or other metals.

Example 12

Preparation of a Mesoporous Carbon Material

Figure 6:
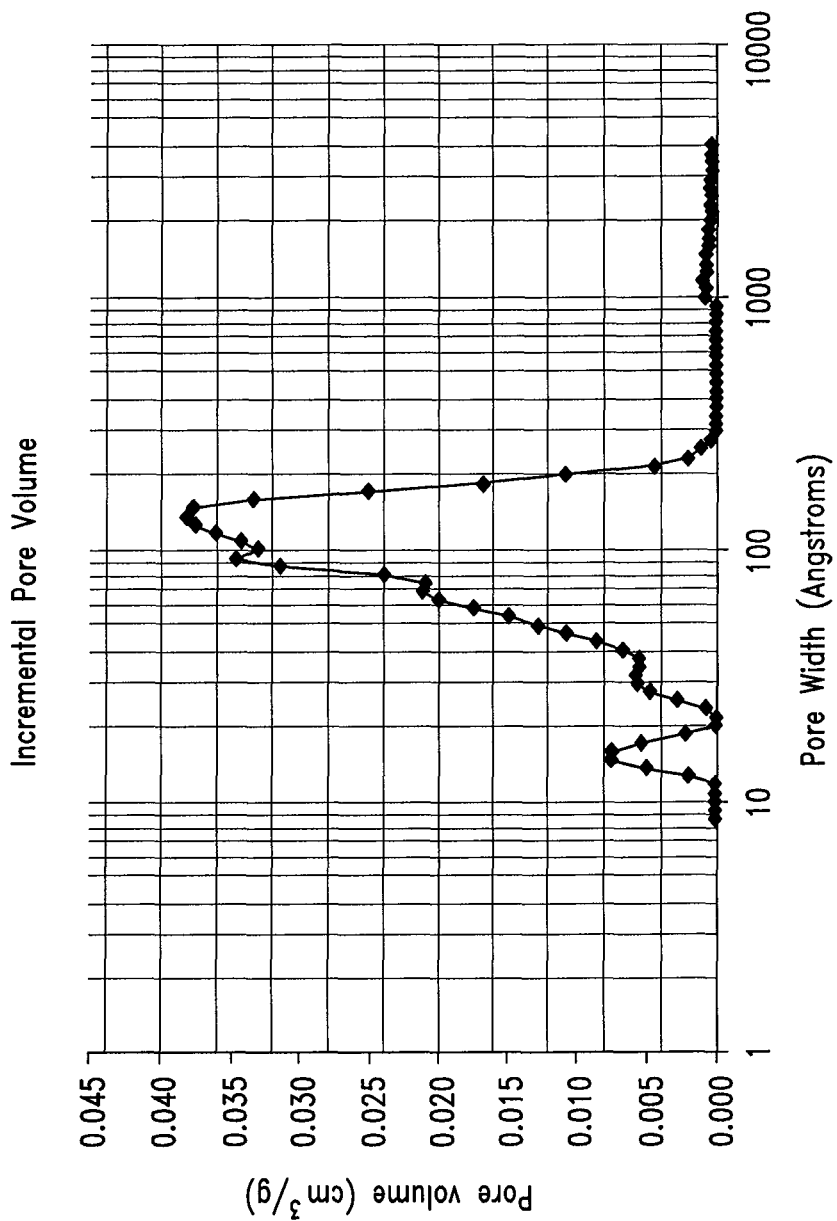
FIG. 6 is a pore size distribution for a mesoporous carbon material.

A polymer gel was prepared and pyrolyzed (but not activated) according to Examples 1 and 2. The carbon material was analyzed and determined to comprise a specific surface area of about 675 m$^2$/g, a total pore volume of about 0.70 cc/g and a tap density of about 0.45 g/cc. The pore size distribution of the mesoporous carbon material is presented in FIG. 6.

Bi-functional catalysts are incorporated in the mesoporous carbon material as described herein. For example, bi-functional catalysts are incorporated during the polymerization stage, into the dried (or undried polymer gel) or after pyrolysis of the polymer gel.

Example 13

Preparation of Carbon Materials Impregnated with Various Bi-Functional Catalysts Metal salt solutions were prepared by dissolving 18 g of nickel (II) acetate tetrahydrate in 100 mL water, 10 g of iron (II) acetate in 100 mL water, 30 g of manganese (II) acetate in 100 mL water or 10 g manganese (II) formate in 100 mL water.

Table 6 describes various samples impregnated with metals. Samples 1A through 1D were prepared by first weighing out 1 g of the appropriate material (e.g., activated carbon, polymer gel, etc.) to be impregnated into individual 5-mL conical tubes. For each tube, 10 mL of the appropriate metal salt solution was added, the tube was capped and then shaken overnight on an orbital shaker. After shaking overnight, each tube was centrifuged for 5 min to obtain a pellet of metal impregnated carbon material. The pellet was re-suspended in 10 mL DI water, vortexed to dislodge and wash the pellet, and this material was centrifuged again to yield the rinsed pellet. The rinsed pellet was re-suspended in 10 mL DI water, vortexed to dislodge and wash the pellet, and this material was centrifuged again to yield a twice rinsed pellet.

Samples 22A through 22D, 23A through 23D, 24A through 24D, 25A through 25D, and 26A through 26D were prepared in the same manner as samples 21A through 21D described above. Samples 27A through 27D were prepared in the same manner as samples 21A through 21D described above, except the mass of carbon material added to the tube was 0.5 g (owing to the lower tap density of this material, i.e., greater volume taken in the tube for a given material mass).

TABLE 5

Purity Analysis of Carbon Materials & Polymer Gels Comprising Lead

| Element | S. 8 | S. 9 | S. 10 | S. 11 | S. 12 | S. 13 | S. 14 | S. 15 | S. 18 | S. 19 | S. 20 |
|---|---|---|---|---|---|---|---|---|---|---|---|
| Pb (%) | 7.892 | 6.526 | 0.294 | 2.427 | 1.855 | 1.169 | 0.0084 | 0.0027 | 1.012 | 13.631 | 7.008 |
| Fe (ppm) | 7 | 8 | 3 | ND | 7 | 3 | 6 | 2 | ND | ND | 6 |
| Cl (ppm) | 312 | 254 | 20 | 103 | 85 | 66 | ND | ND | 41 | ND | ND |
| Si (ppm) | 97 | 94 | 27 | ND | 43 | ND | 29 | ND | ND | ND | ND |
| Ni (ppm) | ND | ND | ND | ND | ND | ND | ND | ND | ND | ND | 5 |
| Ta (ppm) | 64 | 45 | ND | 15 | 18 | 10 | ND | ND | 7 | 107 | 56 |
| Al (ppm) | ND | 72 | ND | ND | 47 | ND | 38 | ND | ND | ND | ND |
| Ca (ppm) | ND | ND | 7 | ND | ND | 10 | 4 | 9 | ND | ND | ND |
| Co (ppm) | ND | ND | ND | ND | ND | ND | 12 | ND | ND | ND | ND |
| S (ppm) | ND | ND | ND | ND | ND | ND | 23 | 23 | ND | ND | ND |
| Cu (ppm) | ND | ND | ND | ND | ND | ND | 2 | 1 | ND | ND | ND |

* ND = not detected by PIXE analysis

For samples 21B, 22B, 23B, 24B, 25B, 26B, and 27B, a third pellet rinse was required to adequately remove all the non-impregnated salt (as determined by visual observations). All samples were air-dried overnight at 85° C. in a drying oven.

TABLE 6

Carbon Materials Impregnated with Various Metals

| Sample # | Metal Salt Used | Material Type |
|---|---|---|
| 21A | nickel (II) acetate | Mesoporous pyrolyzed carbon |
| 21B | iron (II) acetate | |
| 21C | manganese (II) acetate | |
| 21D | manganese (II) formate | |
| 22A | nickel (II) acetate | Non-milled |

TABLE 6-continued

Carbon Materials Impregnated with Various Metals

| Sample # | Metal Salt Used | Material Type |
|---|---|---|
| 22B | iron (II) acetate | mesoporous activated carbon |
| 22C | manganese (II) acetate | |
| 22D | manganese (II) formate | |
| 23A | nickel (II) acetate | Microporous pyrolyzed carbon |
| 23B | iron(II) acetate | |
| 23C | manganese (II) acetate | |
| 23D | manganese (II) formate | |
| 24A | nickel (II) acetate | Milled microporous activated carbon |
| 24B | iron (II) acetate | |
| 24C | manganese (II) acetate | |
| 24D | manganese (II) formate | |
| 25A | nickel (II) acetate | Mesoporous dried carbon polymer gel |
| 25B | iron (II) acetate | |
| 25C | manganese (II) acetate | |
| 25D | manganese (II) formate | |
| 26A | nickel (II) acetate | Microporous dried carbon polymer gel |
| 26B | iron (II) acetate | |
| 26C | manganese (II) acetate | |
| 26D | manganese (II) formate | |
| 27A | nickel (II) acetate | Milled mesoporous activated carbon |
| 27B | iron (II) acetate | |
| 27C | manganese (II) acetate | |
| 27D | manganese (II) formate | |

Selected impregnated samples were characterized by PIXE (to determine the level of incorporation of the desired cation) and by nitrogen sorption (to determine the effect on specific surface area, total pore volume). A summary of this data is presented in Table 7. Table 7 also includes data for controls (non-impregnated material from the same source).

TABLE 7

PIXE and Nitrogen Sorption Data for Metal-Impregnated Carbon Samples

| | Amount of atom detected | | | Specific Surface Area | Total Pore volume |
|---|---|---|---|---|---|
| Sample | Ni | Fe | Mn | ($m^2/g$) | (cc/g) |
| 21A | 0.274% | 33.721 | ND | NM | NM |
| 21B | NM | NM | NM | NM | NM |
| 21C | 7.154 ppm | 44.948 ppm | 0.462% | 697 | 0.702 |
| 21D | NM | NM | NM | NM | MN |
| 21 (control) | 7.378 | 31.989 | ND | 789 | 0.795 |
| 22A | 1.181% | 42.459 ppm | ND | 1774 | 1.435 |
| 22B | NM | NM | NM | NM | NM |
| 22C | 8.485 ppm | 38.512 ppm | 0.799% | 1622 | 1.304 |
| 22D | NM | NM | NM | 1789 | 1.448 |
| 22 (control) | 7.576 ppm | 34.489 ppm | ND | 2130 | 1.725 |
| 23A | 863 ppm | 15.510 ppm | ND | NM | NM |
| 23B | NM | NM | NM | NM | NM |
| 23C | ND | ND | 671 ppm | NM | NM |
| 23D | NM | NM | NM | NM | NM |
| 23 (control) | ND | 2.528 ppm | ND | NM | NM |
| 24A | 0.651% | 15.63 ppm | 3.467 ppm | 1766 | 0.808 |
| 24B | NM | NM | NM | 1595 | 0.757 |
| 24C | 1.882 ppm | 19.59 ppm | 0.401% | 1708 | 0.790 |
| 24D | ND | ND | 0.738% | NM | NM |
| 24 (control) | ND | 16.37 ppm | ND | 1749 | 0.818 |
| 25A | 1.946% | 8.217 ppm | ND | 278 | 0.188 |
| 25B | NM | NM | NM | 336 | 0.232 |
| 25C | ND | ND | 2.134% | 219 | 0.148 |
| 25D | NM | NM | NM | 141 | 0.197 |
| 25 (control) | ND | 2.609 ppm | ND | 694 | 1.160 |
| 26A | 1.443% | 10.83 ppm | ND | 311 | 0.189 |
| 26B | NM | NM | NM | 333 | 0.216 |
| 26C | ND | ND | 1.546% | 263 | 0.164 |
| 26D | NM | NM | NM | 303 | 0.198 |
| 26 (control) | ND | 2.258 ppm | ND | 605 | 0.446 |
| 27A | 0.169% | 10.15 ppm | 5.579 ppm | 1879 | 1.510 |
| 27B | NM | NM | NM | 1772 | 1.416 |
| 27C | ND | 11.34 ppm | 0.86% | 1912 | 1.513 |
| 27D | 3.782 ppm | ND | 0.194% | 1980 | 1.563 |
| 27 (control) | ND | 20.879 ppm | ND | 1888 | 1.480 |

NM = not measured, ND = not detected

Table 8 presents PIXE data for select metal-impregnated samples. As can be seen in Table 8, the metal-impregnated samples comprise the desired metal and low levels of all other elements.

TABLE 8

PIXE Data for Certain Metal-Impregnated Carbon Samples

Element Concentration (PPM)

| Element | Sample 21A | Sample 24A | Sample 24C | Sample 25A | Sample 26A |
|---|---|---|---|---|---|
| Si | 47.381 | 57.478 | 26.110 | 43.422 | 15.000 |
| S | 23.601 | 24.489 | 11.690 | 41.042 | 29.680 |
| Ca | 33.581 | 7.511 | 4.578 | 5.571 | ND |
| Mn | ND | 3.467 | 4010 | ND | ND |
| Fe | 33.721 | 15.630 | 19.590 | 8.217 | 10.830 |
| Ni | 2740 | 6510 | 1.882 | 19460 | 14430 |
| Zn | ND | 3.207 | 7.018 | ND | ND |

ND = not detected, elements not listed were below the PIXE detection limit

The impregnation with various cations (e.g., nickel, iron, manganese, etc.) was attempted at various stages in the process. Specifically, the impregnation was attempted into the dried gel, the pyrolyzed carbon, the activated carbon, and the milled activated carbon. It is also possible to impregnate the material at the wet gel or gellation stage.

Figure 7:
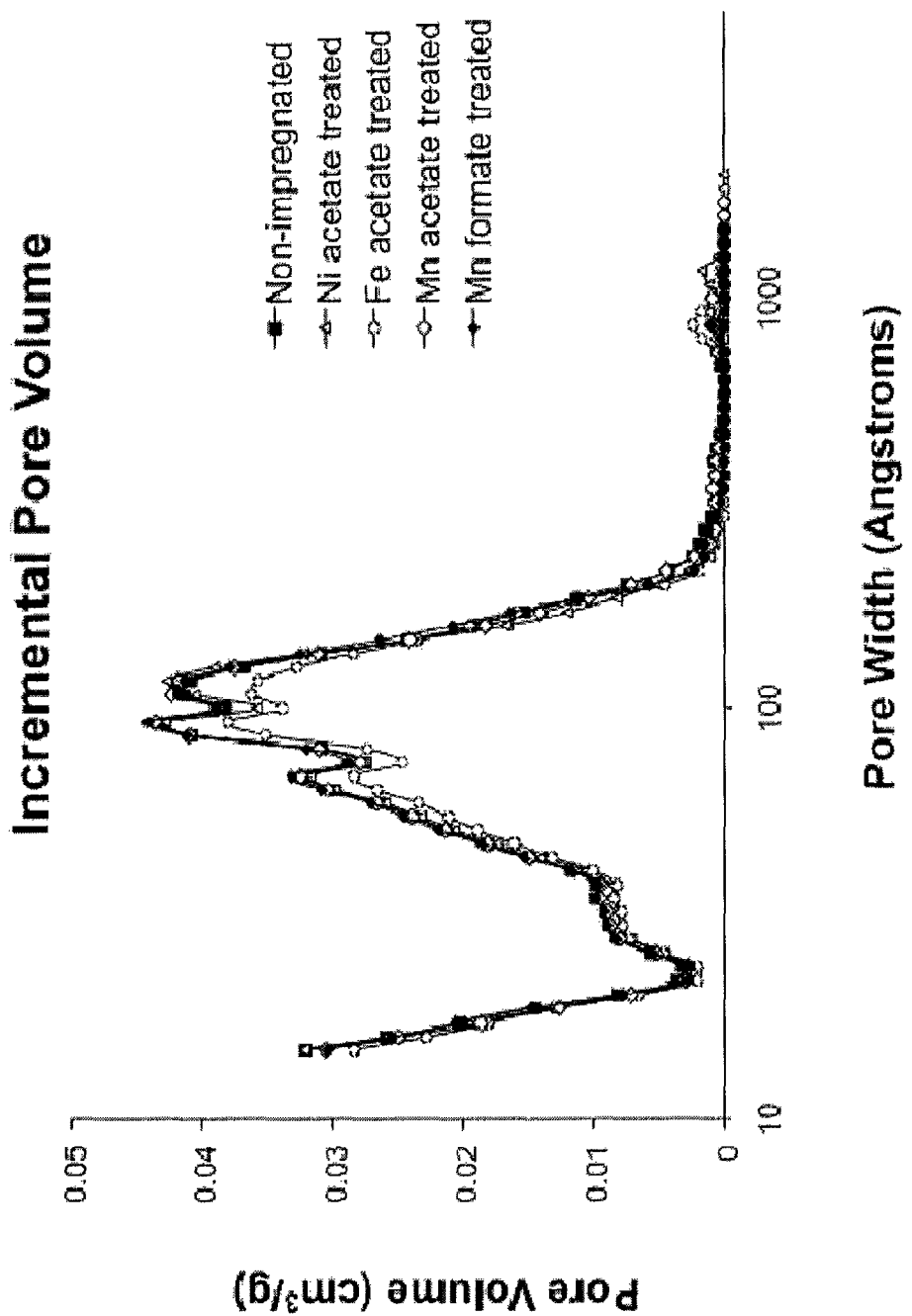
FIG. 7 presents a DFT pore volume distribution for metal-impregnated and non-impregnated milled mesoporous activated carbon samples.

In the case of samples 27A through 27D, the material used was milled mesoporous activated carbon. This carbon was jet milled to an average particle size in the range of about 6 microns. The PIXE data (Table 7) confirm that measureable levels of nickel (0.17%) and manganese (0.86%) could be incorporated into the carbon by the methods used. The data suggest that the acetate form of manganese provided a greater degree of impregnation compared to the formate salt form. Despite the incorporation of the various salts into the milled mesoporous carbon, there was little impact on the specific surface area or total pore volume (compared to data for the non-impregnated control sample). Likewise, the pore volume distributions for the various impregnated samples were very similar to that for the control (FIG. 7). This result demonstrates impregnation of the various salts while substantially maintaining mesopore structure and overall pore volume and specific surface area.

Figure 8:
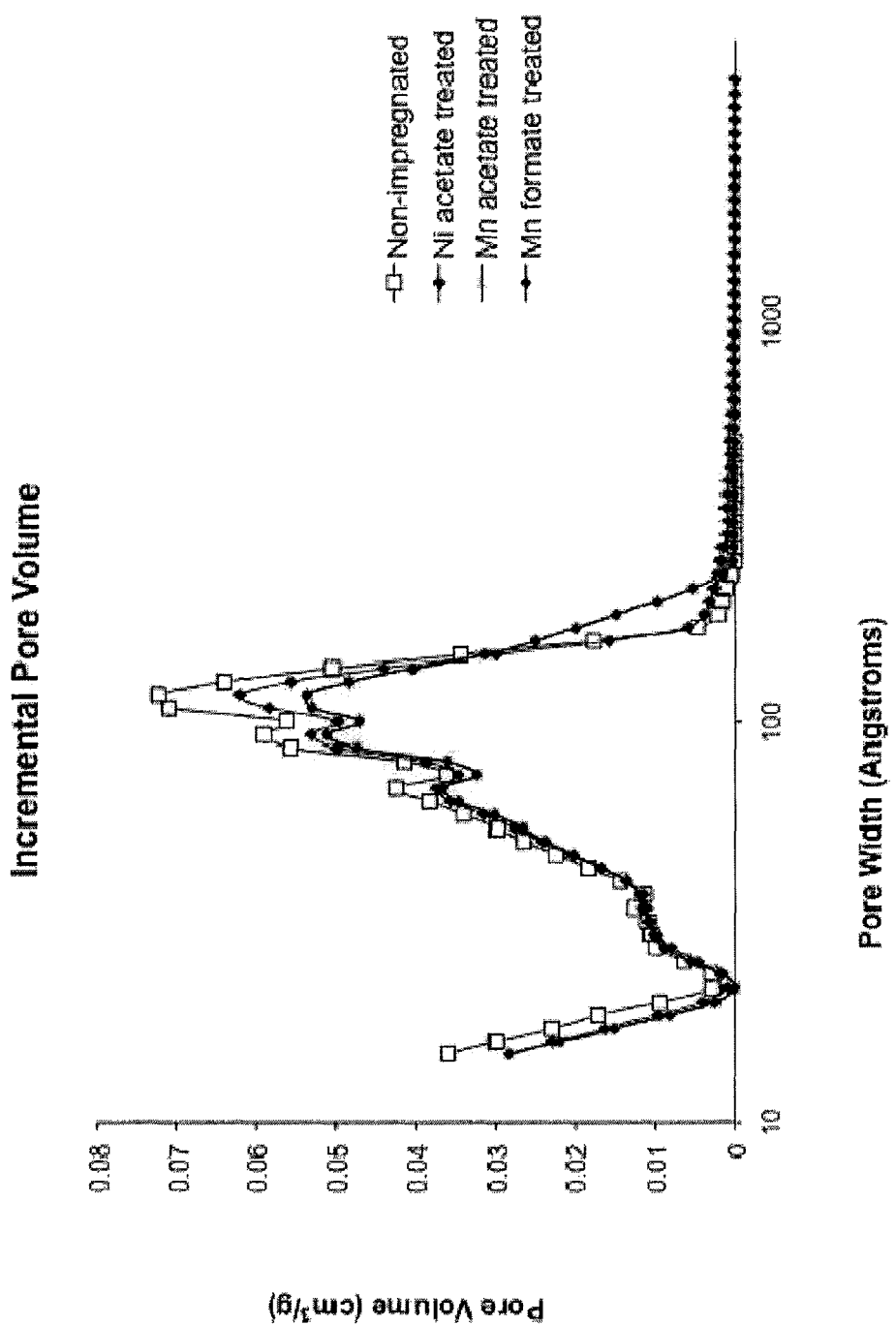
FIG. 8 shows a DFT pore volume distribution for metal-impregnated and non-impregnated non-milled mesoporous activated carbon samples.
Figure 9:
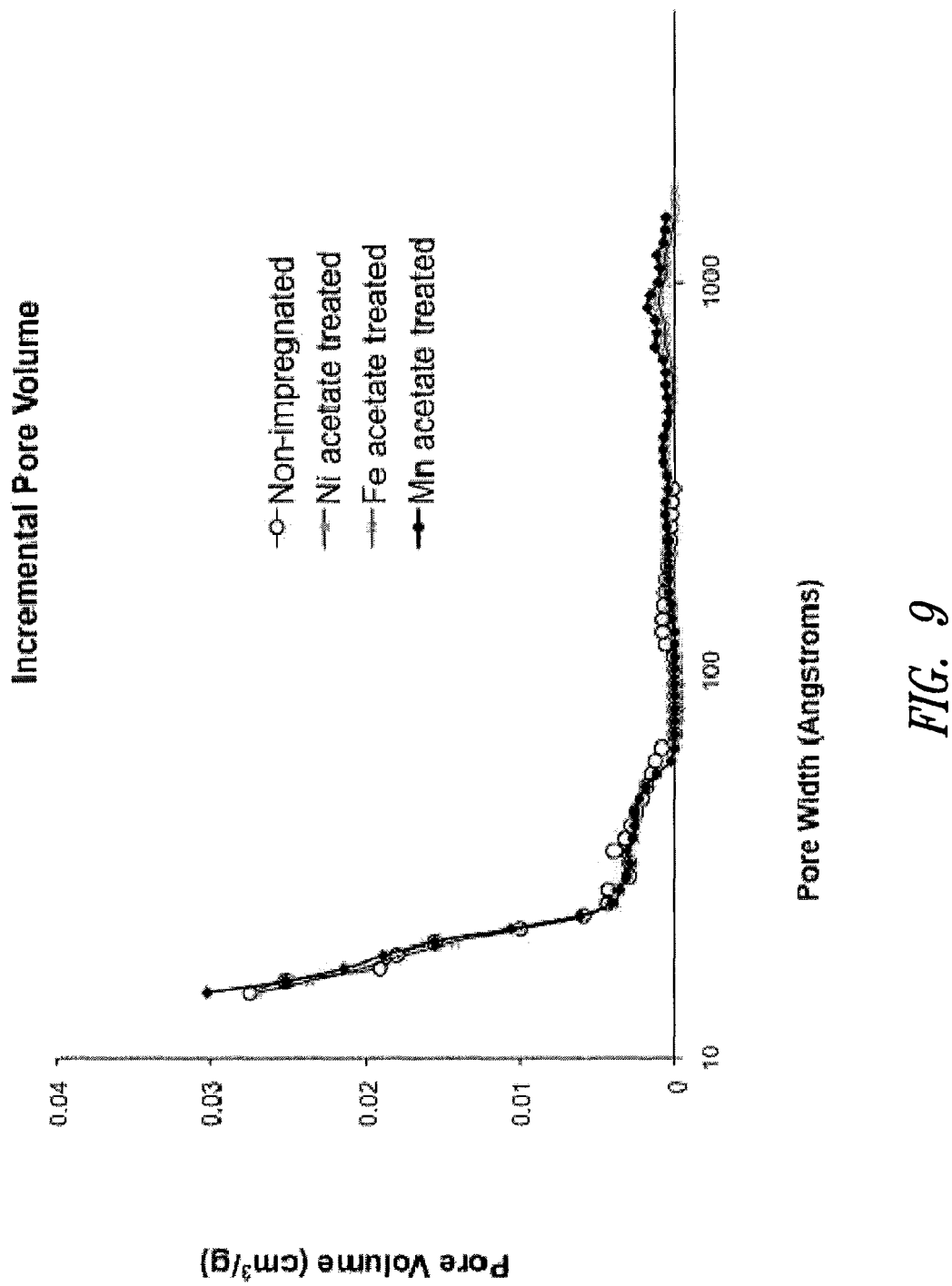
FIG. 9 depicts a DFT pore volume distribution for metal-impregnated and non-impregnated milled microporous activated carbon samples.

In the case of samples 22A through 22D, the material used was non-milled mesoporous activated carbon. The PIXE data (Table 7) confirm that measureable levels of nickel (0.65%) and manganese (0.4% to 0.7%) could be incorporated into the carbon by the methods used. A modest decrease in specific surface area and total pore volume was observed for the various treated samples compared to the non-treated control. The pore volume distributions for the various impregnated samples were essentially unchanged compared to the control (FIG. 8). These findings demonstrate impregnation of the various salts occurs while substantially maintaining micropore and mesoporous pore structure structures In the case of samples 24A through 24D, the material used was milled microporous activated carbon. The PIXE data (Table 7) confirm that measureable levels of nickel (1.2%) and manganese (0.8%) could be incorporated into the carbon by the methods used. For the case of nickel acetate treatment, a greater degree of nickel was incorporated for the non-milled compared to milled carbon, however, the reverse observation was made with regard to the manganese acetate treatment. A very modest decrease in specific surface area and total pore volume was observed for the various treated samples compared to the non-treated control. The pore volume distributions for the various impregnated samples were very similar compared to the control (FIG. 9). These data are consistent with the view of metal impregnation into the micropores of the milled microporous activated carbon material.

Figure 10:
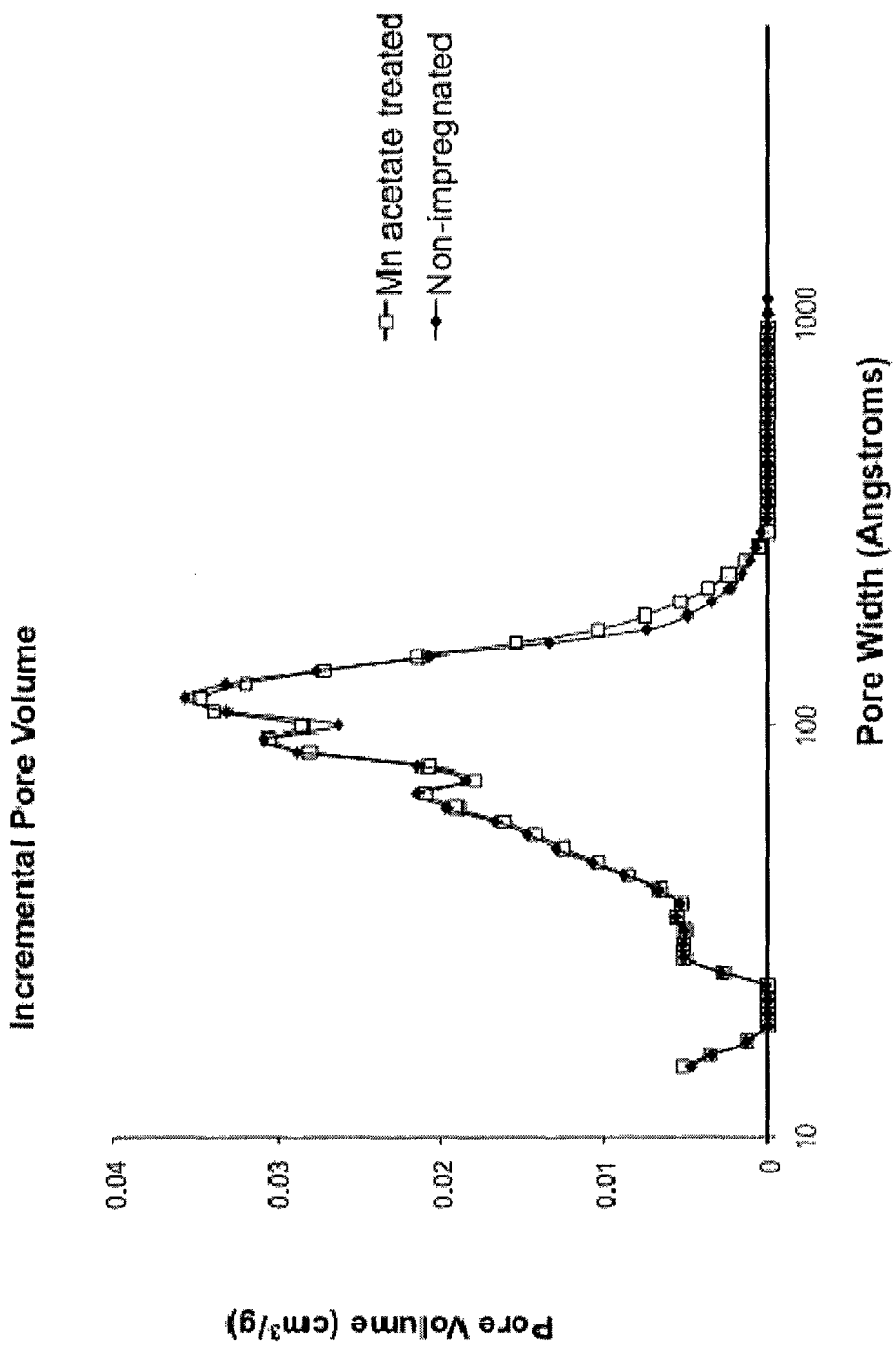
FIG. 10 is a DFT pore volume distribution for manganese-impregnated and control mesoporous pyrolyzed carbon samples.

In the case of samples 21A through 21D, the material used was mesoporous pyrolyzed carbon. The PIXE data (Table 7) confirm that measureable levels of nickel (0.27%) and manganese (0.46%) could be incorporated into the carbon by the methods used. For the case of manganese acetate treatment of the mesoporous pyrolyzed carbon, there was a minor decrease in total pore volume and specific surface area. The amounts of nickel and manganese that become incorporated into the mesoporous pyrolyzed carbon after the impregnation procedure were similar to that observed for milled mesoporous activated carbon, but lower than that observed for non-milled mesoporous activated carbon. The pore volume distribution for the manganese acetate impregnated mesoporous pyrolyzed carbon was very similar compared to the control (FIG. 10).

In the case of samples 23A through 23D, the material used was microporous pyrolyzed carbon. The PIXE data (Table 7) confirm that measureable levels of nickel (863 ppm) and manganese (671 ppm) could be incorporated into the carbon by the methods used. The amounts incorporated into the microporous pyrolyzed carbon were generally lower than that observed for the activated carbon, and lower than that observed for mesoporous pyrolyzed carbon.

Figure 11:
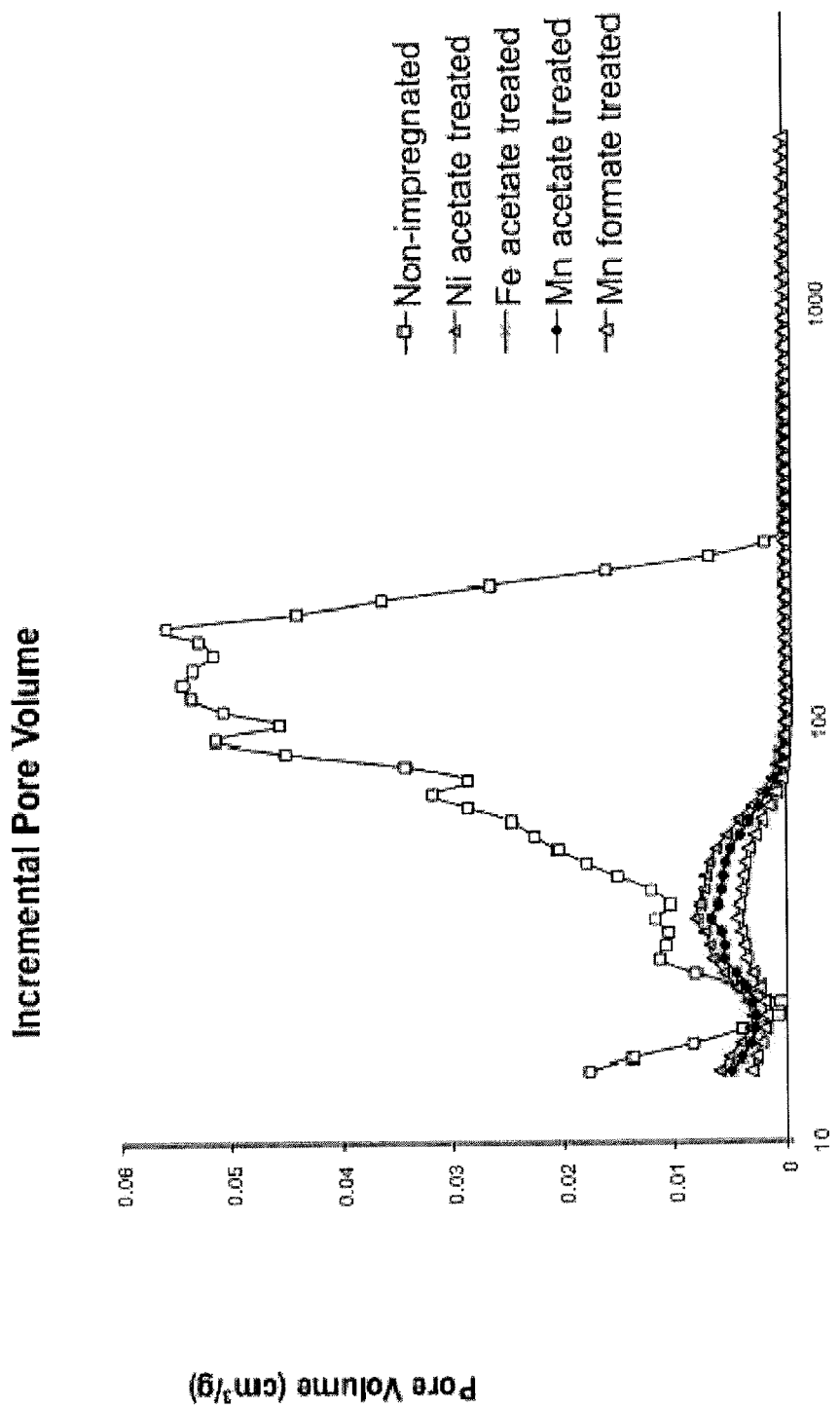
FIG. 11 presents a DFT pore volume distribution for metal-impregnated and non-impregnated mesoporous dried polymer gel samples.

In the case of samples 25A through 25D, the material used was mesoporous dried polymer gel. The PIXE data (Table 7) confirm that substantial levels of nickel (1.9%) and manganese (2.1%) could be incorporated into the dried gel by the methods used. Dramatic decreases in specific surface area and total pore volume were observed for the various treated samples compared to the non-treated control. For instance, the total pore volume was 1.16 cc/g prior to the treatment, and in the range of 0.15 to 0.23 cc/g after treatment, and the specific surface area prior to treatment was 694 $m^2/g$ and in the range of 141 to 336 $m^2/g$ after treatment. The pore volume distributions for the various impregnated samples were very similar to each other and were substantially lower than that for the control (FIG. 11).

This reduction in pore volume is likely due to the subsequent oven (hot air) drying technique used in combination with the mesoporous nature of the impregnated dried gel material. In this case, it may be possible to conduct the impregnation under conditions to slow down or avoid the material collapse (such as changing the solvent, solvent acidity/basicity, higher viscosity, and/or low temperatures, particularly to allow the solvent to remain liquid at lower temperatures). Alternatively, the collapse may be avoided by alternate drying after impregnation, said alternative drying techniques are known in the art such as freeze drying, supercritical drying, and said processes in combination with a solvent exchange prior to the drying process. Accordingly, in another embodiment the impregnation process is designed to intentionally allow for gel collapse at a point to maximize efficiency of the desired ion captured within the material by altering the solvent acidity, basicity, viscosity, freezing point or combinations thereof.

Figure 12:
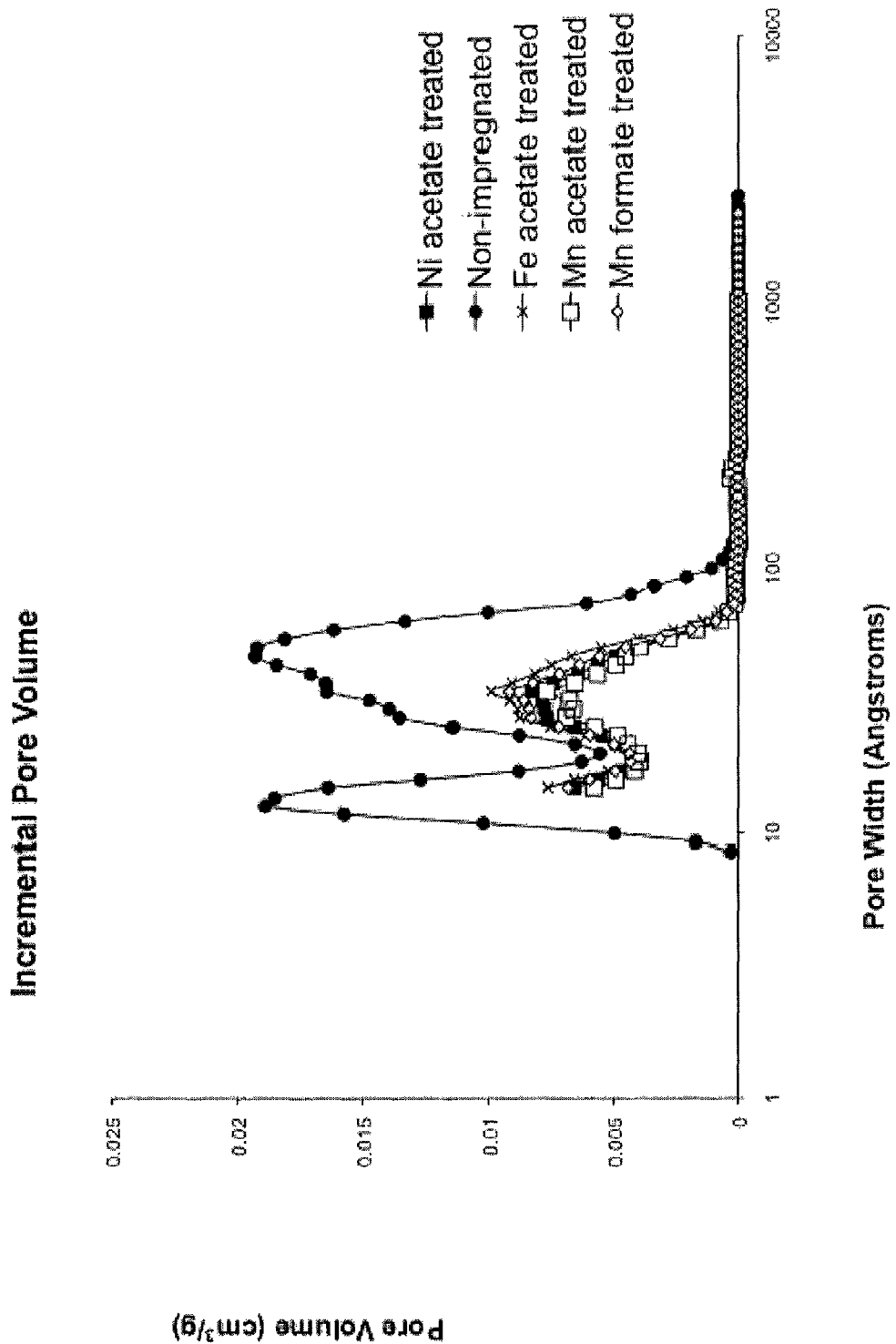
FIG. 12 shows a DFT pore volume distribution for metal-impregnated and non-impregnated microporous dried polymer gel samples.

In the case of samples 26A through 26D, the material used was microporous dried polymer gel. The PIXE data (Table 7) confirm that substantial levels of nickel (1.4%) and manganese (1.5%) could be incorporated into the dried gel by the methods used. Decreases in specific surface area and total pore volume were observed for the various treated samples compared to the non-treated control. For instance, the total pore volume was 0.446 cc/g prior to treatment, and in the range of 0.164 to 0.216 cc/g after treatment. It is of interest to note that the final pore volume achieved after the impregnation procedure was similar for the case of mesoporous and microporous dried gel. Even so, on the basis of the percentage of pore volume loss, the microporous carbon exhibited a lower loss (52%-67% loss) of pore volume compared to the mesoporous dried polymer gel (80-87% loss). The total specific surface area was 605 $m^2/g$ prior to the treatment, and in the range of 263 to 333 cc/g after treatment. Similar to the case discussed above for the treatment of the mesoporous dried polymer gel, the current data show the same dramatic change in pore structure for the treated microporous dried gel, and from the data it is not readily apparent if this observation is due to a general material collapse due to the solvent exposure during the impregnation procedure, or is a direct result of the incorporated ions occupying pores within the material (see FIG. 12).

Example 14

Preparation of an Air Electrode Comprising Mesoporous Carbon Material

A mesoporous carbon of example 13 containing a bi-functional catalyst is combined with a Teflon binder to produce an electrode 50 micron thick. Five different electrodes are produced with varying Teflon weight percent at values of 3%, 10%, 20%, 50%, and 80%. The electrodes are then stacked in order of decreasing Teflon content and calendared to reduce their total thickness to create a single 200 micron thick electrode with the highest weight percent Teflon containing layer on the air side of the electrode. Propylene carbonate-lithium hexafluorophosphate electrolyte is added to the bottom side (lowest Teflon content) of the carbon cathode to wet the electrode sandwich. The porous Teflon sheet-air electrode assembly is placed on top of a protected lithium foil covering a copper current collector. An aluminum screen is placed over the mesoporous carbon electrode to complete the battery. The entire cell stack is placed and sealed in a heat sealable pouch with metal tabs protruding from the copper current collector and aluminum screen. The heat sealable pouch is perforated on the air electrode cathode side to allow ingress of air. The mesoporous carbon electrode is exposed to dry oxygen and the battery produces a voltage of 3.1V.

Example 15

Modification of the Surface Chemistry of Carbon Material

A milled microporous carbon with a surface functionality of 15.6 mEq/100 g was subjected to heat treatment at 900° C. in the presence of a non-oxidizing gas. The surface functionality of the carbon was measured before and after heat treatment by measuring the milliequivalents/100 g (mEq/100 g) and pH of the samples. Methods for such measurements are well-known in the art. A decrease in mEq/100 g and increase in pH indicates a decrease in surface functionality. As seen in Table 9, heat treatment resulted in a decrease in surface functionality of the microporous carbon.

A non-milled mesoporous carbon with a surface functionality of 3.02 g mEq/100 g was jet milled in the presence of an oxidizing gas (e.g., as described in Example 4). As shown in Table 9, jet milling increased the surface functionality of the mesoporous carbon.

TABLE 9

Data Showing Modified Surface Functionality of Various Carbon Materials

| Sample | mEq/100 g | pH |
| --- | --- | --- |
| Microporous carbon before heat treatment | 15.6 | 5.356 |
| Microporous carbon after heat treatment | 1.9 | 8.056 |
| Mesoporous carbon before jet milling | 3.02 | 7.107 |
| Mesoporous carbon after jet milling | 11.5 | 5.1 |

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A metal-air battery comprising an air cathode, a metal anode and an electrolyte, wherein the air cathode comprises a carbon material comprising at least 1000 ppm of a bi-functional catalyst and a pore structure comprising pores, the pore structure comprising a total pore volume of at least 1 cc/g, wherein at least 50% of the total pore volume resides in pores having a pore size ranging from 2 nm to 50 nm as determined from $N_2$ sorption derived DFT and wherein the carbon material comprises a different wetting characteristic on an inner surface of the pores compared to an outer surface of the pores.

2. The metal-air battery of claim 1, wherein the metal anode comprises carbon, lithium, sodium, potassium, rubidium, cesium, francium, beryllium, magnesium, calcium, strontium barium, radium, aluminum, silicon or a combination thereof.

3. The metal-air battery of claim 1, wherein at least 50% of the total pore volume resides in pores having a pore size ranging from 10 nm to 50 nm as determined from $N_2$ sorption derived DFT.

4. The metal-air battery of claim 1, wherein at least 50% of the total pore volume resides in pores having a pore size ranging from 15 nm to 30 nm as determined from $N_2$ sorption derived DFT.

5. The metal-air battery of claim 1, wherein at least 90% of the total pore volume resides in pores having a pore size ranging from 2 nm to 50 nm as determined from $N_2$ sorption derived DFT.

6. The metal-air battery of claim 1, wherein at least 90% of the total pore volume resides in pores having a pore size ranging from 10 nm to 50 nm as determined from $N_2$ sorption derived DFT.

7. The metal-air battery of claim 1, wherein the carbon material comprises at least 5000 ppm of the bi-functional catalyst.

8. The metal-air battery of claim 1, wherein the carbon material comprises a specific surface area of greater than 500 $m^2$ g as determined from $N_2$ sorption derived DFT.

9. The metal-air battery of claim 1, wherein the carbon material comprises a specific surface area of greater than 1000 $m^2$ g as determined from $N_2$ sorption derived DFT.

10. The metal-air battery of claim 1, wherein the carbon material comprises a specific surface area of greater than 1500 $m^2$ g as determined from $N_2$ sorption derived DFT.

11. The metal-air battery of claim 1, wherein the carbon material comprises a specific surface area of greater than 2000 $m^2$ g as determined from $N_2$ sorption derived DFT.

12. The metal-air battery of claim 1, wherein the bi-functional catalyst comprises iron, nickel, cobalt, manganese, copper, ruthenium, rhodium, palladium, osmium, iridium, gold, halfnium, platinum, titanium, rhenium, tantalum, thallium, vanadium, niobium, scandium, chromium, gallium, zirconium, molybdenum or combinations or alloys thereof.

13. The metal-air battery of claim 1, wherein the bi-functional catalyst comprises nickel.

14. The metal-air battery of claim 1, wherein the bi-functional catalyst comprises iron.

15. The metal-air battery of claim 1, wherein the bi-functional catalyst comprises manganese.

16. The metal-air battery of claim 1, wherein the bi-functional catalyst is in the form of an oxide.

17. The metal-air battery of claim 1, wherein the bi-functional catalyst comprises a nickel oxide, an iron oxide or a manganese oxide.

18. The metal-air battery of claim 1, wherein the bi-functional catalyst is in the form of a carbide.

19. The metal-air battery of claim 18, wherein the carbide comprises tungsten carbide.

20. The metal-air battery of claim 1, wherein an inner surface of the pores has a higher affinity for a solvent capable of solvating lithium ion than an outer surface of the pores.

21. The metal-air battery of claim 20, wherein the solvent comprises acetonitrile, propylene carbonate, dimethyl carbonate, ethylene carbonate, diethyl carbonate, ethylmethylimidazolium hexafluorophosphate (EMIPF6), 1,2-dimethyl-3-propyl imidazolium [(DMPIX)Im] or a combination thereof.

22. The metal-air battery of claim 1, wherein an inner surface of the pores has a lower affinity for a solvent capable of solvating lithium ion than the outer surface of the pores.

23. The metal-air battery of claim 1, wherein the carbon material comprises less than 500 ppm of all other elements, excluding the bi-functional catalyst, having atomic numbers ranging from 11 to 92, as measured by proton induced x-ray emission.

* * * * *